(12) United States Patent
Hopkins et al.

(10) Patent No.: US 12,197,455 B2
(45) Date of Patent: **\*Jan. 14, 2025**

(54) SYSTEMS AND METHODS FOR CREATING, EDITING, STORING AND RETRIEVING KNOWLEDGE CONTAINED IN SPECIFICATION DOCUMENTS

(71) Applicant: XSB, Inc., Setauket, NY (US)

(72) Inventors: Rupert Hopkins, Miller Place, NY (US); David Winchell, Port Jefferson, NY (US); Louis Pokorny, Calverton, NY (US); David Warren, Stony Brook, NY (US); Tatyana Vidrevich, Mt. Sinai, NY (US); Christopher Rued, East Setauket, NY (US); Raymond Weidner, Stony Brook, NY (US)

(73) Assignee: XSB, INC., Setauket, NY (US)

( \* ) Notice: Subject to any disclaimer, the term of this patent is extended or adjusted under 35 U.S.C. 154(b) by 97 days.

This patent is subject to a terminal disclaimer.

(21) Appl. No.: 16/901,161

(22) Filed: Jun. 15, 2020

(65) Prior Publication Data

US 2020/0364234 A1    Nov. 19, 2020

Related U.S. Application Data

(63) Continuation of application No. 14/653,018, filed as application No. PCT/US2013/077609 on Dec. 23, (Continued)

(51) Int. Cl.
*G06F 16/25* (2019.01)
*G06F 16/2457* (2019.01)
(Continued)

(52) U.S. Cl.
CPC ...... *G06F 16/254* (2019.01); *G06F 16/24573* (2019.01); *G06F 16/258* (2019.01);
(Continued)

(58) Field of Classification Search
None
See application file for complete search history.

(56) References Cited

U.S. PATENT DOCUMENTS 6,574,644 B2 \* 6/2003 Hsu ..................... G06F 16/9558
715/744
2003/0220915 A1 \* 11/2003 Fagan ..................... G06F 16/38
(Continued)

*Primary Examiner* — Amresh Singh
(74) *Attorney, Agent, or Firm* — Ware, Fressola, Maguire & Barber LLP

(57) ABSTRACT

A system for storing and disseminating knowledge contained in documents includes a document annotator that creates a structured syntactic textual model of each of the documents, an ontology directed extractor that extracts properties from the textual models, a database for storing the textual models and the properties, and an interface permitting queries to the database. The document annotator includes a plurality of data transformers and a plurality of custom annotator tools. The ontology directed extractor includes an ontology based schema definition and a plurality of ontology based data transformers. The user interface includes the ability to view, search, navigate, create, and exchange documents. The creation feature includes a transclusion function.

20 Claims, 63 Drawing Sheets

Related U.S. Application Data

2013, now Pat. No. 10,685,032, which is a continuation of application No. 13/795,140, filed on Mar. 12, 2013, now abandoned.

(60) Provisional application No. 61/889,180, filed on Oct. 10, 2013, provisional application No. 61/746,730, filed on Dec. 28, 2012.

(51) Int. Cl.
  *G06F 16/30* (2019.01)
  *G06F 16/93* (2019.01)
  *G06F 40/134* (2020.01)
  *G06F 40/154* (2020.01)

(52) U.S. Cl.
  CPC .............. *G06F 16/30* (2019.01); *G06F 16/93* (2019.01); *G06F 40/134* (2020.01); *G06F 40/154* (2020.01)

(56) References Cited

U.S. PATENT DOCUMENTS

| | | |
|---|---|---|
| 2005/0160355 A1 | 7/2005 | Cragun et al. |
| 2008/0263442 A1 | 10/2008 | Plumley et al. |
| 2009/0271179 A1* | 10/2009 | Marchisio ........... G06F 16/3338 707/999.002 |
| 2013/0179772 A1* | 7/2013 | Nakamura ............ G06F 40/154 715/234 |
| 2013/0318070 A1* | 11/2013 | Wu ........................ G06F 16/00 707/E17.14 |
| 2014/0365886 A1 | 12/2014 | Koenig et al. |
| 2017/0199657 A1 | 7/2017 | Mullins et al. |

\* cited by examiner

ELSEVIER

Nuclear Physics A 818 (2009) 1-35 www.elsevier.com/locate/nuclphysa

In-beam gamma-ray spectroscopy and shell-model description of $^{85,86}$Y isotopes C. Rusu [a,*,1], C.A. Ur [a,b], D. Bucurescu [a], A. Iordăchescu [a], Mărginean [a],
G. Căta-Danil [a], I. Căta-Danil [a], M. Ionescu-Bujor [a], M. Ivaşcu [a],
D. Bazzacco [b], T. Kröll [c], S. Lenzi [d], S. Lunardi [d], R. Menegazzo [b],
C. Rossi Alvarez [b], G. de Angelis [e], A. Gadea [f], D. Napoli [e]

[a] Horia Hulubei National Institute of Physics and Nuclear Engineering, R-76900 Bucharest, Romania
[b] Istituto Nazionale di Fisica Nucleare, Sezione di Padova, 35131 Padova, Italy
[c] Physik-Department E12, Technische Universität München, 80333 München, Germany
[d] Dipartmento di Fisica dell' Universita degli Studi di Padova, 35131 Padova, Italy
[e] Istituto Nazionale di Fisica Nucleare, Laboratori Nazionali di Legnaro, 35130 Legnaro, Italy
[f] Instituto de Fisica Corpuscular, Centro Mixtro CSIC-Universidad de Valencia. E-46071 Valencia, Spain Received 26 August 2008; received in revised form 17 November 2008; accepted 28 November 2008

Available onlin 13 December 2008

Abstract

The nuclei $^{85}$Y and $^{86}$Y were studied in two series of experiments conducted by using the heavy-ion reactions $^{76}$Ge($^{14}$N, 4n)$^{86}$Y and $^{52}$Cr($^{37}$Cl, 2pxn)$^{85,86}$Y. The analysis of double and triple coincidences of γ rays along with the investigation of angular distributions led to the extension of the level schemes of the $^{85}$Y and $^{86}$Y nuclei to spins and excitation energies higher than observed in previous experiments. In addition, a few new levels with low spins and excitation energies were identified in both nuclei. In order to better understand the nuclear structure of these isotopes, shell-model calculations were carried out considering a valence space formed by the proton and neutron orbitals f5/2, P3/2, P1/2, and g9/2.
© 2008 Elsevier B.V. All rights reserved.

TABLE II. Chemical composition, percent maximum unless a range is indicated 1/

| Alloy | Silicon | Iron | Copper | Manganese | Magnesium | Chromium |
|---|---|---|---|---|---|---|
| 208.0 | 2.5-3.5 | 1.2 | 3.5- 4.5 | 0.50 | 0.10 | -- |
| 222.0 | 2.0 | 1.5 | 9.2-10.5 | .50 | .15-0.35 | -- |
| 242.0 | 0.7 | 1.0 | 3.5- 4.5 | .35 | 1.2 -1.8 | 0.25 |
| 295.0 | 0.7-1.5 | 1.0 | 4.0- 5.5 | .35 | 0.03 | -- |
| 319.0 | 5.5-6.5 | 1.0 | 3.0- 4.5 | .50 | .10 | -- |
| 328.0 | 7.5-8.5 | 1.0 | 1.0- 2.5 | .20-0.6 | .20-0.5 | 0.35 |
| 355.0 | 4.5-5.5 | 0.6 2/ | 1.0- 1.5 | .50 2/ | .40-0.6 | .25 |
| C355.0 | 4.5-5.5 | .20 | 1.0- 1.5 | .10 | .40- .6 | -- |
| 356.0 | 6.5-7.5 | .6 | 0.25 | .35 | .20- .45 | -- |
| A356.0 | 4.5-6.0 | .20 | .20 | .10 | .25- .45 | -- |
| B443.0 | 4.5-6.0 | .8 | .15 | .35 | .05 | -- |
| 512.0 | 1.4-2.2 | .5 | .35 | .8 | 3.5 -4.5 | 0.25 |
| 514.0 | 0.35 | .50 | .15 | .35 | 3.5 -4.5 | -- |
| 520.0 | .25 | .30 | .25 | .15 | 9.5 -10.6 | -- |
| 535.0 | .15 | .15 | .05 | .10-0.25 | 6.2 -7.5 | -- |

FIG. 8

| Alloy | Temper designation | Tensile strength, ksi (MPa) minimum | Yield strength at 0.2 percent offset or at extension indicated | | Elongation in 2 inches (50.8 mm) or 4 X diameter, percent, minimum |
|---|---|---|---|---|---|
| | | | ksi (MPa) minimum | Extension under load, inch per inch (mm/mm) | |
| 356.0 | Artificially aged (T51) | 23 (159) | -- | -- | -- |
| 356.0 | Solution heat-treated & artificially aged (T6) | 30 (207) | 20 (138) | 0.0039 | 3.0 |
| 356.0 | Solution heat-treated & stabilized (T7) | 31 (214) | 29 (200) | 0.0039 | -- |
| A356.0 | Solution heat-treated & artificially aged (T6) | 34 (234) | 24 (166) | -- | 3.5 |
| B443.0 | As fabricated (F) | 17 (117) | -- | -- | 3.0 |
| 512.0 | As fabricated (F) | 17 (117) | 10 (69) | -- | -- |
| 514.0 | As fabricated (F) | 22 (152) | -- | -- | 6.0 |

FIG. 9

NOTICE OF
CANCELLATION

NOT MEASUREMENT SENSITIVE

QQ-A-601F
NOTICE 2
January 23, 1991

FEDERAL SPECIFICATION

ALUMINUM ALLOY SAND CASTINGS

Federal Specification QQ-A-601F, dated March 23, 1981, (with Amendment 1 dated May 3, 1984) is hereby cancelled. Future procurements for this material should refer to ASTM B26/B26M, Aluminum-Alloy Sand Castings.

(Application for copies of ASTM publications should be addressed to the American Society for Testing and Materials, 1916 Race Street, Philadelphia, PA 19103-1187.

Preparing activity:

| | | |
|---|---|---|
| | 416 | Quenched and Tempered (T) |
| | 416Se | Quenched and Tempered (T) |
| | 431 | Quenched and Tempered (H) |
| | 431 | Quenched and Tempered (I) |
| | 431 | Quenched and Tempered (T) |
| | 630 | Annealed & Age Hardened |
| Nickel Alloy | 400 | As Formed or stress Relieved |
| | 405 | As Formed or stress Relieved |
| | 500 | Solution Annealed & Age Hardened |
| | 625 | Annealed |
| Titanium | T7 | Annealed |

1.2.3 Coatings for steel fasteners. Types of Coatings Types of Coatings
A - Ion Vapor Deposited Aluminum
P - Phosphate
ZM - Zinc mechanically deposited
ZE - Zinc electrodeposited
ZS - Zinc Silicate

2. APPLICABLE DOCUMENTS

2.1 General. The documents listed in this section are specified in sections 3 and 4 of this specification. This section does not include documents cited in other sections of the specification or recommended for additional information or as examples. While every effort

Companion Panel

XSB-EX1

NOT APPLICABLE

XSB-EX1 A
26 September 2013

Extract from MIL-DTL-1222

References.

MIL-DTL-1222 (section 1.2.1: Configurations, types and styles)
MIL-DTL-1222 (section 1.2.2: Material grades and conditions)
MIL-DTL-1222 (section 1.2.3: Coatings for steel fasteners)

Spectacle - Mozilla Firefox

File  Edit  View  History  Bookmarks  Tools  Help

Spectacle   + https://swiss.xsb.com/spectacle/faces/index.xhtml

Action ▸   View ▸   Tools ▸   Help ▸

MIL-DTL-1222 ×

XSB-EX1 ×

MIL-DTL-1222
(section 1.2.2:
Material grades
and conditions) ×  ← 1067

1.2.2. Material grades and conditions.
The following military grades and conditions are covered in this specification:

| ALLOY TYPE | MATERIAL Grade | CONDITION |
|---|---|---|
| Alloy Steel | B7 | Hardened and Tempered |
|  | B16 | Hardened and Tempered |
|  | A574 | Hardened and Tempered |
|  | 2H | Hardened and Tempered |
|  | 4 | Hardened and Tempered |
|  | 5 | Hardened and Tempered |
|  | 7 | Hardened and Tempered |
|  | 8 | Hardened and Tempered |
|  | 4340 | Hardened and Tempered |
| Aluminum | 2024 | Solution Treated and Naturally Aged |
|  | 6061 | Solution Treated and Artificially Aged |
|  | 7075 | Solution Treated and Stabilized |
| Carbon Steel | 2 | As Formed or Stress Relieved |
| Copper Alloy | 462 | As Formed or Stress Relieved |
|  | 464 | As Formed or Stress Relieved |
|  | 482 | As Formed or Stress Relieved |
|  | 510 | As Formed or Stress Relieved |
|  | 544 | As Formed or Stress Relieved |
|  | 632 | Quenched and Tempered |

← 1035

Companion Panel  ← 1063

XSB-EX1

💾 Save  ↑  ◀  ▶

NOT APPLICABLE

XSB-EX1 A
26 September 2013

Extract from MIL-DTL-1222

References.

MIL-DTL-1222 (section 1.2.1: Configurations, types and styles)
MIL-DTL-1222 (section 1.2.2: Material grades and conditions)
MIL-DTL-1222 (section 1.2.3: Coatings for steel fasteners)

← 1059
← 1009

Choose What I Share

ⓘ Firefox automatically sends some data to Monzilla so that we can improve your experience.

INCH-POUND

MIL-DTL-1222 J
8 December 2000
SUPERSEDING
MIL-DTL-1222 H
21 October 1986

DETAIL SPECIFICATION

STUDS, BOLTS, SCREWS AND NUTS FOR APPLICATIONS WHERE A HIGH DEGREE OF RELIABILITY IS REQUIRED; GENERAL SPECIFICATION FOR

DISTRIBUTION STATEMENT A. Approved for public release; distribution is unlimited.

FSC 53GP

AMSC N/A

Beneficial comments (recomendations, additions, deletions) and any pertinent data which may be of use in improving this document should be addressed to: Commander, Naval Sea Systems Command, SEA 05Q, 2531 Jefferson Davis Hwy, Arlington, VA 22242-5160, by using the Standardization Document Improvement Proposal (DD Form 1426) appearing at the end of this document or by letter.

This specification is approved for use by all Departments and Agencies of the Department of Defense.

FIG. 26

Spectacle - Mozilla Firefox

File Edit View History Bookmarks Tools Help

Spectacle | + https://swiss.xsb.com/spectacle/faces/index.xhtml | ☆ ▾ ℮ | 🔍 ▾ Google

Action ▸  View ▸  Tools ▸  Help ▸

MIL-DTL-1222  ×

MIL-DTL-1222 (section 6.1: Intended use)  ×

6.1. Intended use.

Fasteners meeting this specification are intended for general, high temperature, high strength and corrosive enviroment applications where a high degree of reliability is required. It is designed to be used to acquire commercial off-the-shelf fasteners with added inspections to verify the high degree of reliability required. Fastener types and grades have been selected to meet diverse applications which include: elevated temperatures, immersion in sea water, salt air/marine enviroments, high preloads and high shock loadings.

6.1.1. Martensitic stainless steel fasteners. Condition "1" was developed for martensitic corrosion resisting steel fasteners requiring moderate strength and greater resistance to stress corrosion cracking in moist, halogenated, sulfur containing or wet enviroments.

Choose What I Share

Firefox automatically sends some data to Monzilla so that we can improve your experience.

Spectacle - Mozilla Firefox

File Edit View History Bookmarks Tools Help

Spectacle | + https://swiss.xsb.com/spectacle/faces/index.xhtml#

Action ▼ View ▼ Tools ▼ Help ▼

MIL-DTL-1222 ✕ — 1037

References for subject [MIL-DTL-1222 type IV] ✕ — 1089

Describing document excerpts.

MIL-DTL-1222 (click to collapse)

MIL-DTL-1222

1. SCOPE 1.1. <u>Scope</u>. This specification covers standard studs, hex cap screws, and heavy hex bolts in nominal standard diamenters of 1/4 inch to 4 inches, nuts in nominal standard diameters of 1/4 inch to 3 inches, and socket head cap screws in nominal standard diameters of 1/4 inch to 1 1/2 inches for submarine safety and other applications where a high degree of reliability is required (see 6.1).

1.2. <u>Classification</u>. The configurations, types, styles, material grades and conditions of fasteners are as listed below. Non-standard fasteners may be ordered using a drawing with the dimensional and material requirements of the fastener and tested to the requirements of this specification (see 6.2).

1.2.1 <u>Configurations, types and style.</u>

| Studs | |
|---|---|
| Type I | Full body |
| Type II | Reduced body |
| Type III | Constant strength body |
| Type IV | Continuous thread (bolt-stud) |

— 1035

Provide Feedback

Choose What I Share

Firefox automatically sends some data to Monzilla so that we can improve your experience.

Spectacle - Mozilla Firefox

File Edit View History Bookmarks Tools Help https://swiss.xsb.com/spectacle/faces/index.xhtml#

Action ▼  View ▼  Tools ▼  Help ▼

MIL-DTL-1222 ×

Provide Feedback reliability is required (see 6.1).

1.2. Classification. The configurations, types, styles, material grades and conditions of fasteners are as listed below. Non-standard fasteners may be ordered using a drawing with the dimensional and material requirements of the fastener and tested to the requirements of this specification (see 6.2).

1.2.1 Configurations, types and style.

Studs

| | Full body |
|---|---|
| Type I | |
| Type II | Reduced body |
| Type III | Constant strength body |
| Type IV | Continuous thread (bolt-stud) |

Type III studs styles

| Style | Stud end thread | Nut end thread |
|---|---|---|
| a | Class5 | Class 3A |
| b | Class 5 | Class 2A |
| c | Class 3A | Class 3A |
| d | Class 3A | Class 2A |

Bolts

| Type I | Heavy hex |

Companion Panel

References for subject [MIL-DTL-1222 type IV]

Describing document excerpts.

MIL-DTL-1222
MIL-DTL-1222 (section 3.9.2.2: Type IV diameter and length)
MIL-DTL-1222 (section A.1.2.2: Field 2)
MIL-DTL-1222 (section 1.2.1: Configurations, types and styles)

Choose What I Share

Firefox automatically sends some data to Monzilla so that we can improve your experience.

Spectacle https://swiss.xsb.com/spectacle/faces/index.xhtml#

Apps ⊠ Suggested Sites ☐ Free Hotmail ☐ Web Slice Gallery ☐ Imported From IE ☐ Other bookmarks MIL-DTL-1222 ×    Provide Feedback Action ▾  View ▾  Tools ▾  Help ▾ diameter of the underside of the head, may be accepted if the fracture causing failure originates in the threaded area even if the fracture extends into the fillet or head before separation.

3.5. Decarburization. The threaded portion of carbon and alloy steel studs, bolts and screws shall meet the requirements of SAE J121, class B.

3.6. Protective coating or treatment.

3.6.1. Carbon and alloy steels. When a protective coating is specified (see 6.2), carbon and alloy steel fasteners shall be coated using any one of the following methods: Phosphate type:

Phosphate type:
Phosphate coated: TT-C-490, type I.
Metallic type coatings:
Ion vapor deposited aluminum coating:
MIL-DTL-83488, type II.
Electrodeposited zinc coating: ASTM B 633, type II.
Mechanically deposited zinc coating: ASTM B 695, type II.
Primer:
High zinc silicate:
DOD-PRF-24648, type 1, class 1, compostion B.

3.6.1.1. Grades 8, 4340 and A574. Grades 8, 4340 and A574 fasteners shall not be coated with anodic zinc, metallic aluminum, zinc containing primer, or any other anodic coating, including all coatings in 3.6.1.

3.6.2. Class 3A and class 5 externally-threaded fasteners. Unless otherwise specified (see 6.2), externally-threaded fasteners with class 3A and class 5 threads shall not be coated.

Browser window — MIL-DTL-1222 tab:

screws shall meet the requirements of SAE J121, class B.

3.6. Protective coating or treatment.

3.6.1. Carbon and alloy steels. When a protective coating is specified (see 6.2), carbon and alloy steel fasteners shall be coated using any one of the following methods: Phosphate type:
Phosphate type:
  Phosphate coated: TT-C-490, type I.
Metallic type coatings:
  Ion vapor deposited aluminum coating: MIL-DTL-83488, type II.
  Electrodeposited zinc coating: ASTM B 633, type II.
  Mechanically deposited zinc coating: ASTM B 695, type II.
Primer:
  High zinc silicate: DOD-PRF-24648, type 1, class 1, composition B.

3.6.1.1. Grades 8, 4340 and A574. Grades 8, 4340 and A574 fasteners shall not be coated with anodic zinc, metallic aluminum, zinc containing primer, or any other anodic coating, including all coatings in 3.6.1.

3.6.2. Class 3A and class 5 externally-threaded fasteners. Unless otherwise specified (see 6.2), externally-threaded fasteners with class 3A and class 5 threads shall not be coated.

Companion Panel:

ASTM-B695 (section 3.2: Types) (click to collapse)

ASTM-B695 (section 3.2: Types)

3.2. Types.

Zinc coatings are identified by types on the basis of supplementary treatment required, as follows:

Type I — As coated, without supplementary treatment (Appendix X2.1).

Type II — With colored chromate conversion treatment (Appendix X2.2).

ASTM-B695 (section 6.5.2) (click to collapse)

ASTM-B695 (section 6.5.2)

6.5.2.

On parts with Type II coatings, the greater number of hours for either white corrosion products or rust shall apply. For example, for Labels: 1097, 1011, 1093, 1009, 1035

FIG. 39

Spectacle https://swiss.xsb.com/spectacle/faces/index.xhtml#

Apps ⭐ Suggested Sites ☐ Free Hotmail ☐ Web Slice Gallery ☐ Imported From IE ☐ Other bookmarks Action ▾ View ▾ Tools ▾ Help ▾

Provide Feedback

MIL-DTL-1222 × shall meet the requirements of SAE J121, class D.

3.6. Protective coating or treatment.

3.6.1. Carbon and alloy steels. When a protective coating is specified (see 6.2), carbon and alloy steel fasteners shall be coated using any one of the following methods: Phosphate type:

Phosphate type:
Phosphate coated: TT-C-490, type I.
Metallic type coatings:
Ion vapor deposited aluminum coating:
MIL-DTL-83488, type II.
Electrodeposited zinc coating: ASTM B 633, type II.
Mechanically deposited zinc coating: ASTM B 695, type II.
Primer:
High zinc silicate:
DOD-PRF-24648, type 1, class 1, compostion B.

3.6.1.1. Grades 8, 4340 and A574. Grades 8, 4340 and A574 fasteners shall not be coated with anodic zinc, metallic aluminum, zinc containing primer, or any other anodic coating, including all coatings in 3.6.1.

3.6.2. Class 3A and class 5 externally-threaded fasteners. Unless otherwise specified (see 6.2), externally-threaded fasteners with class 3A and class 5 threads shall not be coated.

3.6.3. Protective coating thickness. Unless otherwise specified (see 6.2), the thickness of

Companion Panel — 1097 before 7 zri, test shall be continued until the 192-h requirement for basis metal corrosion is met ( 8.5.2).
ASTM-B695 (section 6.2.5.1: Colored Chromate Conversion Treatments (Type II)) (click to collapse)
ASTM-B695 (section 6.2.5.1: Colored Chromate Conversion Treatment (Type II))
6.2.5.1. Colored Chromate Conversion Treatments (Type II)
Colored chromate conversion treatment for Type II shall be done in a solution containing hexavalent chromium ions. This solution shall produce a bright or semi- bright continuous, smooth, protective film with a uniform color that is capable of ranging from yellow through bronze and olive-drab to brown and black and that are capable of being dyed to a desired color. Bright dips that do not contain salts that yield films containing hexavalent chromium ions are precluded as treatments for producing Type II coatings.
ASTM-B695 (click to collapse)

Spectacle https://swiss.xsb.com/spectacle/faces/index.xhtml#

⌂ Apps  ⌕ Suggested Sites  ☐ Free Hotmail  ☐ Web Slice Gallery  ☐ Imported From IE  ☐ Other bookmarks Provide Feedback Action ▾  View ▾  Tools ▾  Help ▾

| MIL-DTL-1222 × | ASTM-B695 × | ASTM-B117 × |

3. Classification 3.1. *Classes.* Zinc coatings are classified on the basis of thickness, as follows:

| Class | Minimum Thickness, μm |
|---|---|
| 110 | 107 |
| 80 | 81 |
| 70 | 69 |
| 65 | 66 |
| 55 | 53 |
| 50 | 50 |
| 40 | 40 |
| 25 | 25 |
| 12 | 12 |
| 8 | 8 |
| 5 | 5 |

3.2. *Types.* Zinc coatings are identified by types on the basis of supplementary treatment, as required, as follows:

Type I —As coated, without supplementary treatment (Appendix X2.1).

Type II —With colored chromate conversion treatment (Appendix X2.2).

4. Ordering Information

— 1099

— 1101

Companion Panel

References for subject [ASTM-B695 type II]

Describing document excerpts.

ASTM-B695 (section 8.3.3) (click to collapse)

ASTM-B695 (section 8.3.3)

8.3.3.

Thickness measurements of Type II deposits shall be made after application of the supplementary treatment. The Type II chromate conversion coatings shall be removed from the test area before the thickness is measured. Removal shall be done by using a very mild abrasive (such as a paste of levigated alumina or magnesium oxide) rubbed on gently with the finger.

Note 10. The process by which Type II coatings are produced dissolves a small amount of the zinc. For this reason the thickness requirement to be checked refers to the thickness of the deposit after the application of the Type II coatings.

ASTM-B695 (section X2.2) (click to collapse)

File ▾ | Help ▾

MIL-DTL-1222 ✕

Viewing Options ▸

MIL-DTL-1222
8 December 2000
SUPERSEDING
MIL-DTL-1222 H
21 October 1986

PROVIDE FEEDBACK

DETAIL SPECIFICATION

STUDS, BOLTS, SCREWS AND NUTS FOR APPLICATIONS WHERE A HIGH DEGREE OF RELIABILITY IS REQUIRED, GENERAL SPECIFICATION FOR

Beneficial comments (recommendations, additions, deletions) and any pertinent data which may be of use in improving this document shoudl be addressed to: Commander, Naval Sea Systems Command, SEA 05Q, 2531 Jefferson Davis Hwy, Arlington VA 22242-5160, by using the Standardization Document Improvement Proposal (DD Form 1426) appearing at the end of this document or by letter.

This specification is approved for use by all Departments and Agencies of the Department of Defense.

AMSC N/A                                    FSC 53GP

DISTRIBUTION STATEMENT A  Approved for public release; distribution is unlimited.

ⓘ Suggested Documents
MIL-DTL-38999 21 why?

1. SCOPE

File ▼ Help ▼

MIL-DTL-38999x
XSB-TEST12513x methods: Phosphate

Phosphate type:
    Phosphate coated: TT-C-490, typeI.
Metallic type coatings:
    Ion vapor deposited aluminum coating
    MIL-DTL-83488, type II
    Electrodeposited zinc coating ASTM B633 type II.
Primer:
    High zinc silicate
    DOD-PRE-24648, type 1, class 1, composition B.

3.6.1.1 Grades 8, 4340 and A574, Grade, 4340 and A574 fasteners shall not be coated with anodic zinc, metallic aluminum, zinc containing primer, or any other anodic coating, including all coatings in 3.6.1.

MIL-DTL-1222 (section 3.6.3: Protective coating thickness) (click to collapse)

MIL-DTL-1222 (section 3.6.3: Protective coating thickness) (click to collapse)
You do not have permission to view this document segment
Click here to obtain access ASTM-B695 (section 3.2:Types) (click to collapse)

PROVIDE FEEDBACK      Viewing Options ▶

SYSTEMS AND METHODS FOR CREATING, EDITING, STORING AND RETRIEVING KNOWLEDGE CONTAINED IN SPECIFICATION DOCUMENTS

CROSS-REFERENCE TO RELATED APPLICATIONS

This application claims the benefits of U.S. provisional application No. 61/746,730, filed Dec. 28, 2012, entitled A DIGITAL MODEL FOR STORING AND DISSEMINATING KNOWLEDGE CONTAINED IN SPECIFICATION DOCUMENTS.

This application claims the benefit of U.S. provisional application No. 61/889,180, filed Oct. 10, 2013, entitled SYSTEMS AND METHODS FOR CREATING, EDITING, STORING AND RETRIEVING KNOWLEDGE CONTAINED IN SPECIFICATION DOCUMENTS.

This application claims the benefit of and is a continuation-in-part of U.S. application Ser. No. 13/795,140, filed Mar. 12, 2013, entitled A DIGITAL MODEL FOR STORING AND DISSEMINATING KNOWLEDGE CONTAINED IN SPECIFICATION DOCUMENTS.

This application is related to co-owned U.S. Pat. No. 7,542,958 issued Jun. 2, 2009, entitled METHODS FOR DETERMINING THE SIMILARITY OF CONTENT AND STRUCTURING UNSTRUCTURED CONTENT FROM HETEROGENOUS SOURCES, the complete disclosure of which is hereby incorporated by reference herein.

GOVERNMENT RIGHTS

Pursuant to SP4703-13-D-0001 and SP4703.13.D.5801.0002, the United States Government may have some restricted rights in technology described herein.

COPYRIGHT

A portion of the disclosure of this patent document contains material which is subject to copyright protection. The copyright owner has no objection to the facsimile reproduction by one of the patent disclosure, as it appears in Patent and Trademark Office patent files or records, but otherwise reserves all copyright rights whatsoever.

BACKGROUND OF THE INVENTION

Field of the Invention

This invention relates broadly to methods and apparatus for mining data and reorganizing it. More particularly, this invention relates to acquiring data from "specification documents" (or other interlinked documents) and organizing the data in a readily searchable and accessible database.

State of the Art

Standard specifications are published by various agencies and organizations around the world, including ASTM (American Society for Testing and Materials), ANSI (American National Standards Institute), ISO (International Organization for Standardization), etc. Design engineers use these standard specifications when choosing parts and components of products.

Standards are typically published as documents, e.g. Adobe PDF or MS Word documents which are cumbersome to access. Finding specific information in a collection of these documents can be difficult. For example, an initial keyword search of the ASTM specification library based on the keywords STEEL, HEX, and BOLT produces a set of 71 specification documents. A preliminary review of the titles of these 71 documents reveals that: 16 of these documents describe properties of specific types of threaded steel fasteners where bolts were included in the scope of the document. Another 13 documents address testing, inspection, or installation procedures for bolts and are often referenced by the previous 16. The remaining 42 documents are for nonferrous fasteners, threaded fasteners that are not bolts, or procedural specifications such as "Standard Specification for Construction of Fire and Foam Station Cabinets," where the search keywords are only incidental to the scope of the specification document.

SUMMARY OF THE DISCLOSURE

The Digital Model

An object of the invention is to convert standards specifications from documents into an ontology based digital model (OBDM). Thus, the knowledge contained in a specification is reorganized into a structure that allows automated dissemination of that knowledge in response to user needs. Therefore, the invention also provides an interface to query the ontology via a database. The interface may be a human user interface or a machine-to-machine interface.

The first step in creating an ODBM is to extract a digital structured syntactic textual model of the document from the original PDF, MS Word, or other document format. This syntactic model is expressed as an RDF (Resource Description Framework) database that contains structured information on document sections, tables, cross-references, and other syntactic elements. An ontology directed extractor is then used to analyze the textual portions of the document (e.g. titles, paragraphs, tables, etc.) to extract semantic properties of the digital model to be stored in the database. For retrieval of the model data, an XML (extensible markup language) representation of the digital model is created in response to user queries. An XLST (extensible stylesheet language transformations) style sheet can be used to interpret and display information from the model for the user's context (query).

The tool used to extract the initial syntactic model from the original document includes a plurality of annotators and data transformers. A text converter reads the text from the specification document while preserving the text font, size, and positioning information. The information is then used to recognize sections, tables, and other structural components of the document. The syntactic information is then saved as an XML file. Using the XML file, another program generates RDF "triples" containing facts about the document structure which can then be stored in a database and queried.

The contents of the database are then subjected to ontology directed extraction. This process includes a combination of data transformation, ontology based knowledge processing, and ontology based schema definition. The ontology based schema definition includes a specification ontology defining the meaning of components that make up a specification document. The definition controls the extractor which extracts and transforms data from the syntactic data store by identifying sections of text as class or attribute references, classifying class references to specific class objects in an ontology, and extracting and standardizing attribute references to object attributes using the class of the object for the context of extraction. The transformed data is stored in a database of class objects making up the digital specification models. The three basic classes of information that are stored are Subjects, Requirements, and Governing Authorities.

The User Interface

The user interface is preferably a web-based interface and relies on XML and XSLT. The user submits a query that includes a specification and a context. The context is used to select a particular XSLT style sheet that is used to display the results of the query. The specification request and context are used to generate a query to the database for specific components of the digital model. The digital model components returned by the query are translated into an XML document that is displayed using the selected style sheet.

The context and style sheets allow a designer to see the specification information required for selecting a part in the context of design constraints, a maintenance engineer to see the procedures necessary to repair or replace an item covered by the specification, and a purchasing manager to see a view of information necessary to order a part that met the specification requirements. Queries can be based on part properties or on part numbers. In the case of a machine-to-machine interface, existing tools such as XML can be used.

A User (Access and Navigation) Guide shows how syntactic and semantic links can be followed between documents and how transclusion can be used to bring sections from multiple documents together in a tailored composition. A Transclusion Guide shows examples of creating specific custom compositions using the transclusion features of the invention where portions of different documents are dynamically linked into a composition eliminating the need for any re-entry of information and providing for automatically updating of the composition whenever a source document is updated. Source documents are always easily identified and accessible.

Additional objects and advantages of the invention will become apparent to those skilled in the art upon reference to the detailed description taken in conjunction with the provided figures.

BRIEF DESCRIPTION OF THE DRAWINGS

FIG. 5 is a screen shot of a portion of a technical document;

FIG. 6 is a screen shot of a portion of the annotated text file corresponding to the document of FIG. 5;

FIGS. 7 through 10 are screen shots of portions of a specification document;

FIGS. 13 through 31 are screen shots illustrating one embodiment of a user interface according to the invention;

FIGS. 32 through 53 are screen shots illustrating an embodiment of an editing user interface according to the invention;

FIGS. 58 through 60 are screen shots illustrating an embodiment of sharing functions according to the invention;

DETAILED DESCRIPTION

The Digital Model

Figure 1:
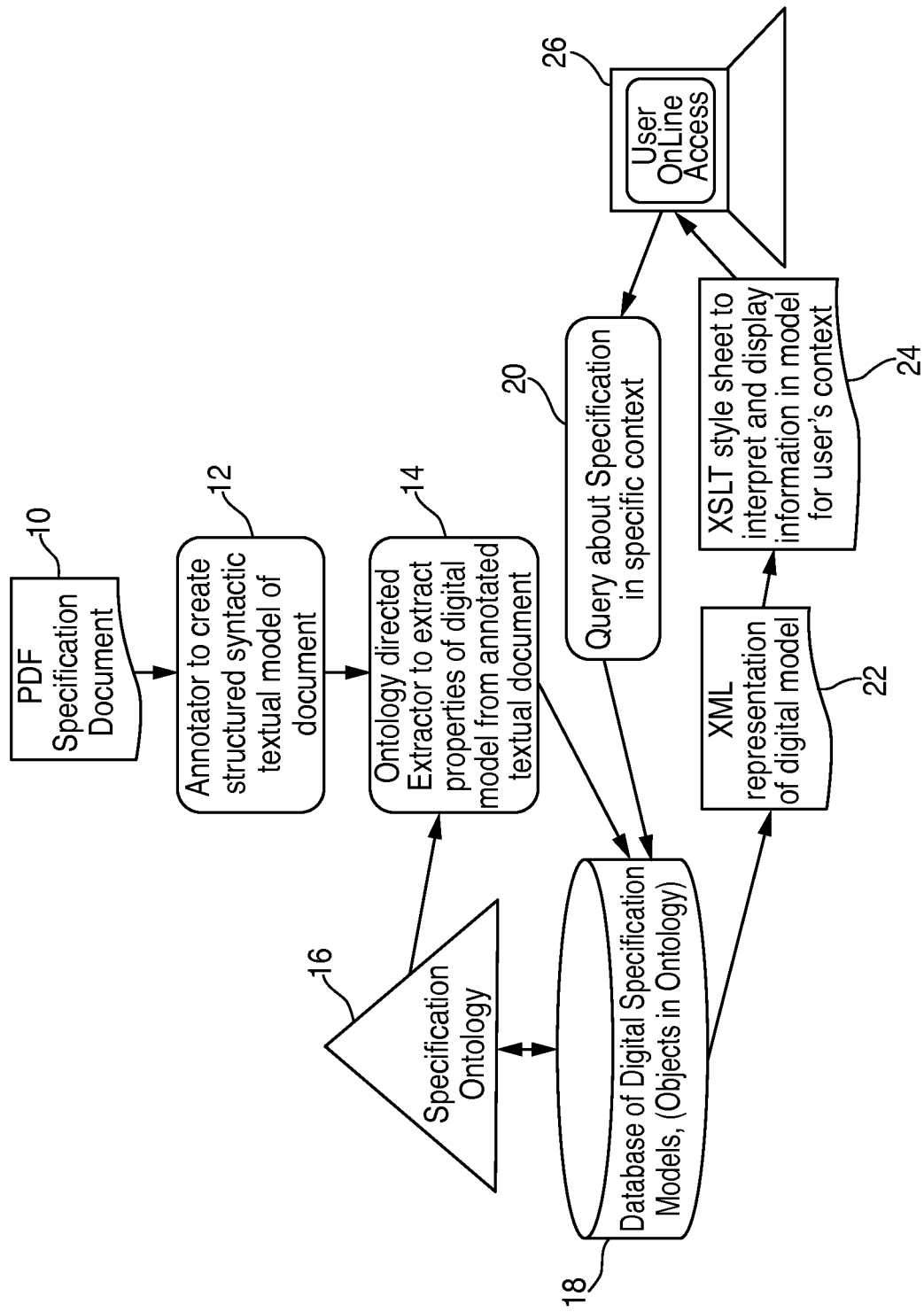
FIG. 1 is a high level schematic overview of a system according to the invention.

The ontology framework according to the invention provides a structure that can be used to represent all information in specifications. The ontology contains three major types of classes of objects: 1. Governing Authorities, 2. Subjects, and 3. Requirements.

Definitions

Governing Authorities include all documents, specifications, rules, regulations, bodies, etc. that provide authoritative guiding information. The most common example of a governing authority is a specification document. A governing authority is thought of as a set of numbered statements, or assertions, the assertions made by the authority, i.e., those appearing in the document. So a specification document is thought of as the set of sentences in the document. A section of a specification document is the set of sentences in the section, and so is a subset of the full specification. A paragraph in a section is a subset of the sentences in that section. So there is a taxonomy of governing authorities based on the sentences in the authority; the node for a section of a specification is a child of the node for the specification, and a node of a paragraph is a child of the node for the section it is in. A property of this taxonomy is that any assertion made in a node is also made in its parent node. E.g. any assertion made in a paragraph is made in the section containing that paragraph. Examples of a governing authority include MIL-C (Military Specification-C) and ASTM (American Society for Testing and Materials).

Subjects are the objects that are described or defined by a governing authority. For example, if a specification describes circuit breakers, then the set of circuit breakers is the subject of that specification. Many specifications describe parts, and so classes of parts are in the subject taxonomy. Specifications may also describe materials, or tests, or processes, so sets of these things would also appear in the subject taxonomy. The subject taxonomy is structured by subset: e.g., a node representing a set of parts is a child of a node representing a superset of those parts. Subjects may include attributes such as: component structure, parts, materials, manufacturing process, ordering process, packaging process, regulations, test methods.

Requirements represent the constraints that a governing authority asserts that their subjects must satisfy. For example, a circuit breaker specification may say that a particular class of circuit breakers must be able to operate at temperatures between −50 and +80 degrees Celsius. This property is a requirement. One can think of a requirement as being the set of all things that satisfy that property. So the property of "being able to operate at temperatures between −50 and +80 degrees Celsius" can be thought of a representing the set of all things that can operate in that temperature range. Requirements may include attributes such as: component requirements, manufacturing requirements, ordering requirements, packaging requirements, regulatory requirements, testing requirements.

In order to represent specification knowledge fully, it is desirable to specify relationships among the concepts of 1. Governing Authorities, 2. Subjects, and 3. Requirements. This is advantageously done by adding attributes (or properties or relationships) for classes and the elements in the classes. For example, it may be able to say that a set of parts is governed by some part of a specification document. One can do this with a "governedBy" attribute that maps subjects to governing authorities. A particular class of subjects is governed by a particular section of a document, or perhaps a whole document. For example, there is a particular class of circuit breakers that are the subject of the specification MIL-C-55629, so that class has a "governedBy" attribute with the value of MIL-C-55629.

Particular requirements are specified by sections (or paragraphs, or sentences) within documents. This is captured by an attribute of requirements, called "describedIn", whose value is the particular governing authority (spec, section, paragraph, or whatever) in which that requirement is described. For example Paragraph 3 of Section 5.2 of specification MIL-C-55629 might describe the requirement that the subject must be able to operate in a temperature range of −50 to +80 degrees Celsius. So this knowledge would be represented by a "describedIn" attribute mapping that temperature requirements node in the requirements taxonomy to that paragraph/section of MIL-C-55629 is the governing authority taxonomy.

It is also desirable to capture the information that a particular set of subjects meets a particular requirement, e.g. that a particular set of circuit breakers actually meets the requirement of being able to operate in the specific temperature range. This can be done with a "meets" attribute, which maps a class in the subject taxonomy to a requirement. (saying that all the parts in a subject class meet the requirements specified by a requirements class is the same as saying that the subject class is a subclass of the requirements class; that is, the set of objects in the subject class is a subset of all the objects that satisfy the requirement.)

Conversion

The following example shows how the information concerning the operating temperature range of circuit breakers would be represented in an ontology according to the invention. The three taxonomies of the ontology are the Governing Authorities, the Subjects, and the Requirements. In this case the hasOpTemp attribute (for has-operating-temperature) is used to define the desired temperature range. The set of these attributes is somewhat open ended and will depend on the form of requirements specified in the governing document. But note that the only connections from the Subject taxonomy to the Governing Authority taxonomy are labeled "governedBy"; the only connections from the Requirement taxonomy to the Governing Authority taxonomy are labeled "describedBy"; and the only connections from the Subject taxonomy to the Requirement taxonomy are labeled "meets". There may be many differently labeled connections from the Requirement taxonomy to the Subject taxonomy. These are attributes needed to define the requirements. Preferably, the Subject taxonomy contains all targets of attributes required to define requirements. In the present example, the node that represents all Celsius temperatures greater the −50 degrees is placed in the subject taxonomy. Another example might be that a part be made of a particular alloy of steel, which may be specified using an attribute "isMadeOf" that maps that requirement node to a node representing that particular alloy. That node would be in a taxonomy of materials, which would also be a sub-taxonomy of the Subject taxonomy. This is reasonable since there are specifications that describe properties of materials, and to represent the information in those material specs, the material taxonomy ought to be included in the Subject taxonomy.

There is one other kind of connection, one which goes from the Governing Authority taxonomy back to itself. This connection (attribute) captures the knowledge that some part of a governing document refers to another part of a governing document. For example Section 5.2 of MIL-C-55629 might refer to another specification on materials, such as the ASTM A116 specification. (It might refer to another section within the same document.) The invention uses an attribute named "references" to capture this knowledge.

Turning now to FIG. 1, a PDF document 10 is fed to an annotator (alternatively conversion, see FIG. 2A) tool 12 that is used to create a digital structured syntactic textual model of the document. This model is preferably stored as an RDF (see FIGS. 2A and 3A). An ontology directed extractor 14 is then used to extract properties of the digital model based on a specification ontology 16 to be stored in a database 18. An XML representation 22 of the digital model is created in response to user queries 20 from an access point 26 and an XLST style sheet 24 is used to interpret and display information from the model for the user's context (query) at the access point 26. The access point is typically a computer having a keyboard and display but could also be a smart phone or other suitable device. It may be located local to the database or remotely located and communicate with the database via a communications link or network. The access point could also be a program running on a computer that automatically generates queries based on its program logic without the intervention of a human operator. This would be a machine-to-machine implementation.

In order to facilitate the conversion of documents to a linked data model, the invention has developed a "common" XML schema. An example of the schema is provided in APPENDIX I, below. The focus of this schema, shown in the APPENDIX I, is the logical structure of the document, rather than display or format considerations. Many tags allow an "id" attribute, which should be unique within the document. Certain other elements can refer back to these via "rid" attributes. If the documents are being converted to XML from RDF, the values of these attributes are the URIs (uniform resource identifiers) corresponding to the elements described in APPENDIX II, below. At present, all plain text is enclosed in "text" element (i.e. there is no "mixed content" where tags are mixed in with plain text). Some tags below are listed as containing "text block" information. This means the child nodes are a combination of "text", "reference", "br", "footnotereference", "docdeclare", and "matheq" elements.

The root node in this schema is "spec". It must contain a "head" and a "body" element, and can optionally contain "footnotes", "tables", and "figures" elements (no more than one of each). The "head" element contains information on spec designation, title, publication date, etc (more details below). The body element contains a "sections" element and an optional "testmethods" element. The "sections" element can contain one or more "section" elements. Each section element contains a title (optional), and some combination of "para", "list", "table", or "matheq" elements, followed by zero or more "section" elements. Note that subsections cannot be mixed with other section content, they have to appear at the end. The "tables" element will contain "numbered tables", and does not preclude the presence of inline tables that appear in the flow of the document.

Annotation

Figure 2:
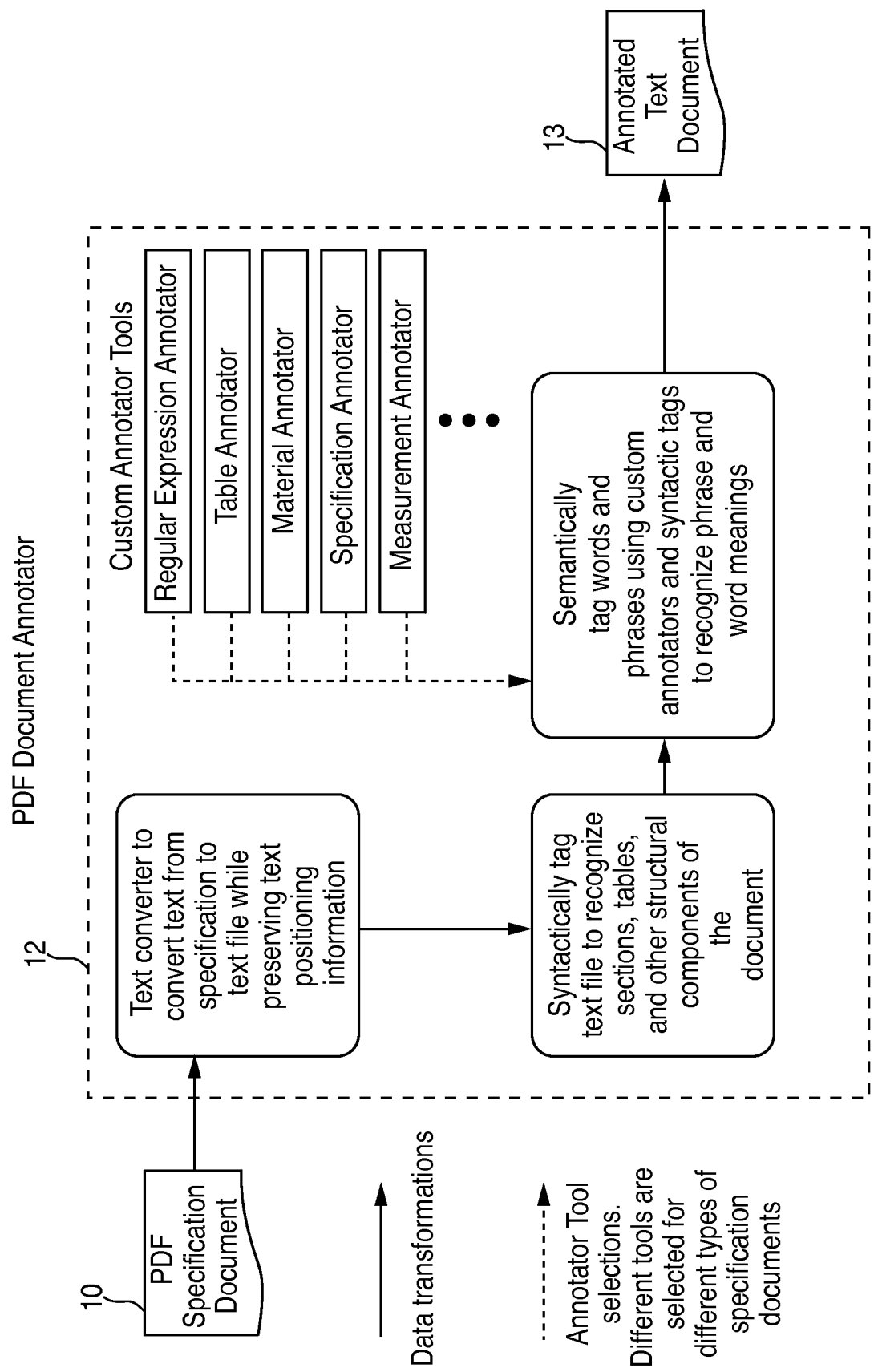
FIG. 2 is a high level schematic overview of a PDF document annotator according to the invention.

FIG. 2 illustrates the annotator tool 12 in more detail. The PDF annotator tool 12 includes a plurality of annotators and data transformers. A text converter converts text from the specification document to a text file while preserving the text positioning information. The text file is then syntactically tagged to recognize sections, tables, and other structural components of the document. Words and phrases are then semantically tagged using custom annotators. Annotators may include a regular expression annotator, a table annotator, a material annotator, a measurement annotator, etc. The syntactic tags are then used to recognize word and phrase meanings. The result is an "annotated text document" 13.

Text conversion from PDF to "position preserving" text can be accomplished using a variety of commercially available tools such as the Apache open source PDFBox Java Library, or iText Software's open source Java library called iText. Syntactic tagging of text can be accomplished with custom Java software that makes use of the text position data produced by the PDFBox library. Semantic tagging of text can be accomplished with Apache open source UIMA library. The custom annotators are custom Java annotators integrated into UIMA that either recognize specific semantic patterns or wrap ontology based prolog extraction processes.

Figure 2A:
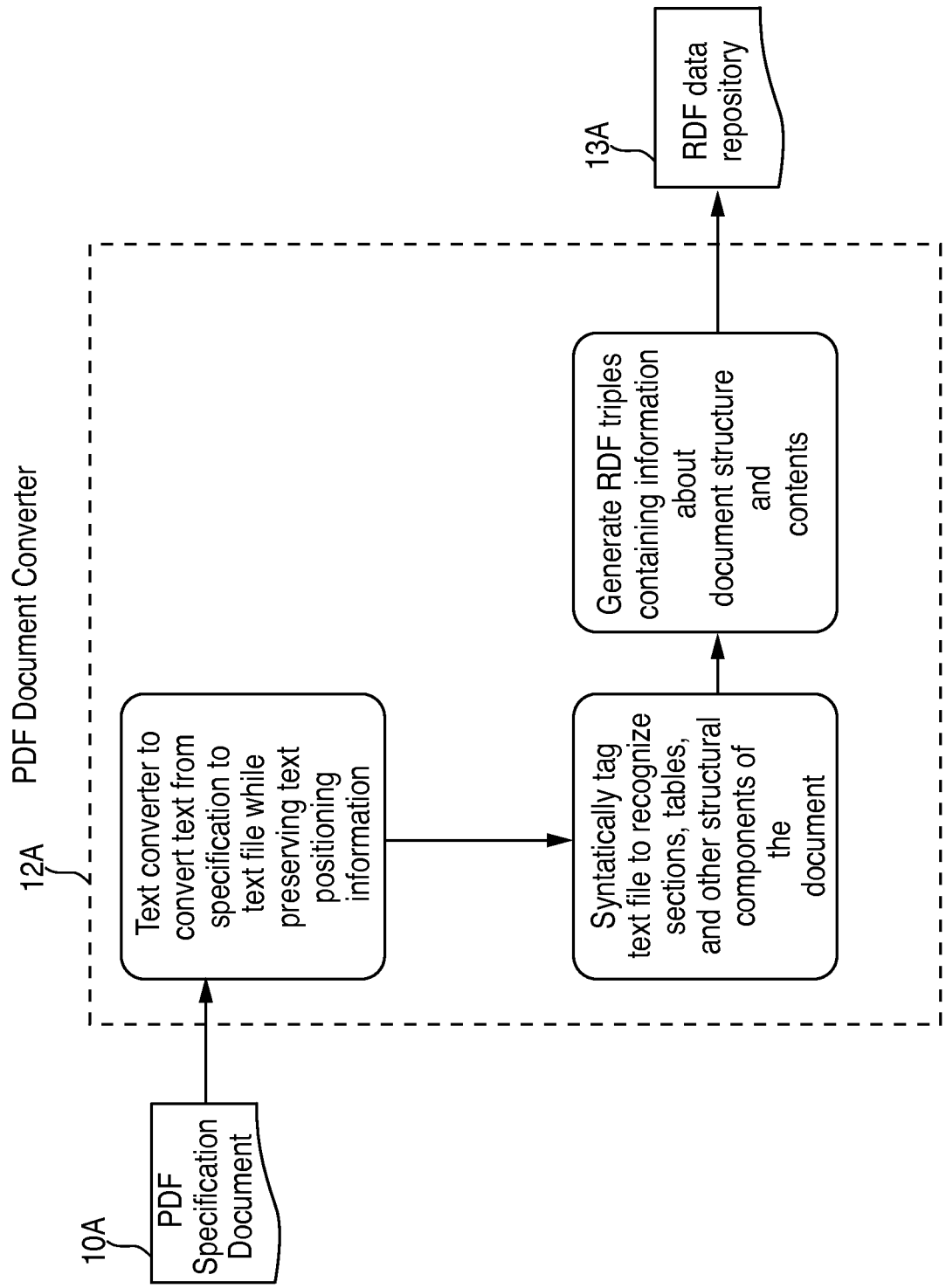
FIG. 2A is a view similar to FIG. 2 but showing a "document converter" in lieu of the "annotator described in FIG. 2.

FIG. 2A shows an alternate (and presently preferred embodiment) utilizing a "document converter" rather than a "document annotator". The same PDF specification, here labeled 10A is fed to the converter tool 12A that is used to create a digital structured textual model of the document stored as and RDF data repository 13A. The text conversion and syntactic tagging are the same, but the annotator tools are eliminated and rather than semantic tagging, the converter generates RDF triples containing information about document structure and contents. These are then output to an RDF data repository 13A.

Extraction

Figure 3:
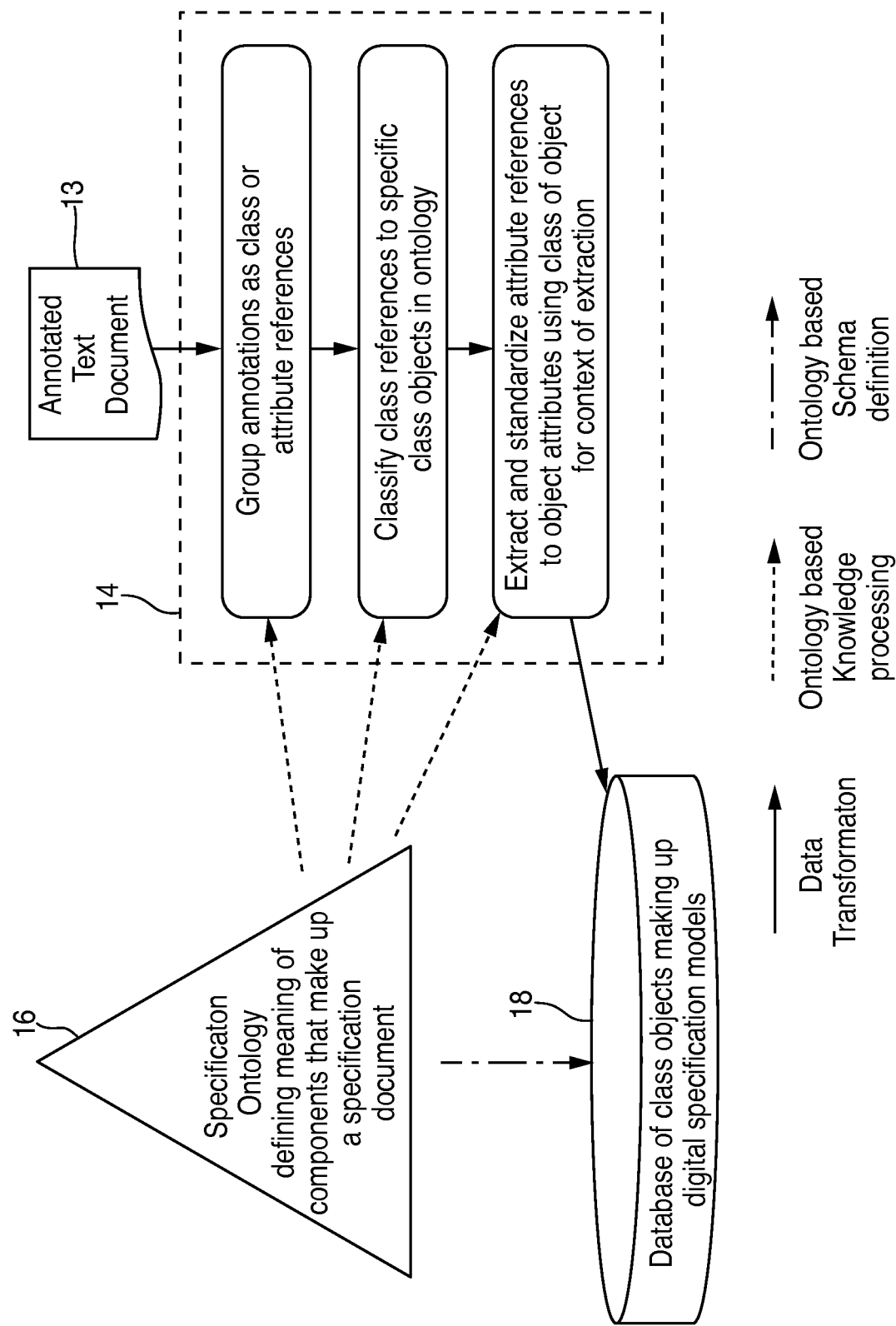
FIG. 3 is a high level schematic overview of an ontology directed extractor according to the invention.

FIG. 3 illustrates more details regarding the ontology directed extractor 14. The annotated text document 13 is subjected to ontology directed extraction 14. This process includes a combination of data transformation, ontology based knowledge processing, and ontology based schema definition. The ontology based schema definition includes a specification ontology 16 defining the meaning of components that make up a specification document. The definition controls the extractor 14 which transforms data from the annotated text document 13 by grouping annotations as class or attribute references, classifying class references to specific class objects in an ontology, and extracting and standardizing attribute references to object attributes using the class of the object for the context of extraction. The transformed data is stored in a database 18 of class objects making up the digital specification models.

The type of annotation (class or attribute) is determined by the type of annotator that created it. The classification of class references is accomplished with the XSB Ontology Directed Classifier. (See U.S. Pat. No. 7,542,958) The extraction of attribute references is accomplished with the XSB Ontology Directed Extractor. (See U.S. Pat. No. 7,542, 958) The output of the extraction uses SQL to input objects and their attributes into the database. The Ontology Schema is managed using the XSB CDF Ontology Management framework. (See U.S. Pat. No. 7,542,958.)

Figure 3A:
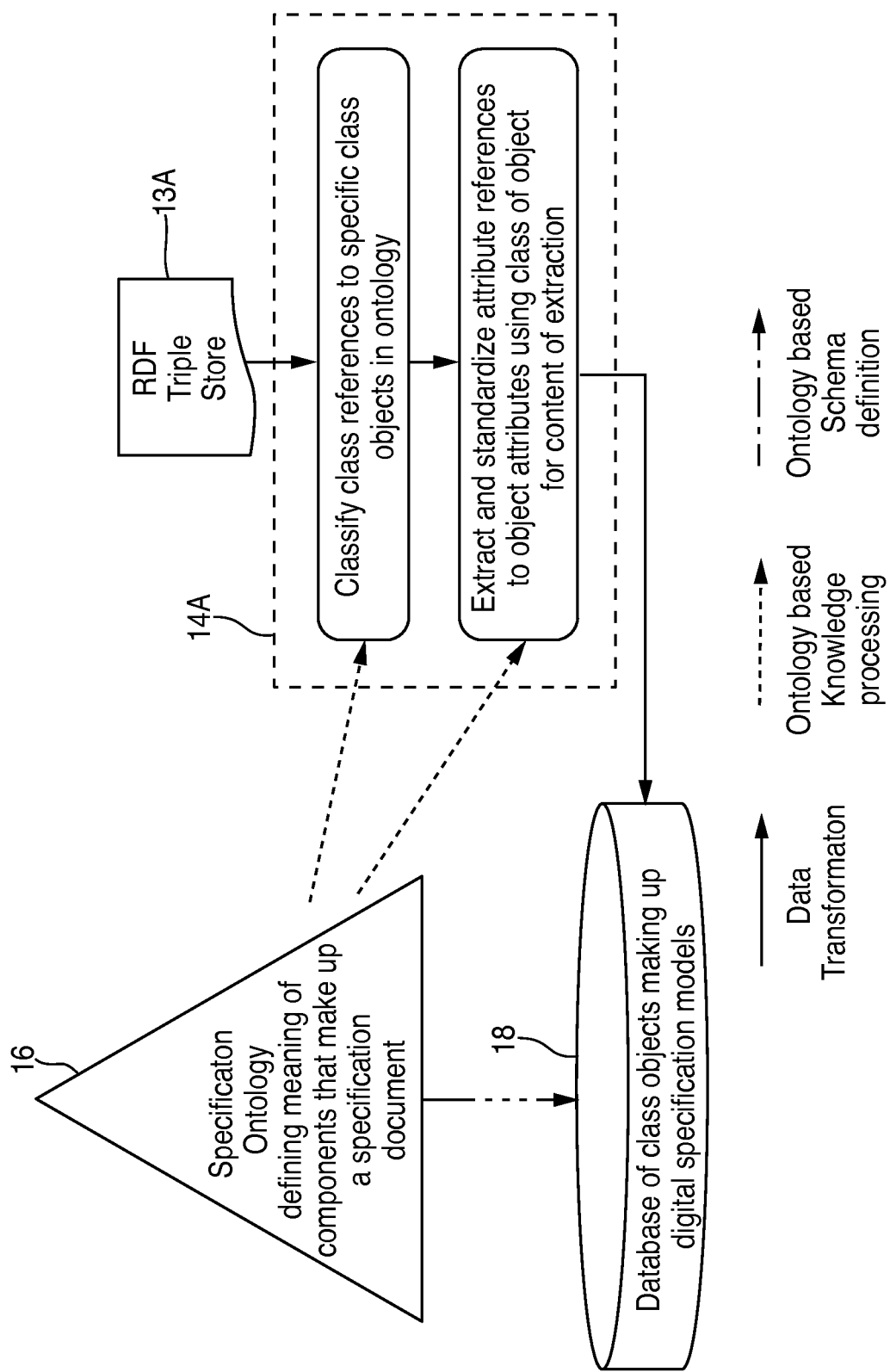
FIG. 3A is a view similar to FIG. 3 but showing the extractor utilizing the RDF data provided by the converter of FIG. 2A.

FIG. 3A shows an alternate (and presently preferred) embodiment. In FIG. 3A, the specification ontology 16 and database of class objects 18 are the same as in FIG. 3. Here, however, the extraction begins with the RDF Triple Store 13A.

The RDF repository (triple store) 13A contains the original specification document encoded as specific text objects and syntactic relations between these text objects. Each text object is a specific statement, usually at the sentence or table row level, contained in the original document. Syntactic relations between text objects indicate how text objects relate to each other in the document.

Each text object is subjected to ontology directed extraction 14A. This process includes a combination of data transformation, ontology based knowledge processing, and ontology based schema definition. The ontology based schema definition uses a specification ontology 16 to define the meaning of components that make up a specification document. The definition controls the extractor 14A which transforms text objects from the RDF Triple Store 13A by classifying the text object to a subject class in the specification ontology 16 and extracting and standardizing object attributes using the class of the text object for the context of extraction. The transformed text object is stored in a database 18 of class objects with their associated attributes making up the digital specification models. Each class object in the database is thus a representative of the specification ontology class using the ontology based schema definition.

User Interaction

Figure 4:
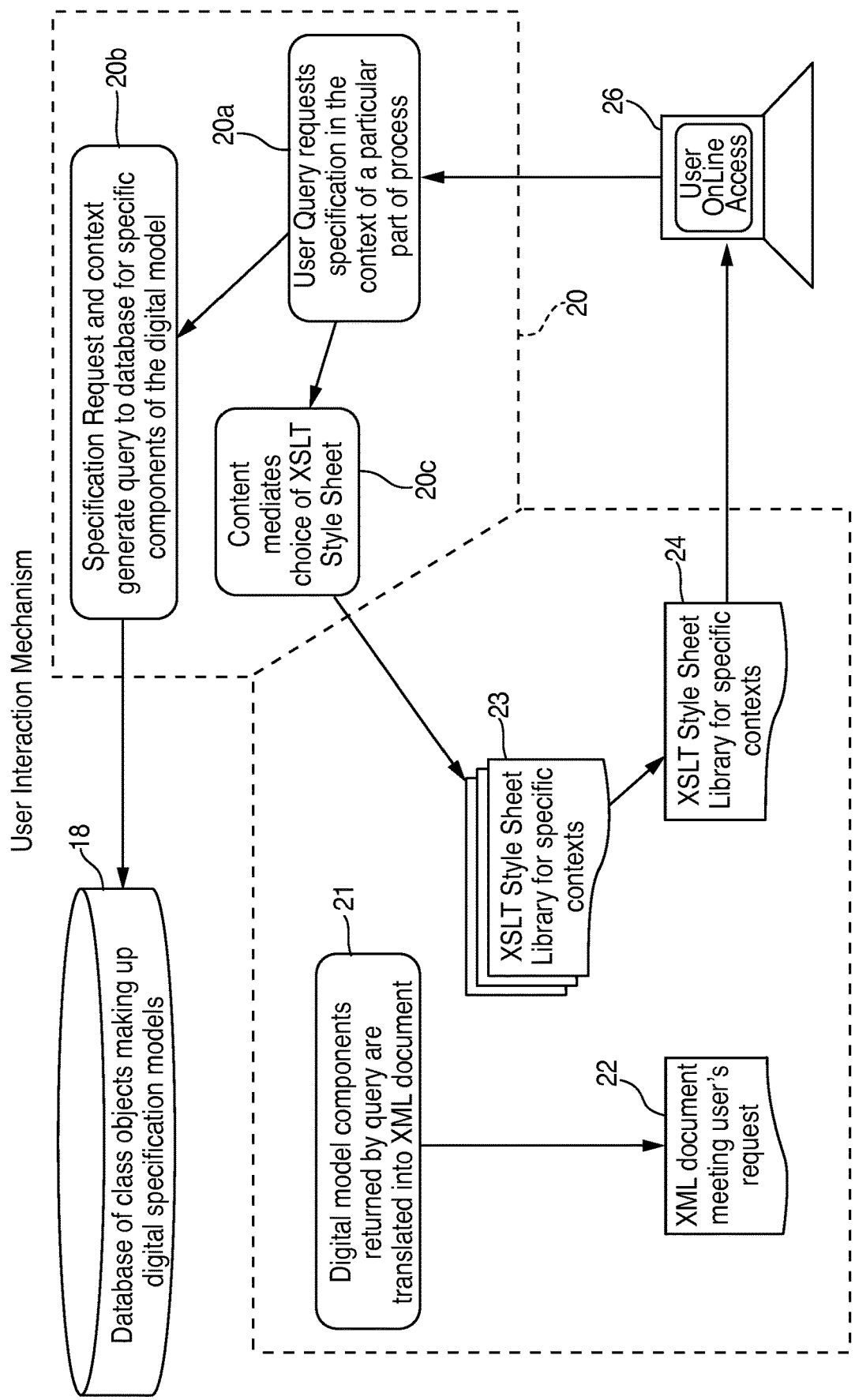
FIG. 4 is a high level schematic over view of a user interface according to the invention.
Figure 7:
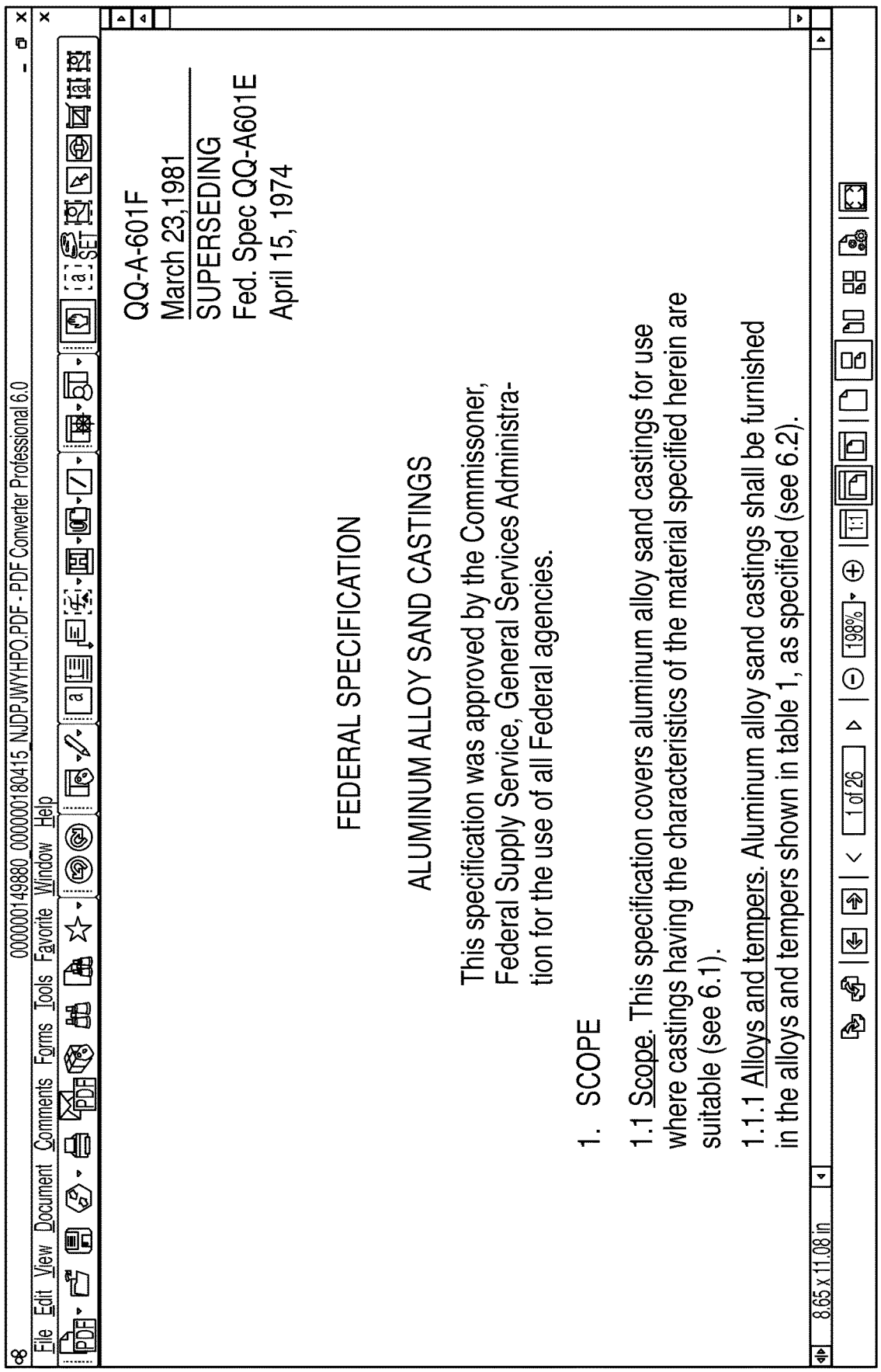

FIG. 4 shows how a user interacts with the system. The user interface is preferably a web-based interface and relies on XML and XSLT. The user submits a query 20 which includes one or more specifications and a context 20a. The specification request and context are used to generate a query 20b to the database 18 for specific components of the digital model. The context is also used to select 20c a particular XSLT style sheet that is used to display the results of the query. The digital model components returned by the query are translated at 21 into an XML document 22 which is displayed at 24 using the style sheet selected at 20c from a library of style sheets 23.

The queries from users can be implemented as web services called from the user's web browser using the Restful Public Architecture Specification. The specification request to the database is a query triggered by the web service. Context mediation chooses XSLT stylesheets based on context supplied by the web service. Digital model components are the query results translated into XML representations of relevant parts of the specification. The web server uses the selected stylesheet to display the XML representation to the user's browser.

The web service can alternately be called directly by a software program running on a remote machine and will return the XML output directly to the calling program. This implementation of the invention represents a direct machine-to-machine application of the digital specification model.

The context and style sheets allow a designer to see the specification information required for selecting a part in the context of design constraints, a maintenance engineer to see the procedures necessary to repair or replace an item covered by the specification, and a purchasing manager to see a view of information necessary to order a part that met the specification requirements. Queries can be based on part properties or on part numbers.

Specific Example

Figure 6:
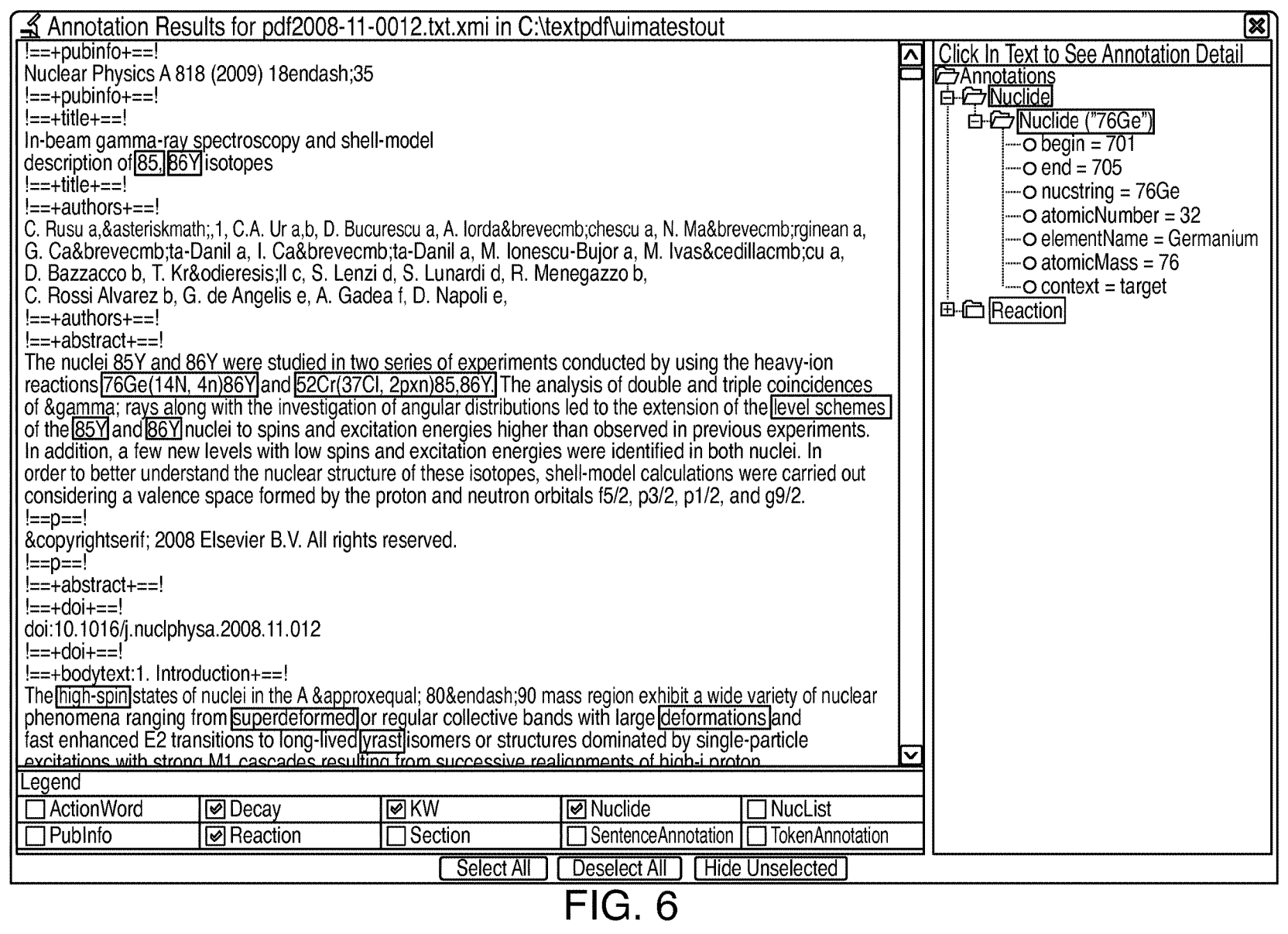

The system and methods of the invention are particularly aimed at specification documents but can also be used to store and disseminate most any kind of knowledge. FIG. 5 shows a portion of a technical paper and FIG. 6 illustrates how that paper is converted into an annotated text document using the methods of the invention. Highlighted portions of the document on the left hand side of FIG. 6 are extracted according to an ontology that includes, in this example, "decay", "reaction", "KW", "nuclide", etc. These "annotations" are listed in hierarchical format on the right hand side of FIG. 6.

Figure 11:
FIG. 11 is a flow chart illustration of the text extraction and annotation process.

FIGS. 7-10 illustrate portions of Federal Specification QQ-A-601F regarding Aluminum Alloy Sand Castings. FIG. 11 shows how the knowledge from the specification is extracted and converted into an annotated text document. Text is mined to infer properties for a part represented by a Federal National Stock Number (NSN). NSNs are assigned to most items purchased by the US Department of Defense. Properties of NSNs are cataloged as technical characteristics. The properties appropriate for a given type of part are defined in Federal Item Identification Guides (FIIGs). FIG. 11 shows technical characteristics for an NSN corresponding to a Gun Sight Mount. From the TEXT characteristic "GENERAL CHARACTERISTICS ITEM DESCRIPTION" text extraction extracts specification QQ-A-601, Alloy 356.0, and Temper T6. From the title of QQ-A-601 (FIG. 7) it is inferred that the part is Aluminum and a Sand Casting. From Table II in QQ-A-601 (FIG. 8) the chemical composition of Aluminum Alloy 356.0 is inferred. From Table III in QQ-A 601 (FIG. 9) it is inferred that the material, Aluminum Alloy356.0 with temper T6 has mechanical properties, 30,000 psi tensile strength, 20,000 psi yield strength, and 0.0039 in/in extension under load.

The OBDM

Figure 12:
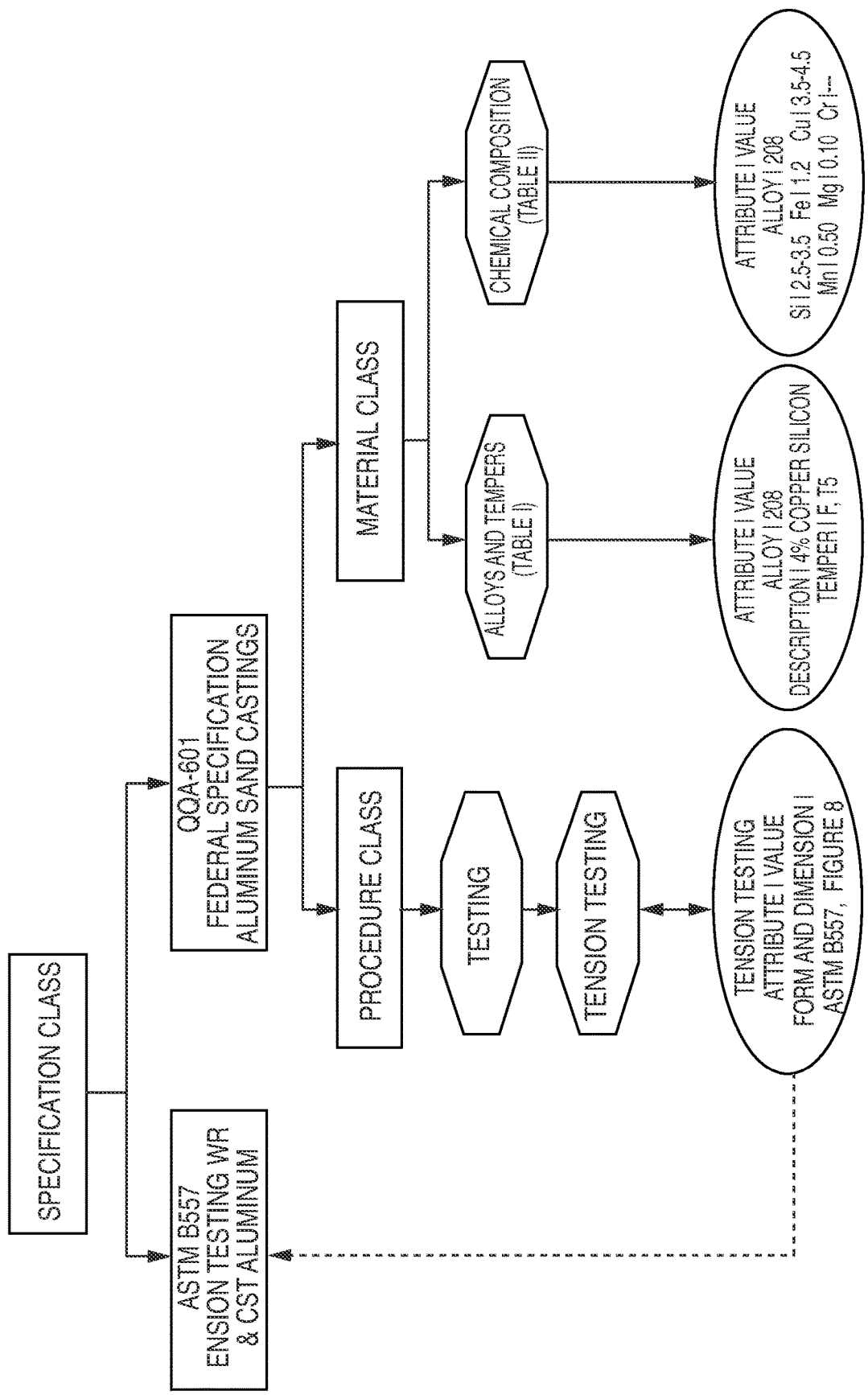
FIG. 12 is a diagram of a portion of an OBDM.

FIG. 12 illustrates how portions of the QQ-A-601F specification are organized in an OBDM (ontology based digital model) according to the invention. The SPECIFICATION CLASS includes reference to the relevant specifications. In this simplified example, the SPECIFICATION CLASS includes references to external specifications found in the document QQA-601. Here, for simplicity, only one is shown, ASTM B557.

The specification class QQA-601 is subdivided into the PROCEDURE CLASS and the MATERIAL CLASS.

THE PROCEDURE CLASS includes all of the procedures (and processes) in the specification. For simplicity, only the Quality Assurance branch of the model is shown. This branch has several sub-classes. The last sub class is TENSION TESTING; this sub class references the ASTM specification that is a member of the SPECIFICATION CLASS above. There is a secondary relation between the TENSION TESTING sub class and the ASTM instances in the SPECIFICATION CLASS. Note that these TENSION TESTING instances reference specific figure in the ASTM document. This would be linked data in a semantic technology model.

The MATERIALS CLASS illustrates primary relations that trace directly to tables in the document. The actual cells in the table are linked data in the semantic model. Here, for simplicity, only portions of two tables are shown: the ALLOYS AND TEMPERS (TABLE I) and the CHEMICAL COMPOSITION (TABLE II). Table I includes three attributes, each having a value, i.e. alloy: 208, description: 4% copper silicon, temper: F, T5. Table II includes seven attributes, each having a value, i.e. alloy: 208, Si: 2.5-3.5, Fe: 1.2, Cu: 3.5-4.5, Mn: 0.50, Mg: 0.10, Cr.

The Ontology Based Digital Model can be defined using a public domain ontology definition language such as OWL/ RDF. The Web Ontology Language (OWL) is a family of knowledge representation languages for authoring ontologies. The languages are characterized by formal semantics and RDF/XML based serializations.

A presently preferred language for constructing the OBDM is illustrated in APPENDIX II, below, which includes both syntactic and semantic vocabulary classes and properties. As used herein, the term "SWISS" is used to describe the ontology (as well as the invention in general), as in the Swiss Ontology. SWISS™ is an acronym, coined by the applicant that means "semantic web for interoperable specs and standards". SWISS™ is a trademark of the applicant for an online service implementing the invention described herein as well as related goods and services. For convenience the SWISS™ ontology is separated into two components: the syntactic ontology and the semantic ontology. The syntactic ontology models the documents themselves, which consist of titles, sections, paragraphs, tables, figures, etc.; essentially words. The semantic ontology models the concepts that are talked about in Specs and Standards; e.g., connectors, testing methods, and plating processes.

Syntactic Ontology

There are several semantic web vocabularies that provide ways to treat documents as resources, and to associate metadata such as author, publisher, and format with those resources. However, in order to create an interoperable digital specification library, the invention creates a "syntactic" model that treats subdivisions of a specification document as resources. These subdivisions may include sections and subsections, tables and table constituents (rows, cells), lists and list items, footnotes, and paragraphs.

The SWISS™ vocabulary provides several advantages: It allows direct references where they are given explicitly in a document (e.g., to tables or sections). It allows the efficient retrieval of specific document divisions associated with specification requirements and other semantic concepts. This is particularly useful in applications that draw on information from several documents (as explained by example below with reference to The User Interface). When the semantic model is being built, information about the structural subdivisions and their relationships play a role in helping to guide extraction and classification.

One of the difficulties in expressing rich documents, and being able to reconstruct a reasonable facsimile of the original document, is the necessity to maintain some information about formatting, hyperlinking, and semantic relationships. For example, whether text is bold or italicized, superscripted or subscripted, or if a certain portion of text refers to a specified topic. In order to accomplish this, the invention uses a text container class, that has an attribute pointing to the literal, unadorned string, along with a collection of annotations that describe formatting and linking information. This means that when it is desirable to indicate that a document or section has a title, the invention is pointing to a complex resource rather than a string literal, so it can't directly apply the dcterms:title predicate. Instead, it points to a resource of type cnt:ContentAsText, which then points to the literal string using the cnt:chars predicate. The invention can infer the dcterms:title property to be this literal.

Semantic Ontology

The semantic ontology contains classes and predicates that model the content of Specs and Standards, i.e., their meaning. At an abstract level, the semantic ontology describes the classes of things that Specs talk about, the constraints imposed on those things, and where in a Spec document those constraints are described. There are two kinds of classes that make up the semantic ontology, called Subject classes and Requirements classes. Subject classes model sets of things that are (or could be) described in Specs and Standards. Requirement classes model requirements (or constraints) imposed on Subject classes, i.e., requirements that things in a subject class must satisfy.

The subject taxonomy has several major subsections, which are identified by immediate subclasses of the root Subject class. These Subject classes correspond to the major different kinds of things used and defined in Specs. Currently proposed such classes include: Parts, Testing Methods, Manufacturing Processes, Environments, Materials, and others. The complete details of these sub-ontologies are not specified in the SWISS™ standard. For example, the Part sub-ontology could be based on the UNSPSC (United Nations Standard Parts and Services Code) taxonomy, or it could be based on the Federal Cataloging System's Item Name Codes. The material ontology could include all UNS materials and their codes and properties. For full interoperability, implementations of this standard will agree on which such sub-ontologies to use. But these sub-ontologies are large, complex, and require extensive domain expertise, so it is appropriate to separate their specifications from that of the SWISS™ Ontology.

As in the syntactic vocabulary, the invention uses constructed, user understandable URIs so that they can be generated from a reference to a target, without full knowledge of the target document.

The User Interface

Figure 13:
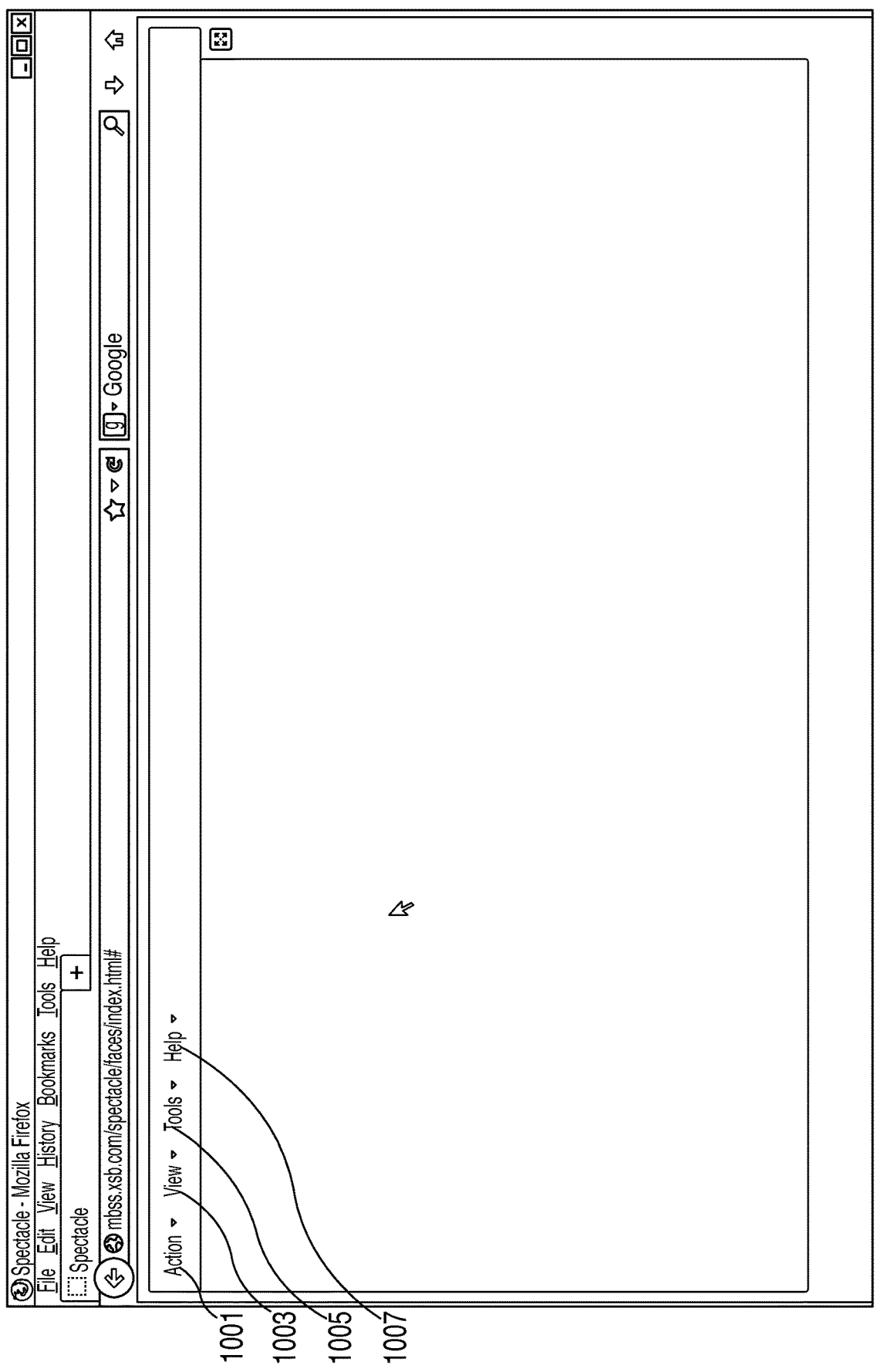

An exemplary user interface according to the invention is shown through the use of a web browser 1000 as seen in screen shots of FIG. 13 et seq. Once logged into the server, the browser displays the user interface in the context of four pull down menus: "Action" 1001, "View" 1003, "Tools" 1005, and "Help" 1007.

User (Access and Navigation) Guide

Figure 14:
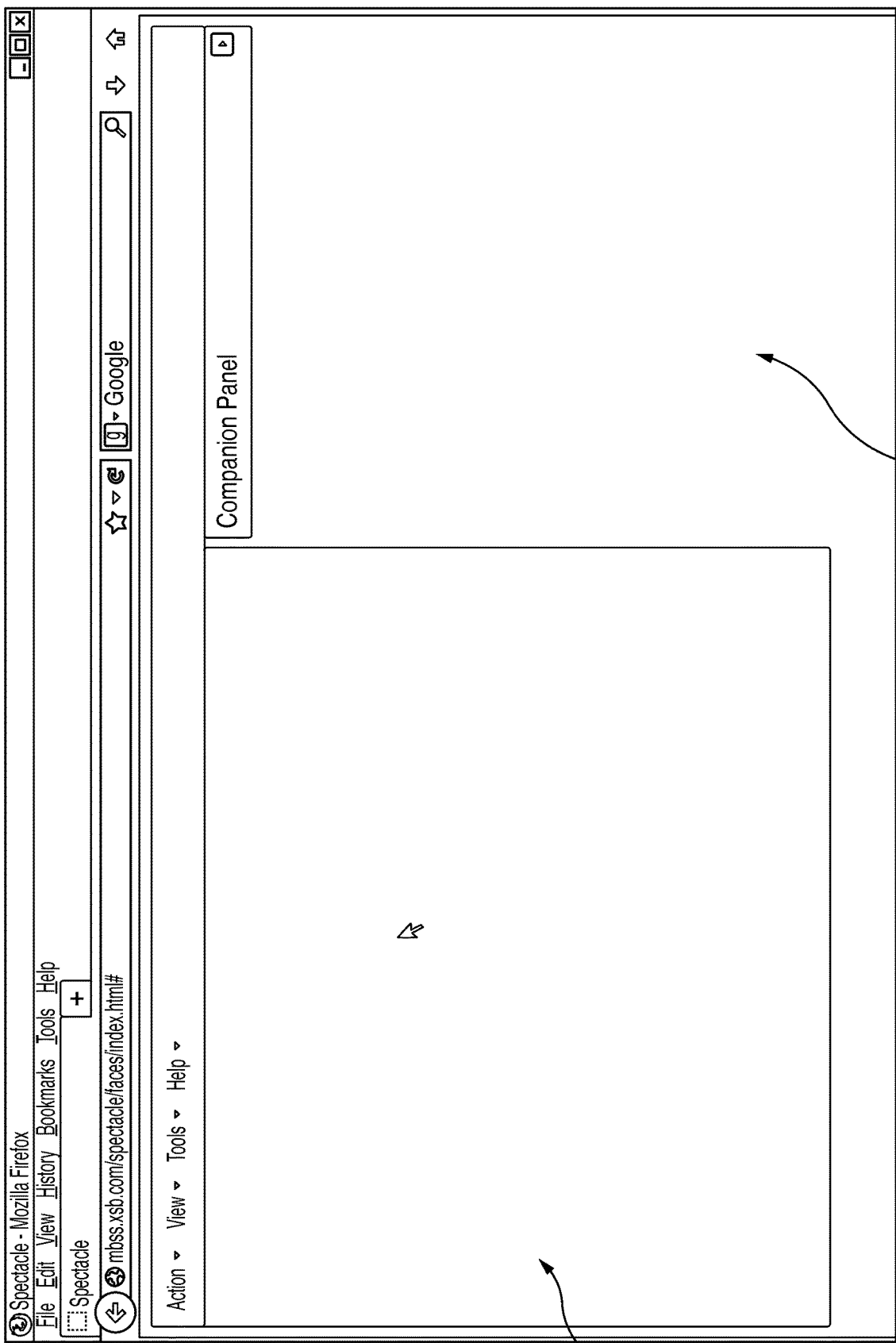

FIG. 13 shows the browser screen 1000 with the four pull down menus 1001, 1003, 1005, 1007 mentioned above. FIG. 14 shows the "active document screen" 1009 and the "companion panel" 1011. As will be described in more detail below, other documents linked in the active document can be displayed in the companion panel 1011. The companion panel is also used to compose "transclusion compositions" as described in detail below with reference to FIG. 32 et seq.

Action Menu

Figure 15:
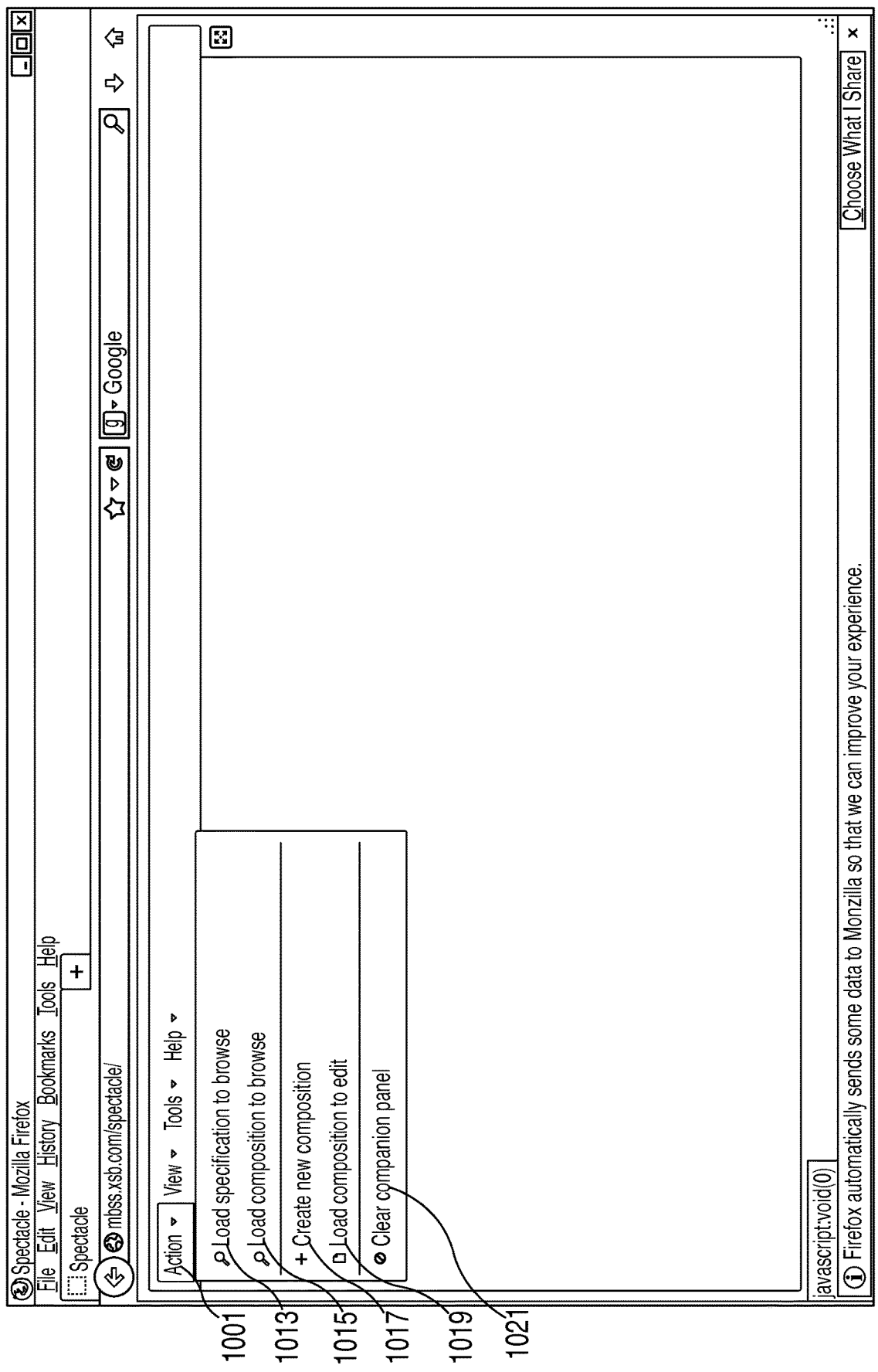
Figure 54:
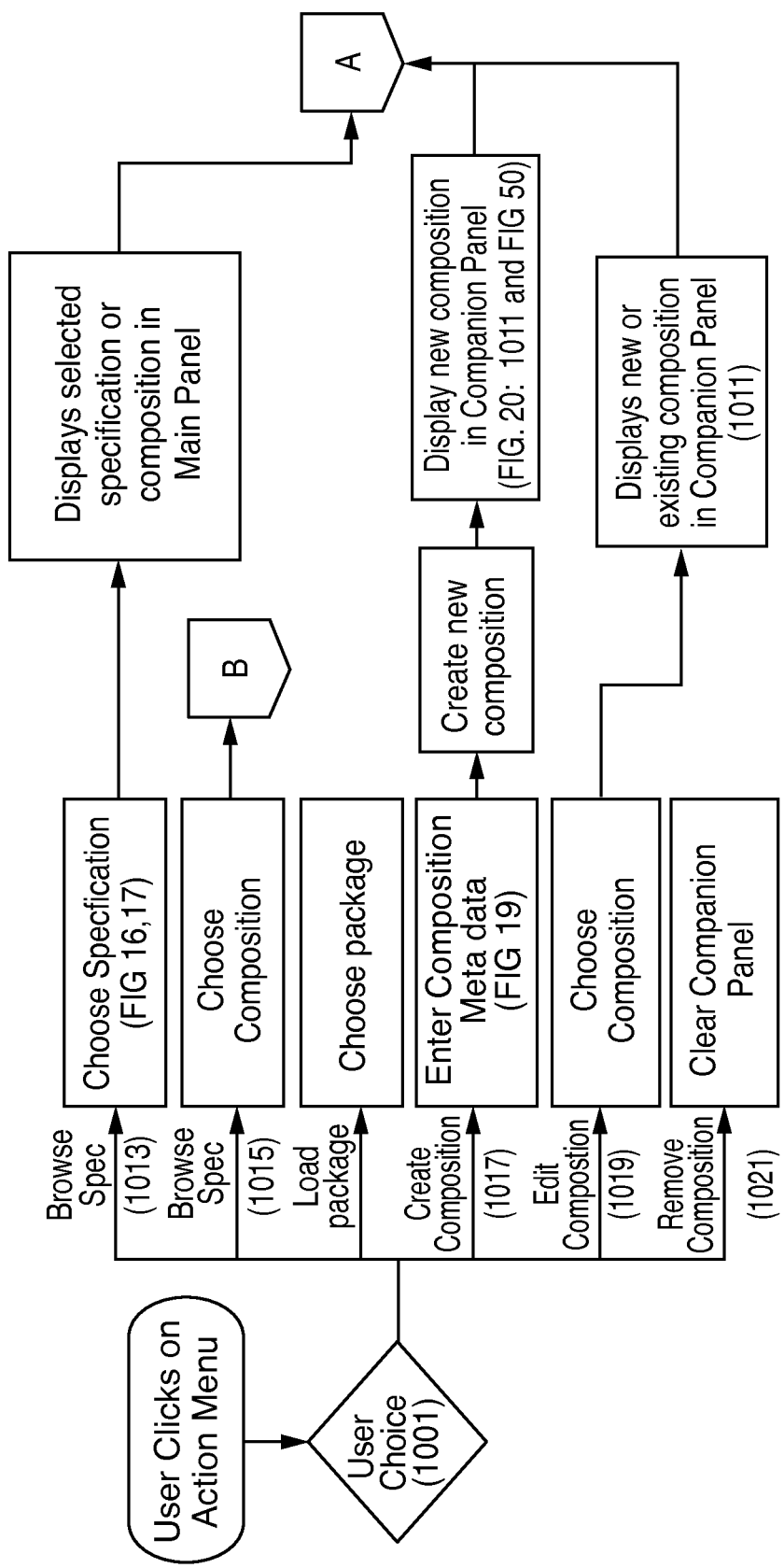
FIGS. 54 through 57 are flow charts illustrating aspects of the invention.

The pull down (or drop down) Action menu 1001 in FIG. 13 includes five selectable choices illustrated in FIG. 15. These are: "Load specification to browse" 1013, "Load composition to browse" 1015, "Create new composition" 1017, "Load composition to edit" 1019, and "Clear companion panel" 1021. The functioning of the Action menu 1001 is also illustrated in the flow chart of FIG. 54.

Figure 16:
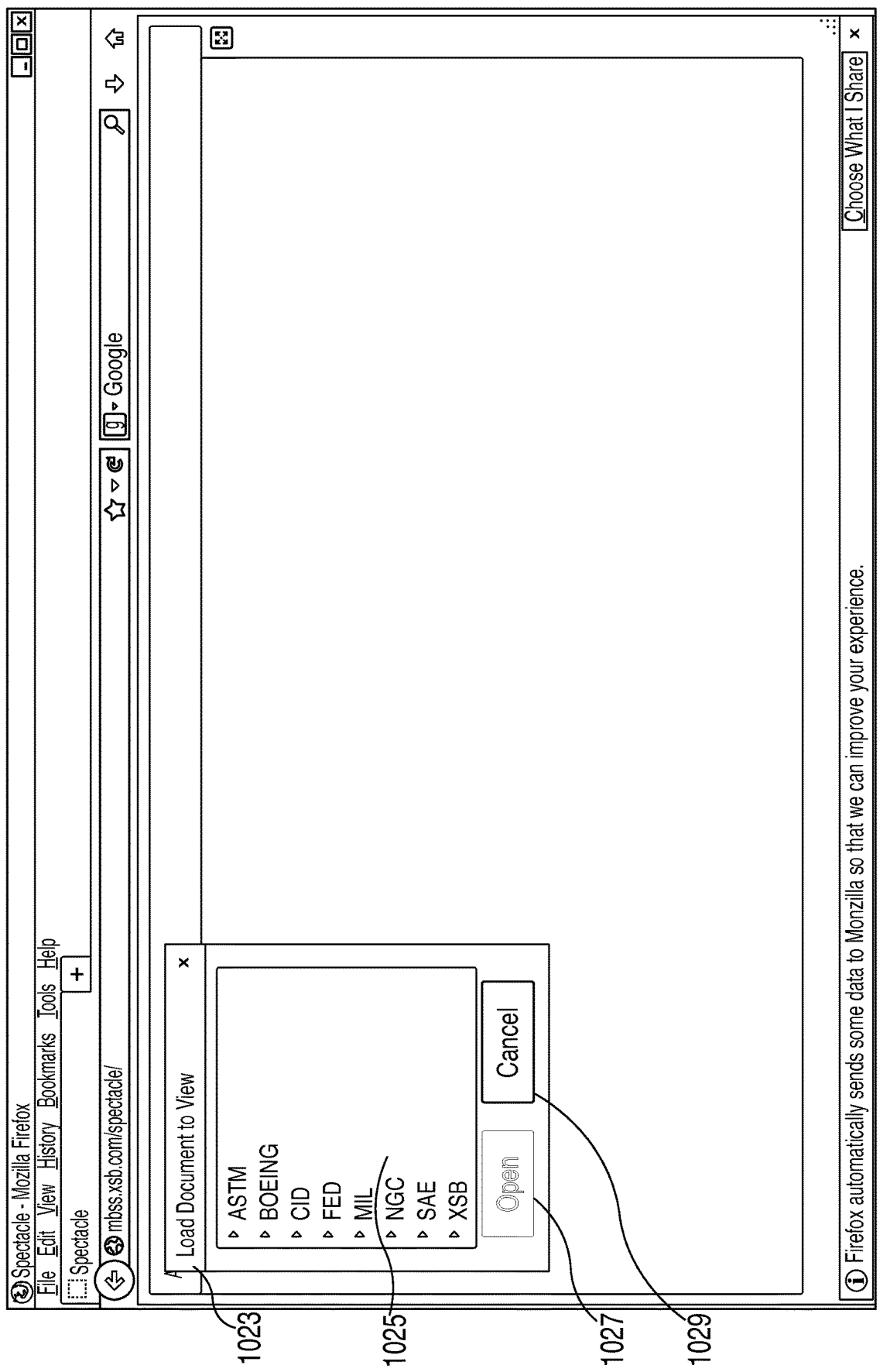

FIG. 16 shows exemplary options revealed from the "Load specification to browse" option. In a dialog box 123, several specification categories are listed in a listing 1025 and the bottom of the dialog has open and cancel buttons 1027 and 1029, respectively. As illustrated, the listing 1025 includes names of standards publishers such as "▶ASTM" (American Society for Testing and Materials), "▶BOEING" (Boeing internal standard), "▶CID" (commercial item descriptors), "▶FED" (federal specifications), "▶MIL" (military specifications), "▶NGC" (Northrup Grumman internal specifications), "▶SAE" (Society of Automotive Engineers), and "▶XSB" (applicant's internal specifications). Which groups of specifications are available to a user depends on the user's identity and security clearance. The publisher "▶XSB", being the user's organization, will include documents composed and authored with the use of the invention. As illustrated in FIG. 16, the "Open" button is "greyed out" because no document has yet been selected to open.

Figure 17:
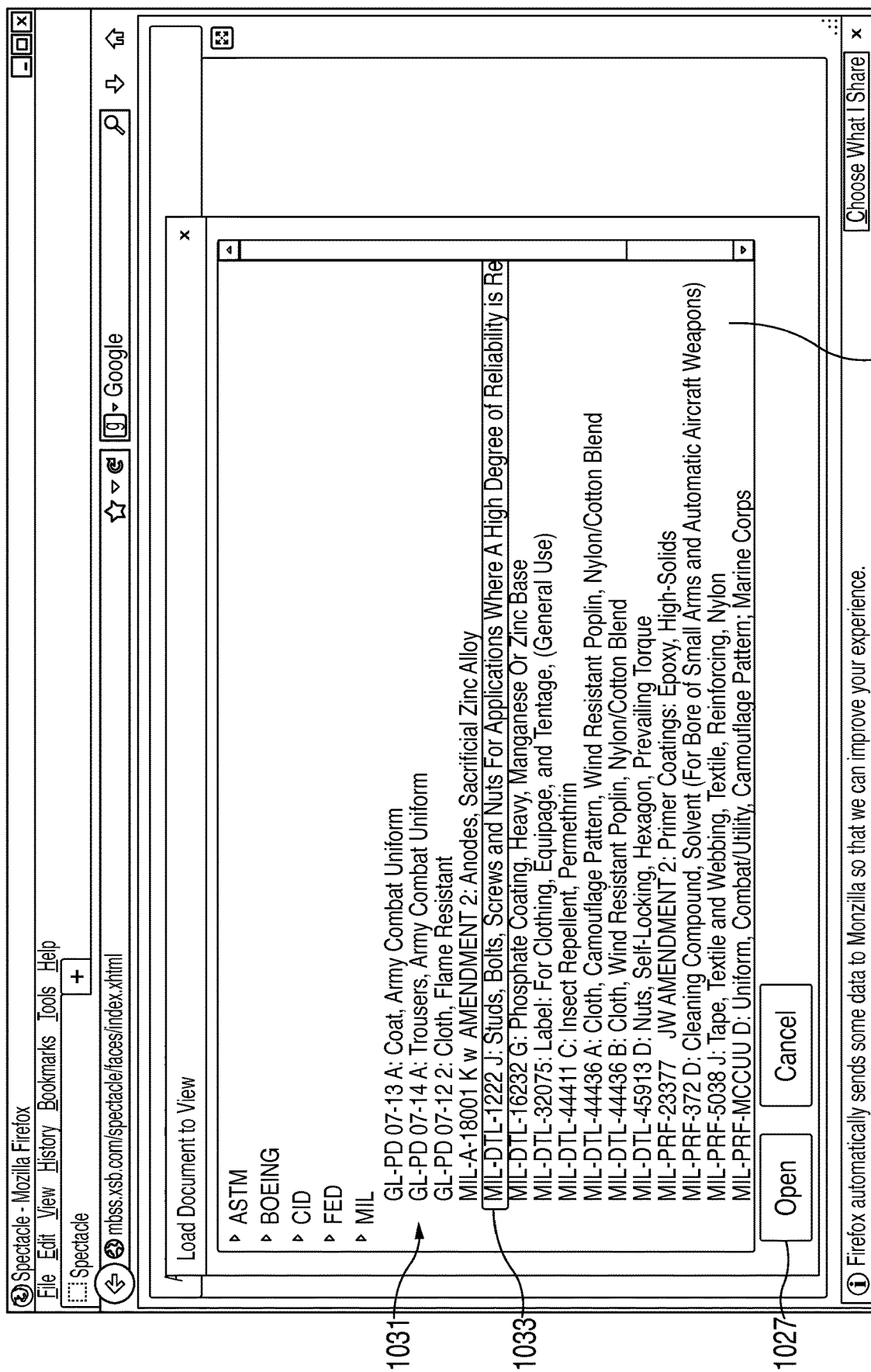
Figure 18:
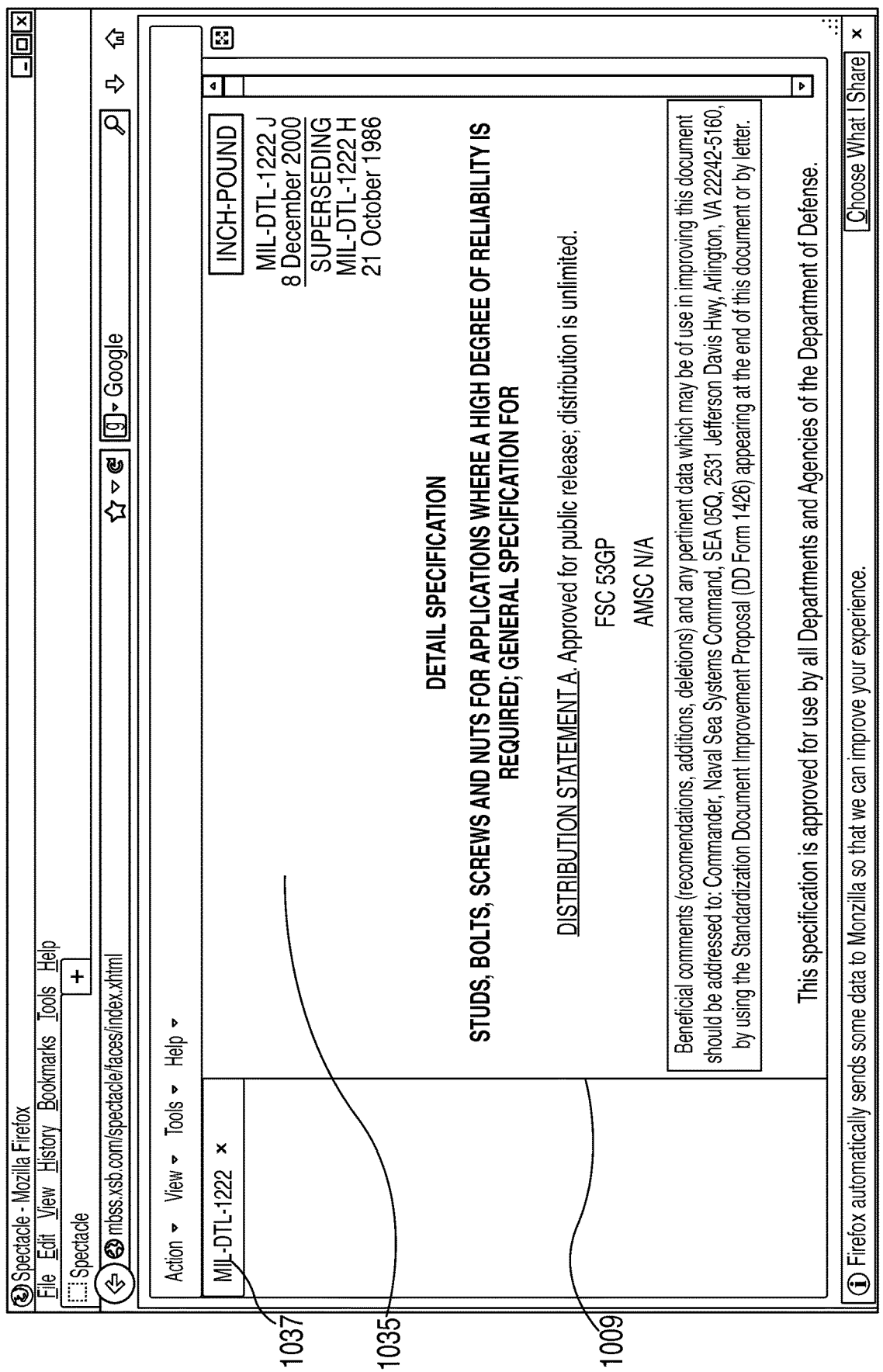

Each of the categories listed in the listing 1025 can be expanded by selecting it with the mouse pointer (or arrow keys). For example, FIG. 17 shows an expanded listing 1025 for "▶MIL" specifications 1031 with specification document "MIL-DTL-1222 J: Studs, Bolts, Screws and Nuts For Applications Where A High Degree of Reliability Is Required; General Specification For" selected. After clicking on "Open" 1027, the selected document 1035 appears in the active document screen 1009 as shown in FIG. 18 and a TAB 1037 for the document is created and displayed to the left of the document.

Figure 19:
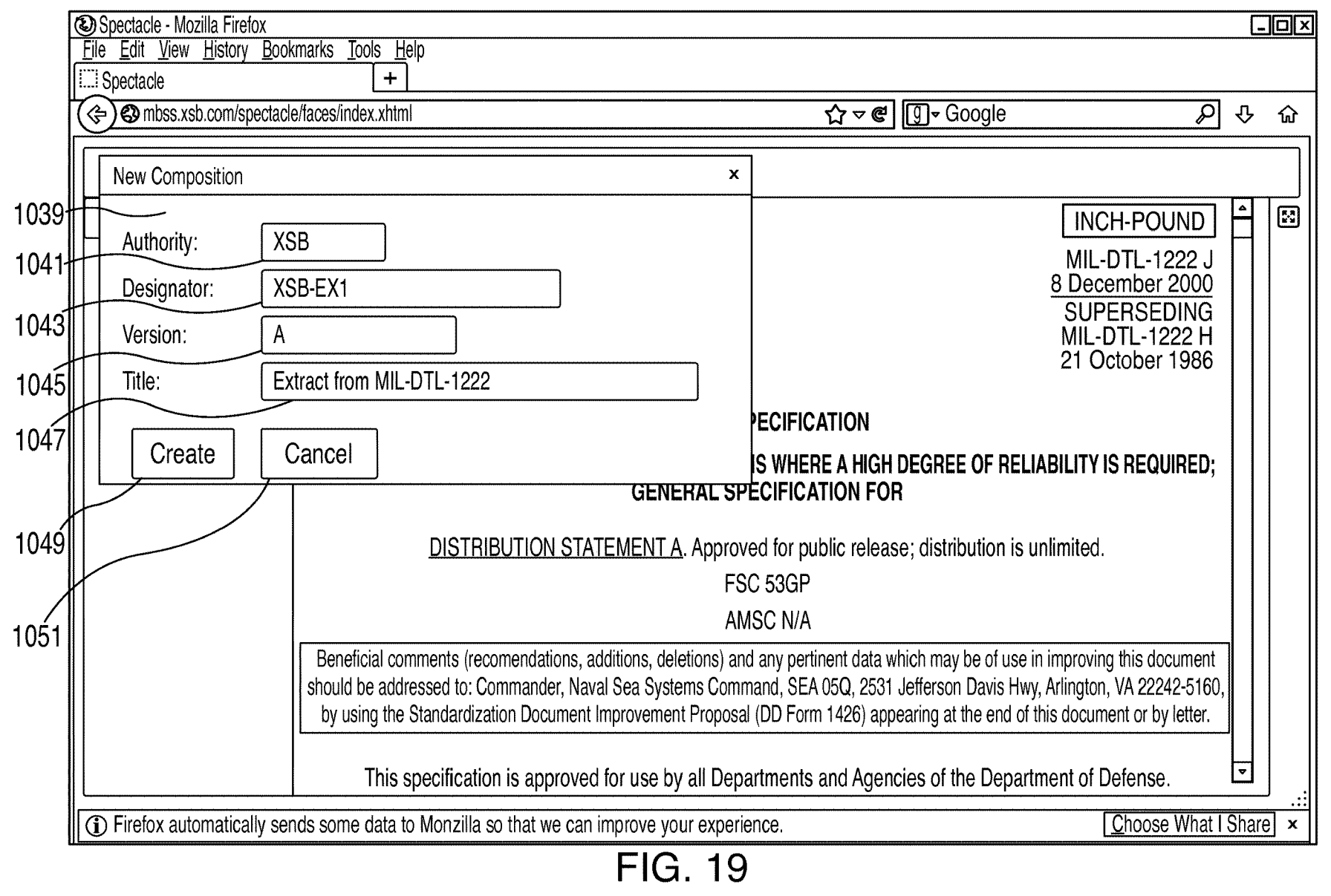

When a user selects "Create new composition" 1017 from the Action menu (see FIG. 15) a new dialog box 1039 (FIG. 19) appears. The dialog 1039 includes four fillable fields: "Authority" 1041, "Designator" 1043, "Version" 1045, and "Title" 1047 as well as the Create 1049 and Cancel 1051 buttons. The Authority 1041 defaults to the organization of the user, in this example the applicant XSB, and cannot be changed in this dialog. The Designator 1043 may default but is freely editable, here shown as "XSB-EX1". Version may default to a sequential alphanumeric but is freely editable in this dialog; here it is simply "A". Title will default to "Extract from [name of document selected previously and currently being displayed in the main document window]"; here it is "Extract from MIL-DTL-1222".

Figure 20:
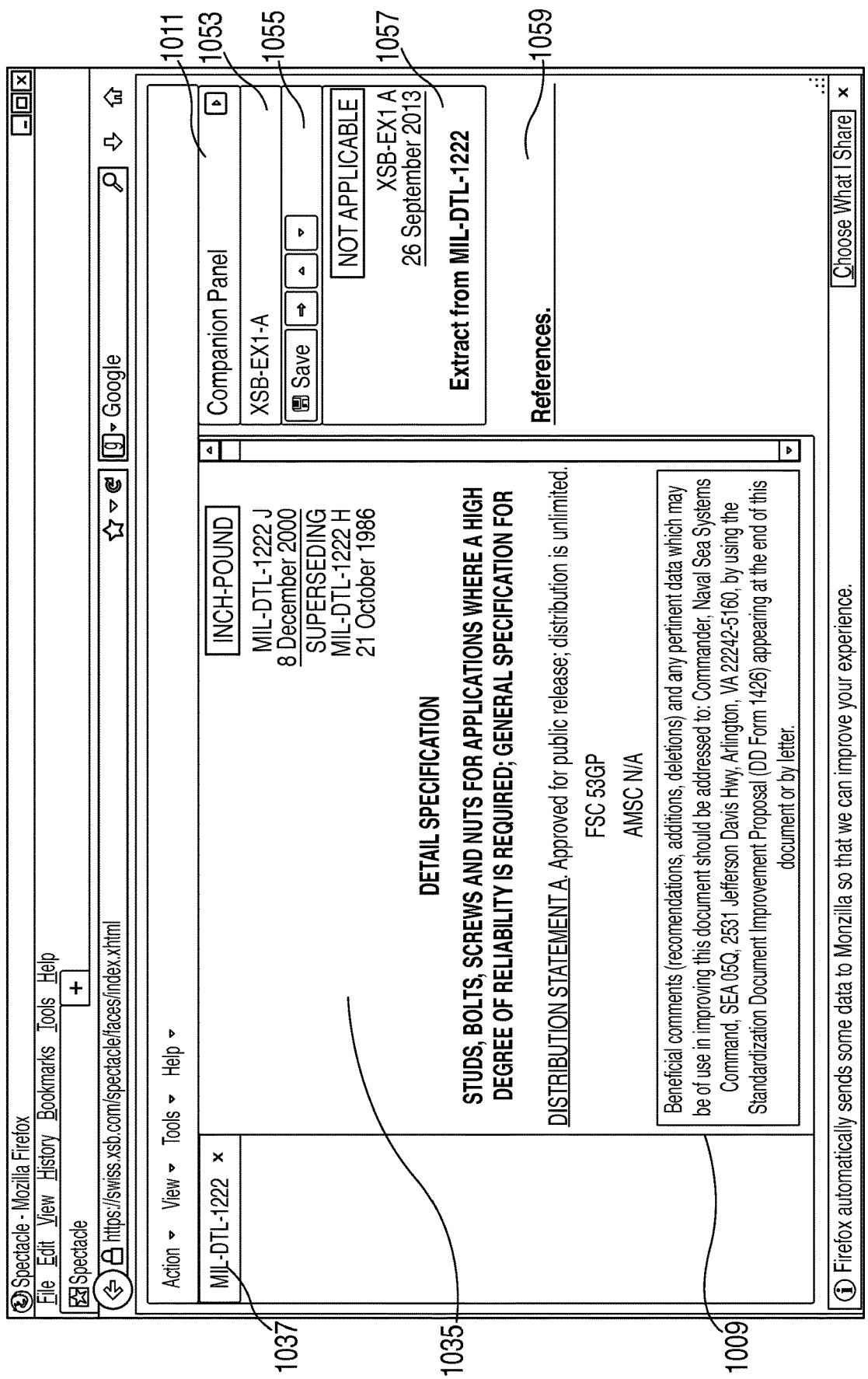

Turning now to FIG. 20, the new composition is created it is displayed in the companion panel 1011. The designator and version ("XSB-EX1-A") is shown as a window title 1053 and a separate menu bar 1055 is provided for the new composition 1057 entitled "Extract from MIL-DTL-1022". The selected document 1035 in screen 1009 from which the new composition is being built is still shown in the active document screen. Below the composition 1057, a section 1059 titled "References" is displayed. As seen in FIG. 20, the menu bar 1055 includes the "Save" button and three arrows, all described in more detail below with reference to FIG. 21.

Figure 21:
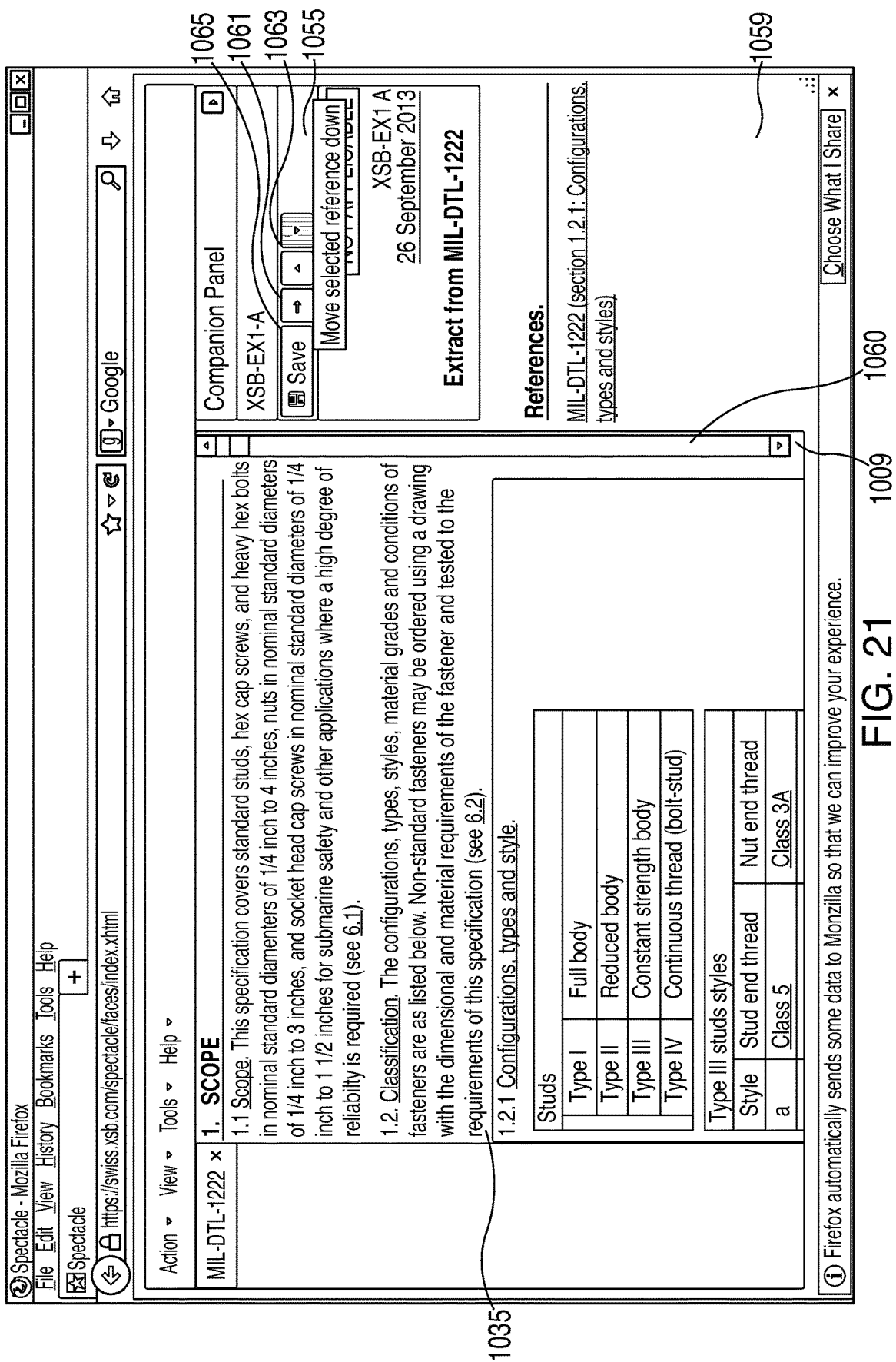
Figure 55:
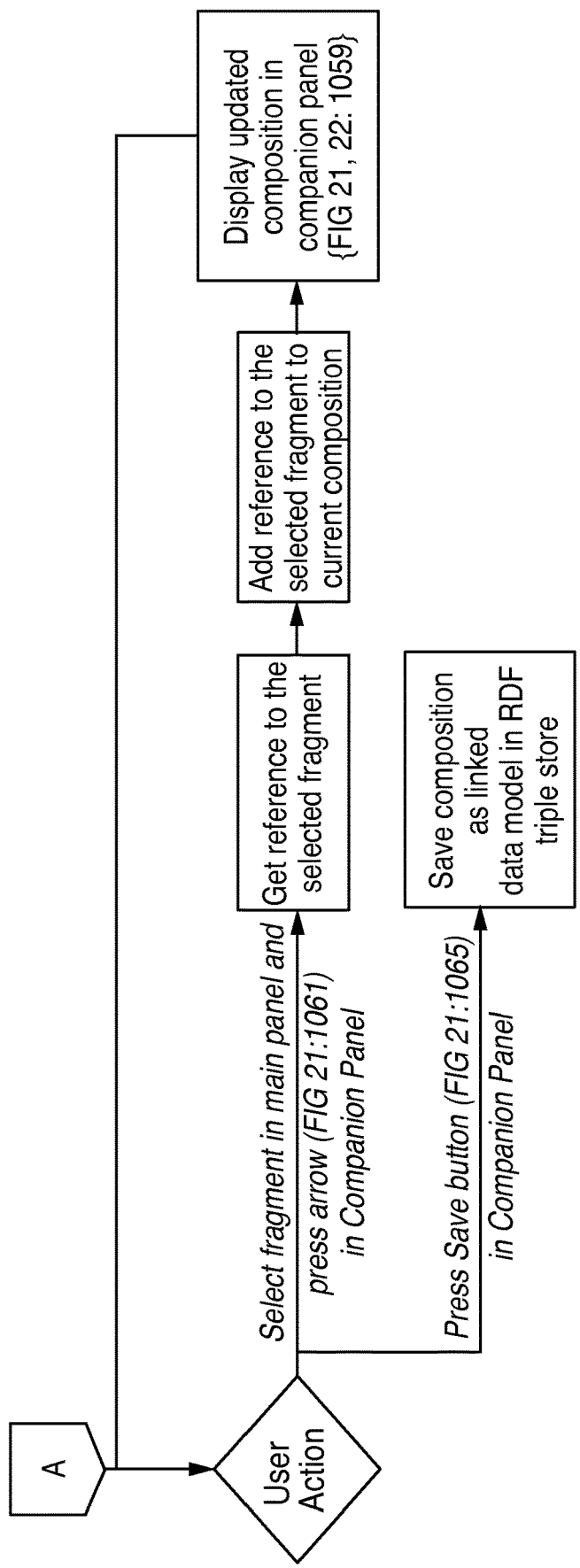

Titles of sections extracted from the selected document 1035 shown in screen 1009 are displayed in the References section 1059 as shown in FIG. 21 and illustrated in the flow chart of FIG. 55. There it can be seen that the new composition includes section 1.2.1 ("Configurations, types and styles") of the selected document (which is shown selected in the having been scrolled to that position using the scroll bar 1060). The list in 1059 is managed through the menu bar 1055 that includes an "add" function indicated by the right pointing arrow 1061, up and down placement arrows 1063 which move the items in the list up and down, and a "Save" button 1065. As illustrated in window 1009, the section 1.2.1 of the selected document 1035 is highlighted in a conventional manner (e.g. click and drag) as it is darkened and the right pointing arrow 1061 is clicked to move that link to the list in 1059. FIG. 22 shows that three sections have been added to the list 1059, the most recent being 1.2.3 ("Coatings for steel fasteners") which is highlighted in FIG. 22. In addition, the list in 1059 also includes "(section 1.2.2: Material grades and conditions)". The sections in this list 1059 will comprise the "new composition". As illustrated in FIG. 55, pressing the arrow 1061 in the companion panel gets the reference to the selected fragment, adds the reference to the current composition and displays the updated composition in the companion panel (1059 in FIGS. 21 and 22). Clicking on the save button 1065 saves the composition as a linked data model in the RDF triple store described above.

Figure 23:
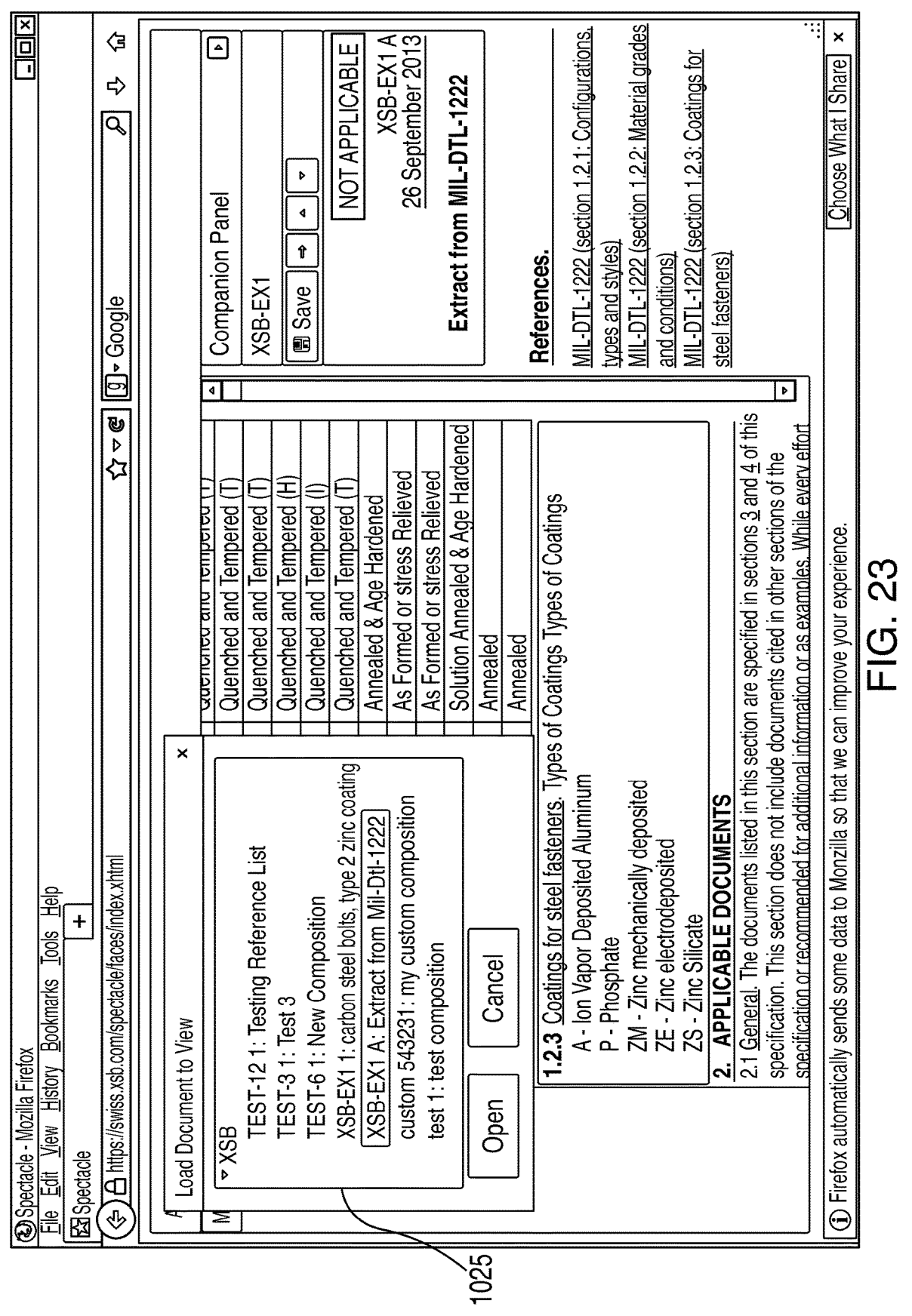
Figure 24:
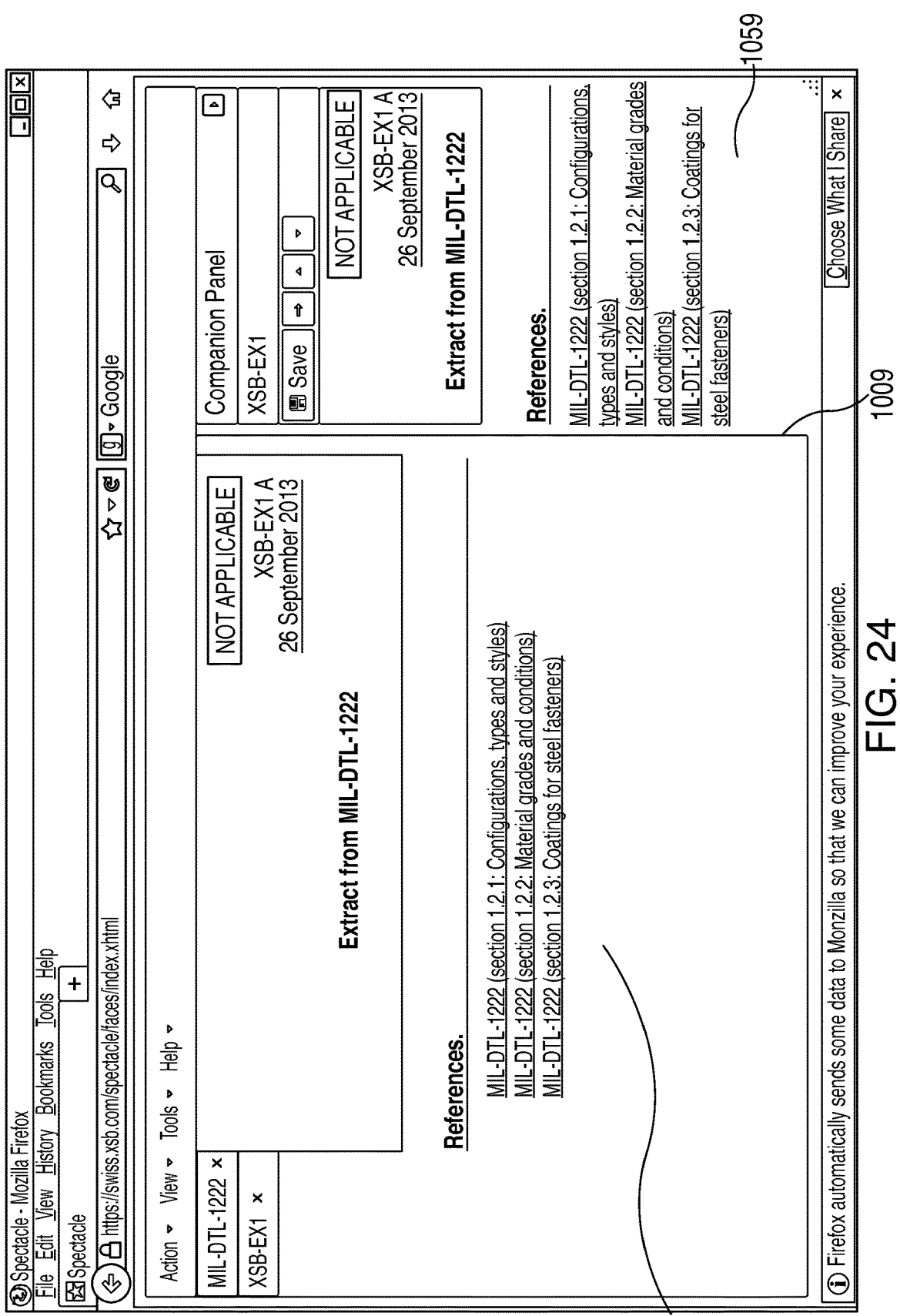

Once a composition has been created and stored, it can be retrieved (see FIGS. 15-17) using the "Load Document to View" option from the Action menu. FIG. 23 illustrates the menu 1025 (described above) with the XSB documents listed by expanding "▶ XSB". This is accomplished by clicking on the horizontal arrowhead to the left of the "XSB" alphanumeric. When expanded, the listing show the arrowhead pointing down "▼XSB" As illustrated, the composition just created ("XSB-ES1-A: Extract from Mil-Dtl-1222") is highlighted in the list. When so selected, clicking on the Open button, the document 1035 will appear in the active document screen 1009 and the references that make up the document will appear in the companion panel references list 1059 as shown in FIG. 24.

If a link listed in the references of the selected document 1035 in the active document screen 1009 is selected, the associated text (e.g., section 1.2.2) is displayed in the active document screen 1009 and a corresponding tab 1067 (listing the title of the expanded section) is added to the left column as shown in FIG. 25. As shown in FIG. 25, the expanded section 1.2.2 includes a three column table with the headings ALLOY TYPE, MATERIAL Grade, and CONDITION, for example Aluminum, 2024, Solution Treated and Naturally Aged.

Compositions can also be edited using the Load Composition to Edit selection from the Action menu. Editing is done by moving links in the references list 1059, by selecting one and using the up and down arrows 1063 to reorganize the list and the consequent appearance in the composition. In this mode, more sections can be added to the composition as well. Sections from other specifications can also be added to the composition as described in more detail below with reference to FIG. 53. The Action menu also includes a Clear Companion Panel option (described above). If this is selected, the companion panel is cleared and closed and any unsaved changes will be lost.

View Menu

Figure 56:
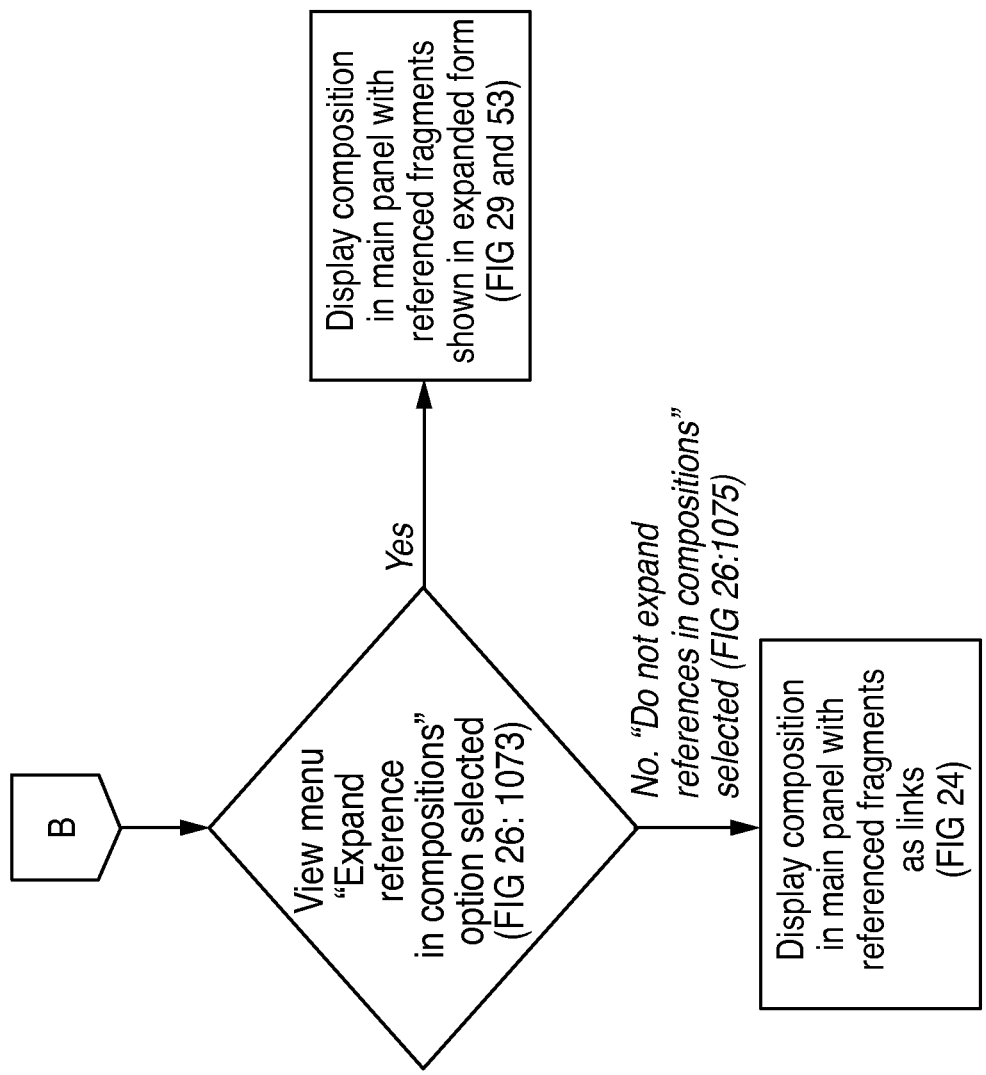

The view menu 1003 is shown expanded in FIG. 26. It lists six options: "Open link in new tab" 1069, "Expand link text in place" 1071, "Expand references in composition" 1073, "Do not separate references in compositions" 1075, "Expand references from semantic links" 1077, and "Do not expand references from semantic links" 1079. It will be noted that some of the menu items have the word "(selected)" appended to them. That is because the View menu is a set of preferences determining how information is displayed in the active document screen 1009 (aka browser panel) according to three options separated in the menu by horizontal lines and as listed above. The selections "Expand references in composition" 1073, "Do not separate references in compositions" 1075 are illustrated in the flow chart of FIG. 56 with reference to the screen shots of FIGS. 24-245, 26, 29, and 53.

Two types of links may appear in a document displayed in the Browser Panel 1035, syntactic links and semantic links. Syntactic links are links to other sections, tables, figures, etc. within the document or another document. Semantic links are references to categories of item such as types, grades, classes, methods, etc. and/or other referenced specifications. A semantic link could refer to categories of items within the current document or categories within a referenced specification. It can also refer to a referenced specification without any category reference. Semantic links show relations between these concepts and where they are described even if the words or phrases used to describe the concepts are different. These links, unlike standard hyperlinks are multi-directional and may be one-to-many or many-to-many. These concepts can be the same as Subjects in the ontology described in the early part of this application with reference to the digital model. In the following Figures, semantic links are highlighted in green and syntactic links are highlighted in blue in countries where color drawings are permitted. They are also described as such for documents that are not reproduced in color.

Semantic links exhibit intelligence regarding concepts regardless of the words used to describe the concepts. Currently, the invention uses the Ontology Directed Extractor (or a variation thereof) that is explained in co-owned previously incorporated U.S. Pat. No. 7,542,958 to create semantic links According to the invention, and as described herein, "context" is used to "shade" the meaning of semantic links. Context is defined by the document from which a semantic link is drawn. For example, context may be determined by the name of the document, the place in the document to which the semantic link points, and the text surrounding the linked portion of the document.

If "Open link in a new tab" 1069 option is selected, clicking on a syntactic link will open a new tab in the left column and the target of the link displayed in the browser panel 1009. If "Expand link text in place" 1071 option is selected, clicking on a syntactic link will insert the target of that link in the current document display.

Figure 28:
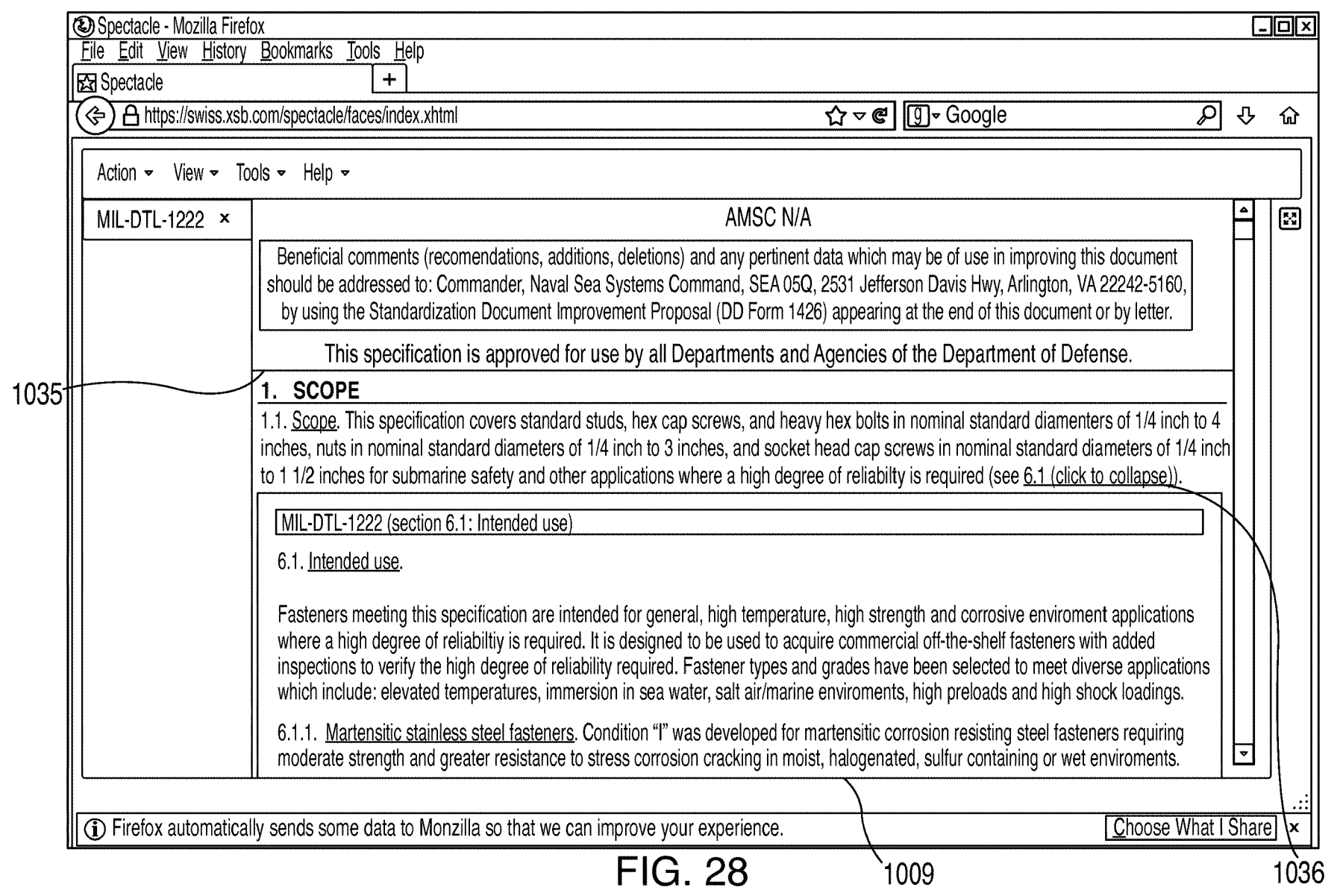

FIG. 27 shows the result of clicking the syntactic link to section 6.1 in section 1.1 of MIL-DTL-1222 when the first option (1069 in FIG. 26) is selected. The tab is shown at 1081 and includes the title of the section and the document name. FIG. 28 shows the result when the same link is clicked with the second option, "Expand in place" (1071 in FIG. 26) selected. Notice in FIG. 28 that, with the second option (1071) selected and a link expanded, there is now the option "click to collapse" 1036 the link (i.e. no close option in a tab on the left side since there is no tab for this expanded section).

Figure 29:
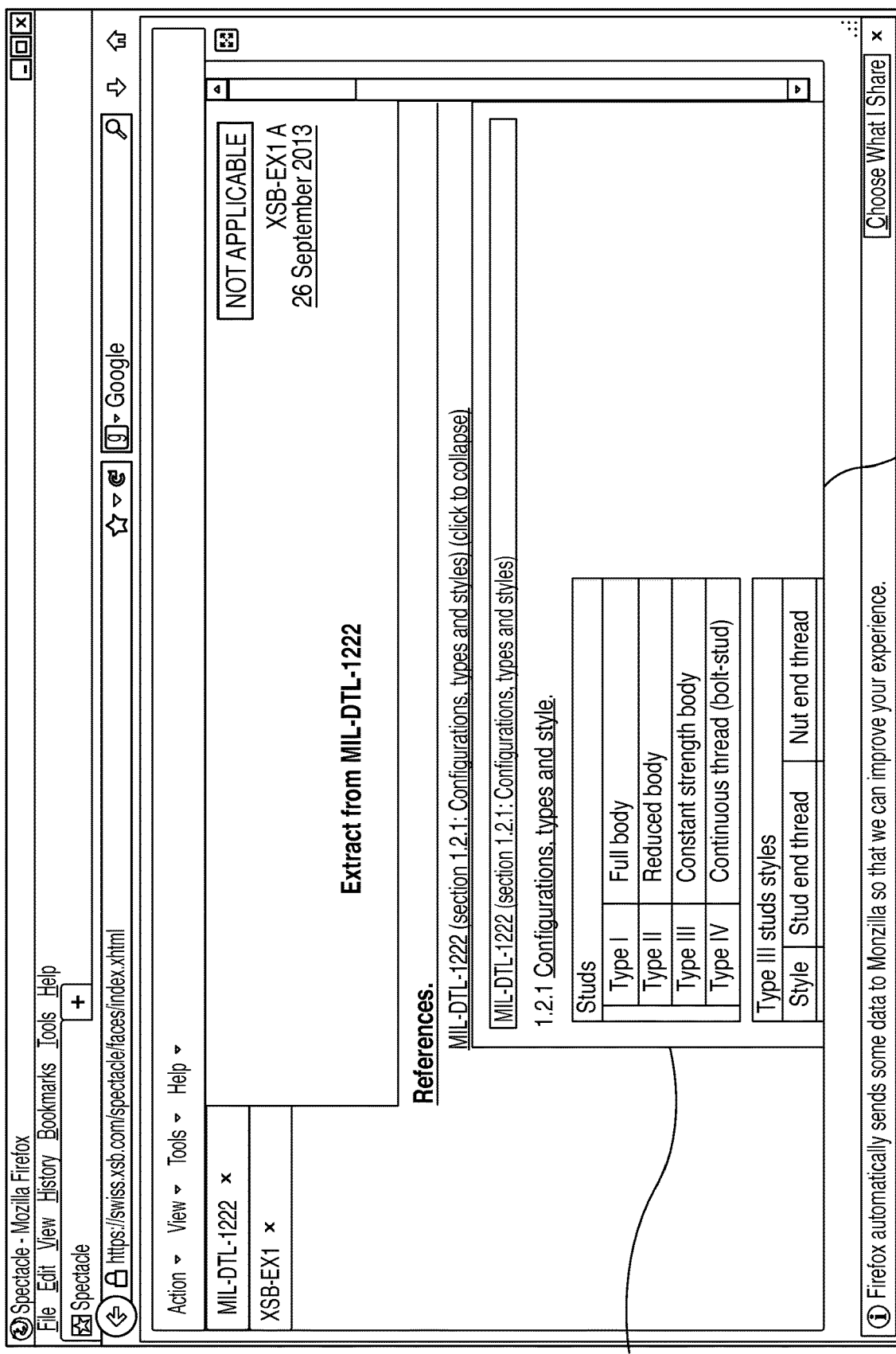
Figure 30:
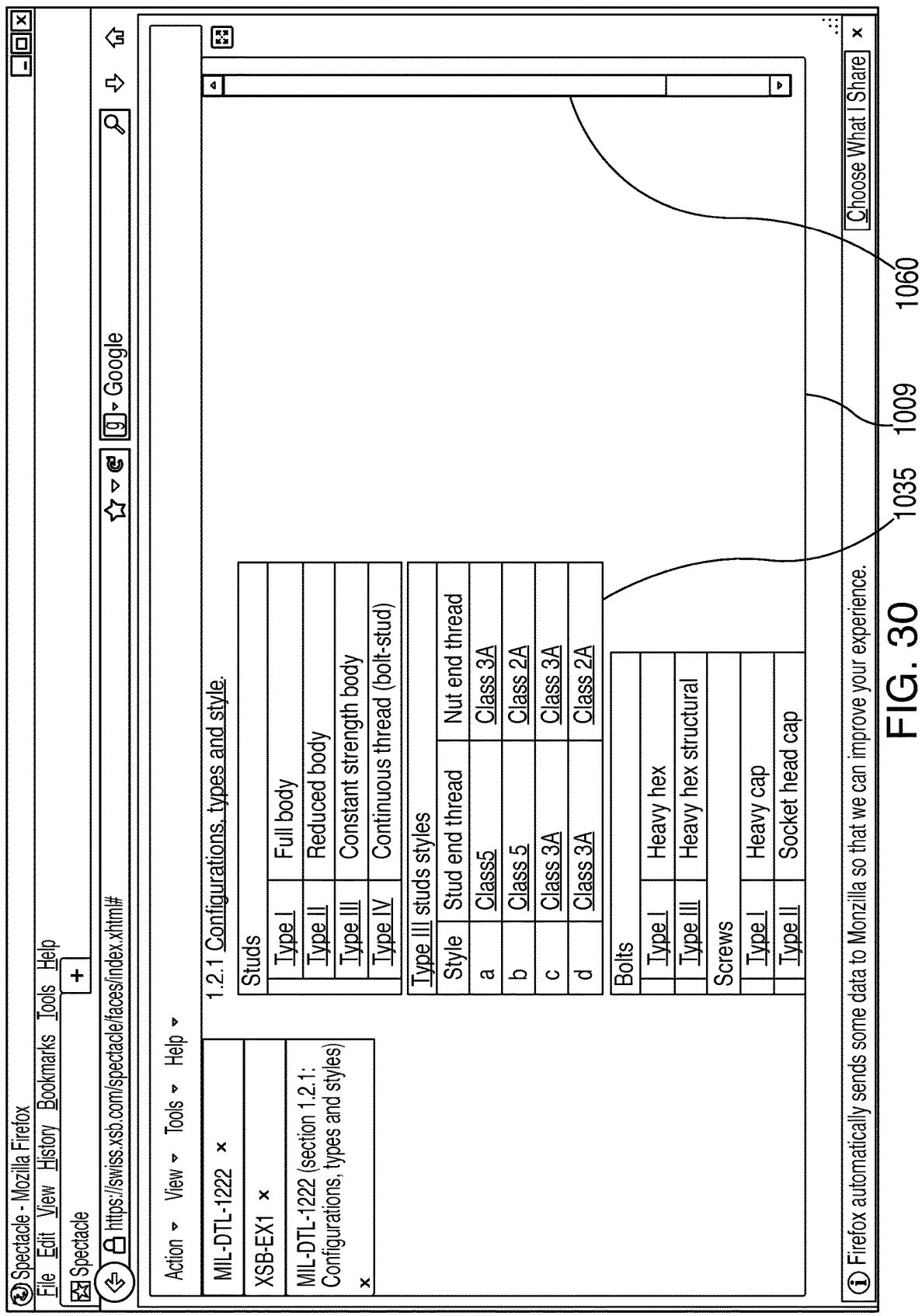

The "Expand references in composition" 1073 and "Do not expand references in compositions" 1075 options determine how references in a composition 1035 are treated when a composition is opened in the browser panel 1009. With the first option (1073) selected, clicking a reference will expand or collapse that reference in place and a composition is loaded with all links expanded. With the second option (1075) selected the reference is opened in a new tab when the reference is clicked. FIG. 29 illustrates opening the XSB-EX1-A composition with the first option selected. FIG. 30 illustrates clicking the first reference in XSB-EX1-A with the second option selected.

Figure 31:
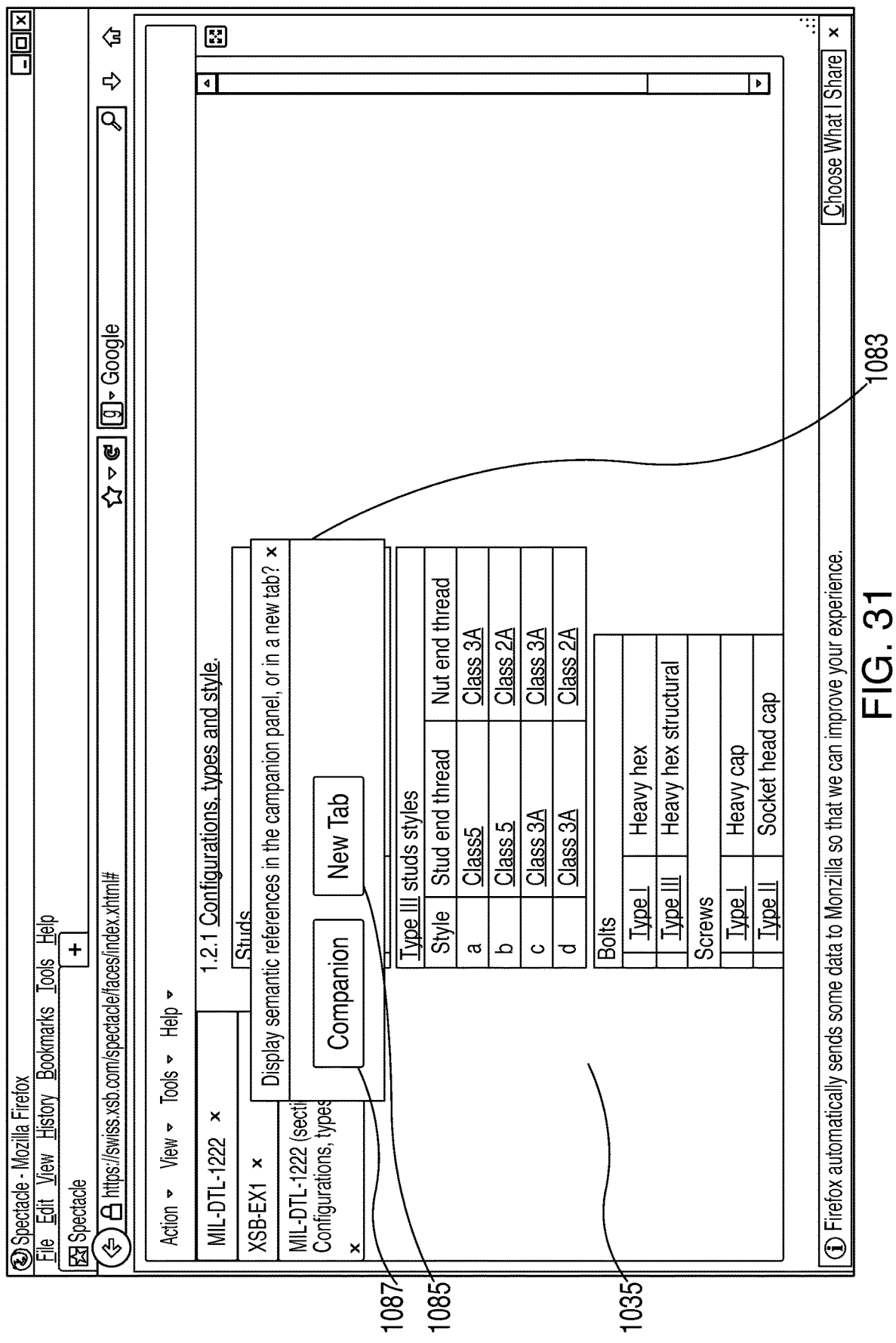
Figure 32:
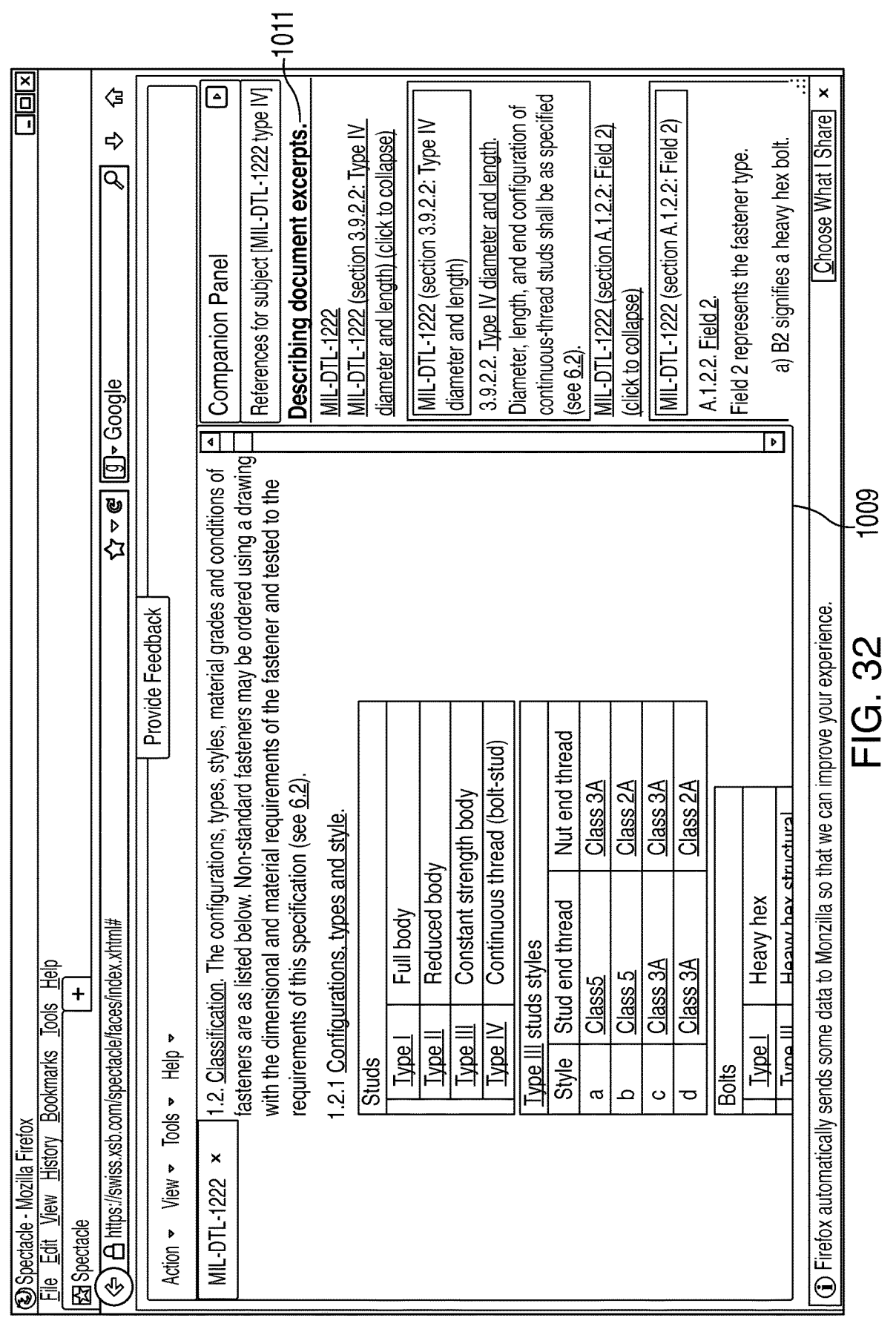

FIG. 31 shows a dialog box 1083 for opening a semantic link with a button 1085 for "New Tab" and a button 1087 for "Companion" panel. FIG. 32 shows the result of clicking on "Companion" panel button 1087. FIG. 33 shows the result of clicking on the "New Tab" button 1085. A new tab 1089 is created showing the title of the semantic link in green. FIG. 34 shows the result of clicking on the "Companion" panel option 1087 with the option "Do not expand semantic links" (1079 in FIG. 26) selected.

Figure 35:
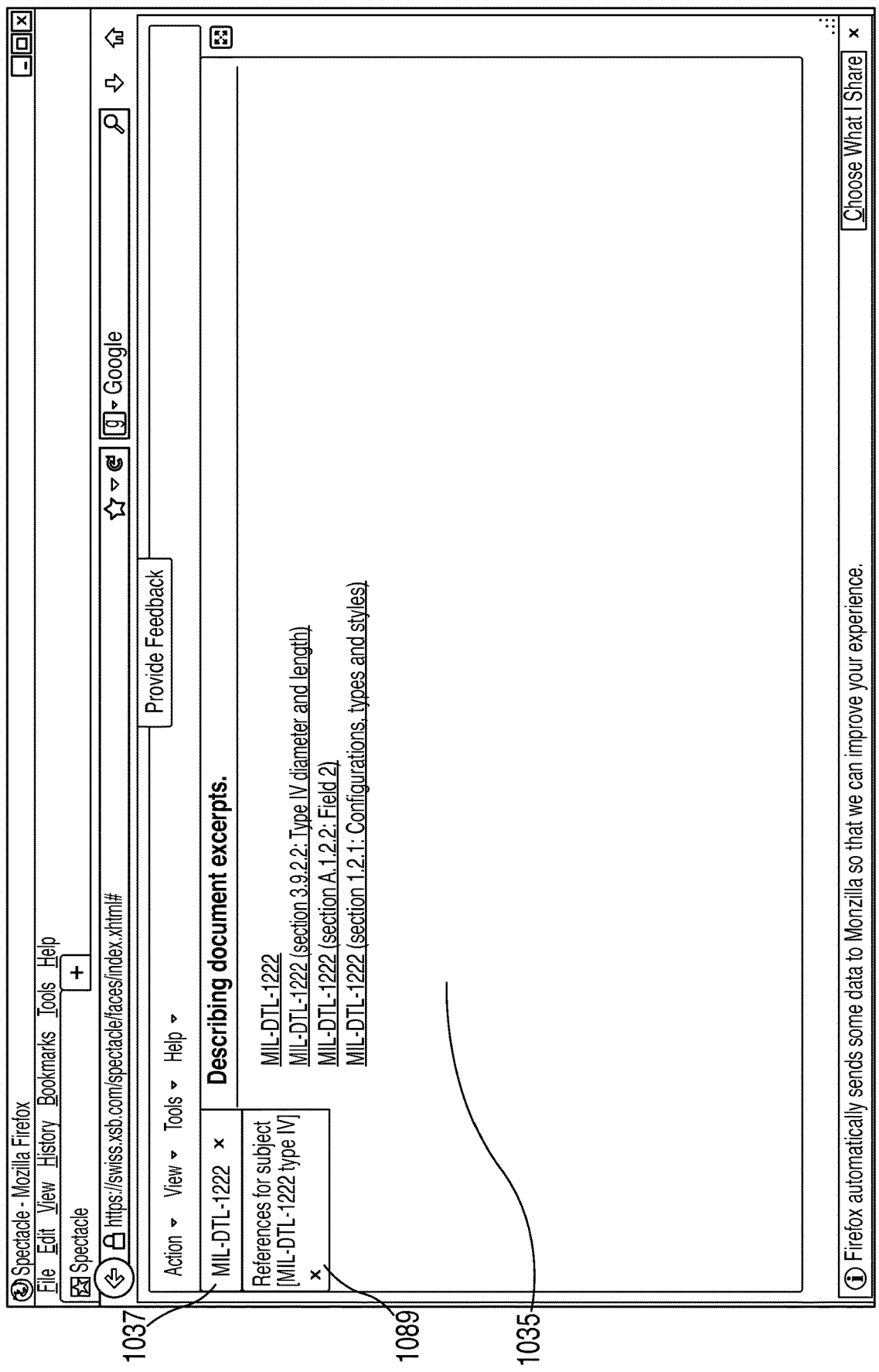

FIG. 35 shows the result of selecting and "Do not expand references from semantic links" (1079 in FIG. 26).

The foregoing description of the User (Access and Navigation) Guide shows how syntactic and semantic links can be followed between documents and how transclusion can be used to bring sections from multiple documents from different standards and different standards organizations together in a tailored composition. The next section shows examples of creating specific custom compositions using the transclusion features of the invention.

Transclusion (Editor) Guide

The invention provides the ability to create custom compositions that collect sections from multiple different specifications from different sources in a single composition document. As used herein, this process is called "transclusion" and the result of the process is called a "tailored composition".

It will be appreciated that the editing systems allow transcluded sections to be added or deleted without affecting other sections. Moreover, composition text may be added independently of the transcluded sections and the text and transcluded sections will "wrap" in a logically desired manner.

Example—Corrosion Resistant Carbon Steel Bolts

Open

The document 1035 (MIL-DTL-1222 "STUDS, BOLTS, SCREWS AND NUTS FOR APPLICATIONS WHERE A HIGH DEGREE OF RELIABILITY IS REQUIRED: GENERAL SPECIFICATION FOR") is loaded (using the Action menu) into the browser window 1009 as shown in FIG. 18 and as scrolled down, as shown in FIG. 36, to Section 3.6 "Protective coating or treatment". Scrolling farther in the document, the user comes to Section "3.6.1 Carbon and alloy steels" 1091. In particular, in this example, the user is interested in "mechanically deposited zinc coatings". For these coatings, there is a semantic link 1093 in Section 3.6.1 to "ASTM-B695, Type II". This is shown in green type in countries that permit color patent drawings. According to the presently implemented embodiment it will appear in green type on a user's screen. There are several other semantic links shown on this portion of the document 1035. All are indicated in green type and are also underlined.

Semantic and Syntactic Links

Figure 37:
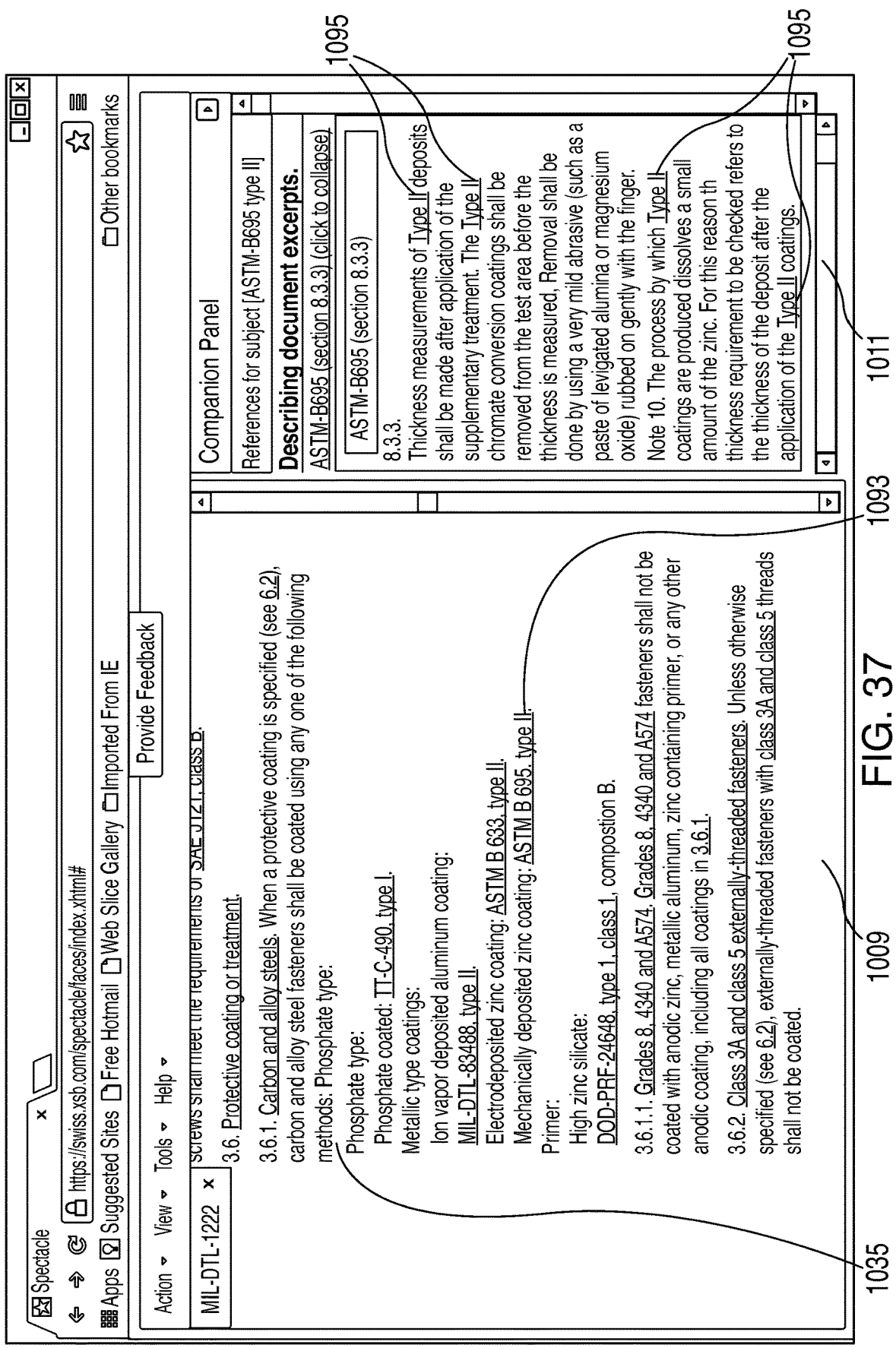

FIG. 37 illustrates the semantic link 1093 opened in the companion panel 1011. Note that the link is to a particular section in a different document from a different standard organization. The semantic link here leads beyond the MIL domain to the ASTM standards. The relevant portion of ASTM standards, ASTM-B695 (section 8.3.3), is displayed in the companion panel 1011 and the displayed portion has its own semantic links "Type II" 1095. Clicking on the semantic link 1095 to "Type II" brings up an additional pane of information in the companion panel 1011. Note that the link is to a particular section describing an ASTM B695 Type II concept in a different document from a different standard organization. The semantic link here leads beyond the MIL domain to the ASTM standards.

FIG. 38 shows ASTM-B695 (section 3.2-Types) 1097 in the companion panel 1011. There the types "Type I" and "Type II" are listed as semantic links and each is provided with a syntactic link appendices. For example "Type I—As coated without supplementary treatment (Appendix X2.1)" and "Type II—With colored chromate conversion treatment X2.2)". The syntactic links are illustrated in blue and underlined. FIG. 38 also shows ASTM-B695 (section 6.5.2). Thus it can be seen that the semantic link from MIL to ASTM doc is to multiple sections describing Type II in the ASTM doc.

Scrolling through the companion panel 1011 brings the user to ASTM-B695 (section 6.2.5.1: Colored Chromate Conversion Treatments (Type II)) as shown in FIG. 39.

Other important references in the semantic link to ASTM-B696 Type II are: Section 8.5.2—constraints on corrosion testing Type II coatings; Section 8.5.3—curing time for Type II coatings prior to corrosion testing; Section 8.3.3—measuring thickness of Type II coatings; and Section 6.5.2—length of time for corrosion testing Type II coatings.

Classes

As the user explores the references to Type II coatings in ASTM-B695, additional links to other sections within this ASTM document and references to other documents are found. Two examples of this are ASTM-B695 Section 8.5.2 that refers to ASTM-B117 for salt spray corrosion testing and ASTM-B695 Section 6.5.2 that states that the number of hours the corrosion test should be run is determined by the coating class. Based on these two references, the user can realize that they need to look more deeply at Class definitions in ASTM-B695 and salt spray test apparatus operation in ASTM-B177. To do this the user can open both of these documents in the Browser Panel 1009.

FIG. 40 shows the result of this action with focus on Section 3.1 1099 of ASTM-B695 shown as tab 1101. This section defines the Classes of coating based on the thickness of the coating in micrometers. Determining the length of time a corrosion test should be run is based on the Class of the coating. It will be noted that "classes" are a type of semantic concept.

Tables

Figure 41:
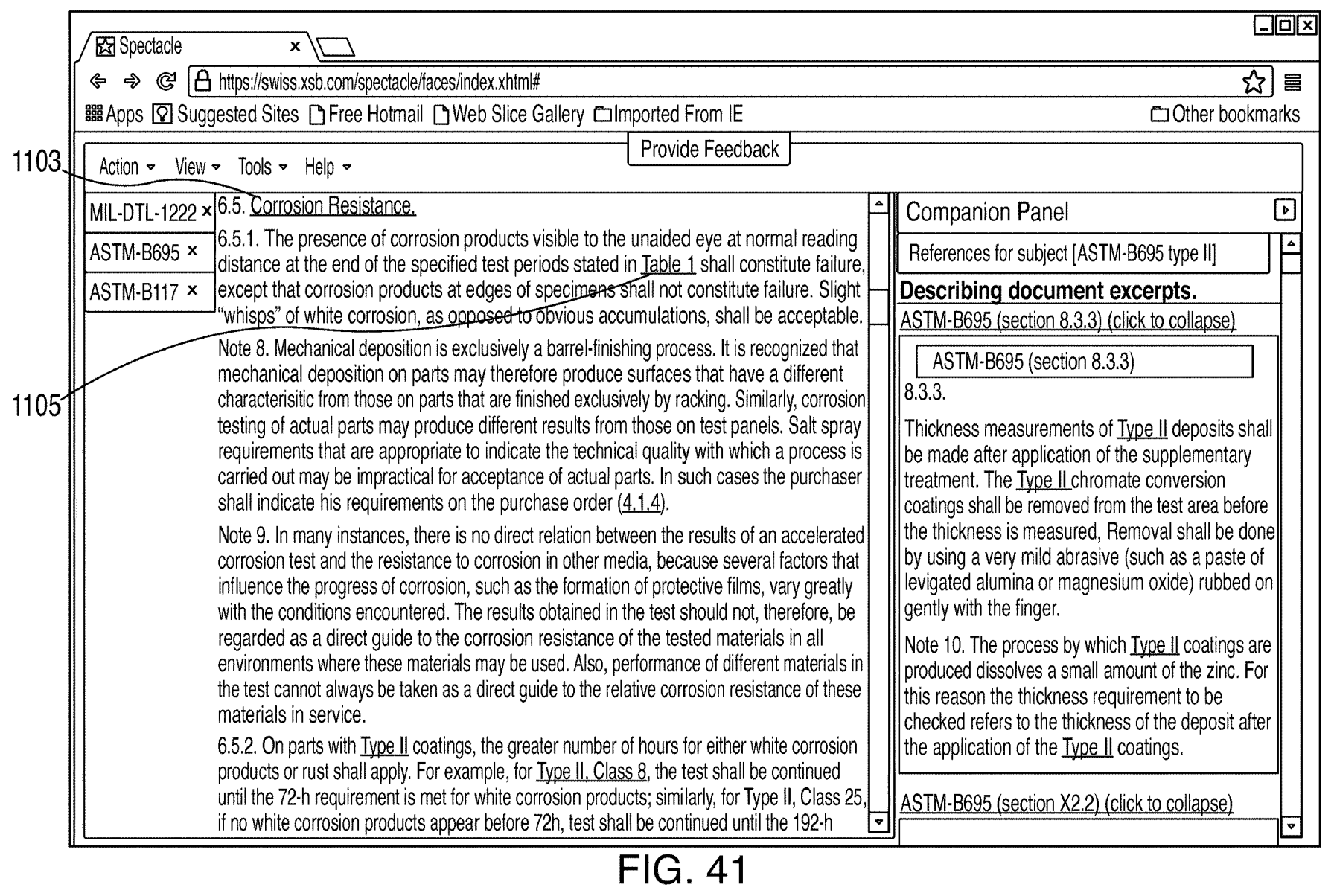

Scrolling down, as shown in FIG. 41, to Section 6.5 1103 in ASTM-B695 that discusses corrosion resistance the user will see that section 6.5.1 points to Table 1, via a syntactic link 1105, for the time requirements for the corrosion test.

Figure 42:
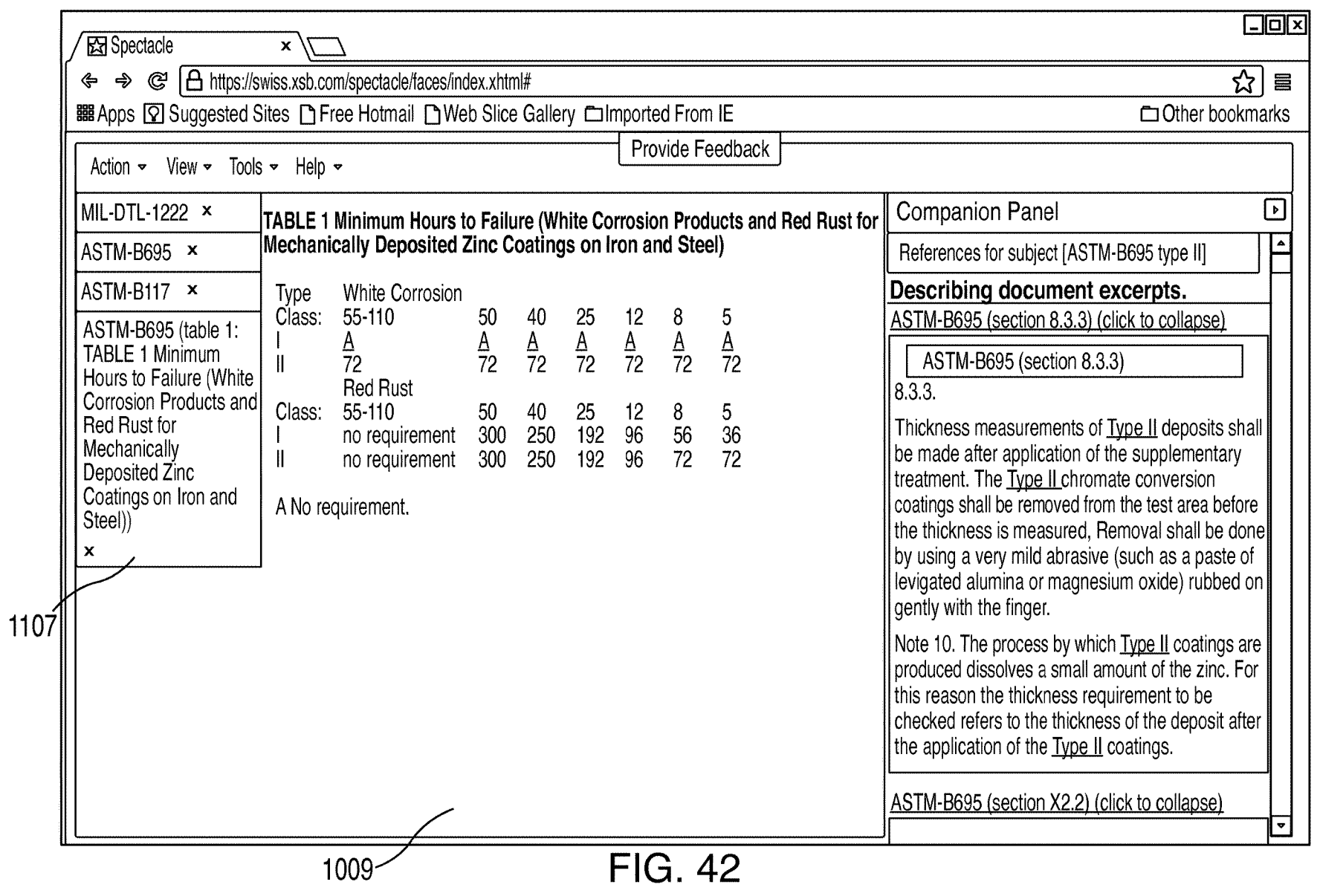

FIG. 42 shows the Table 1 in the browser window 1009 together with a new tab 1107 for quick navigation back to the table.

Figure 43:
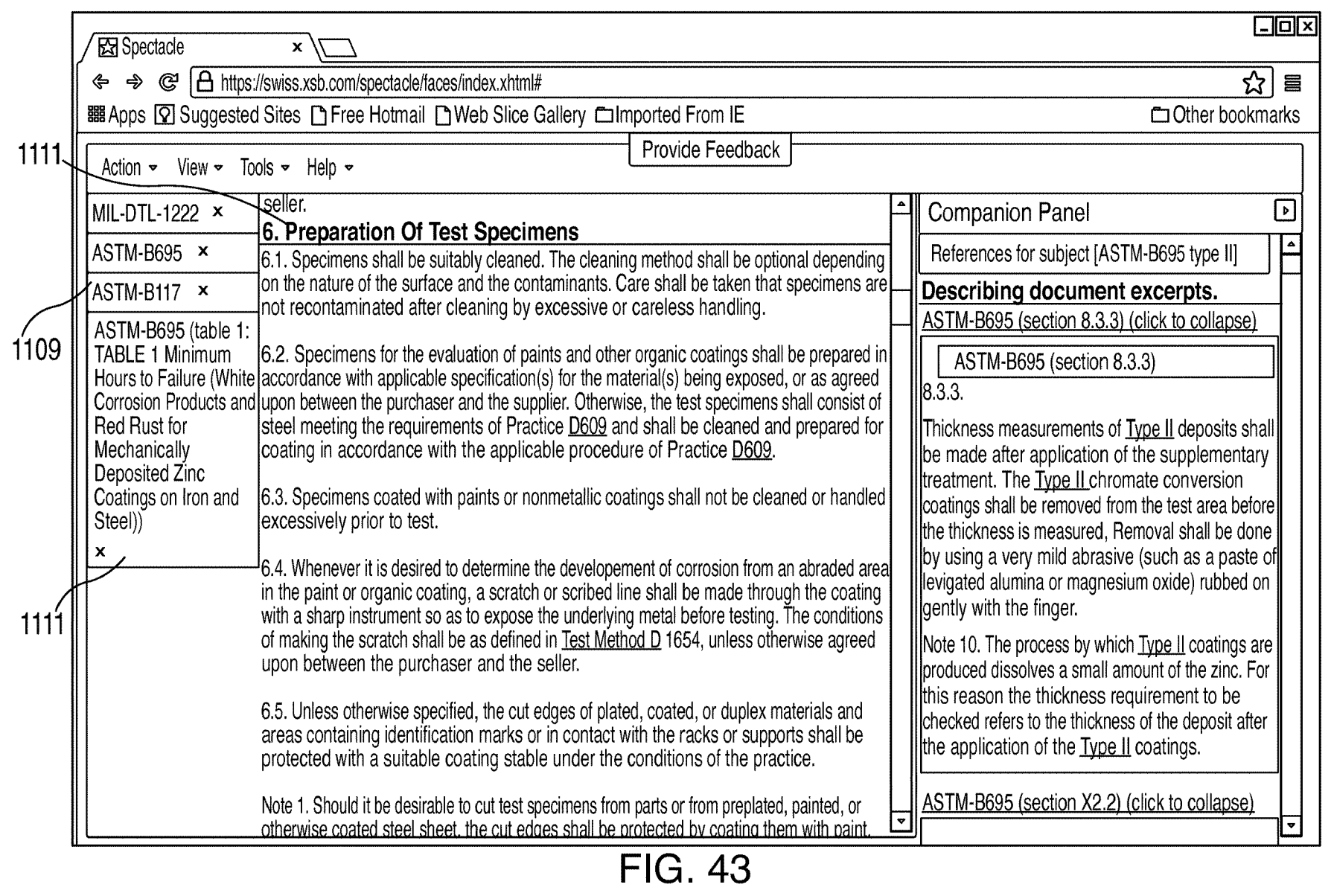
Figure 44:
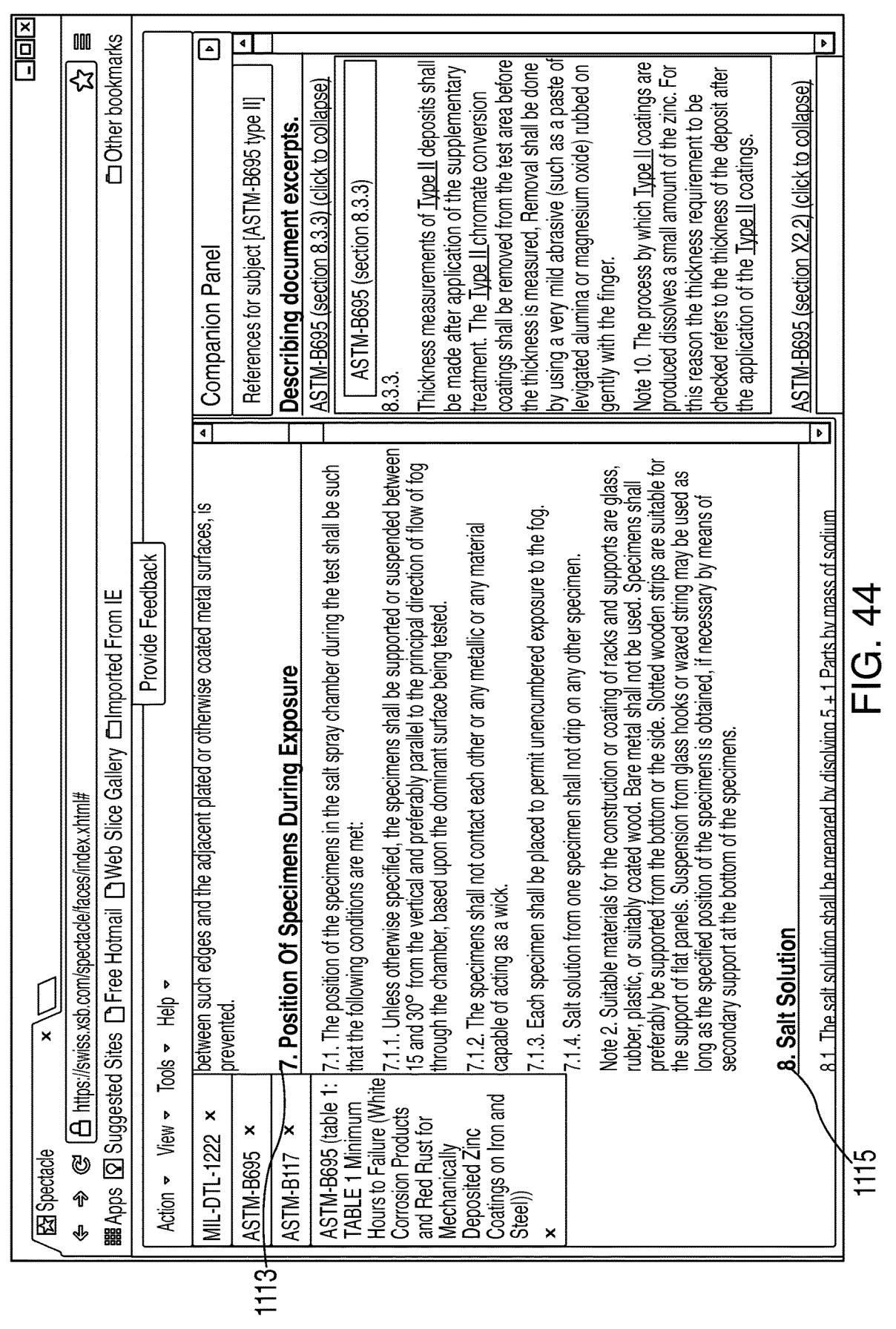
Figure 45:
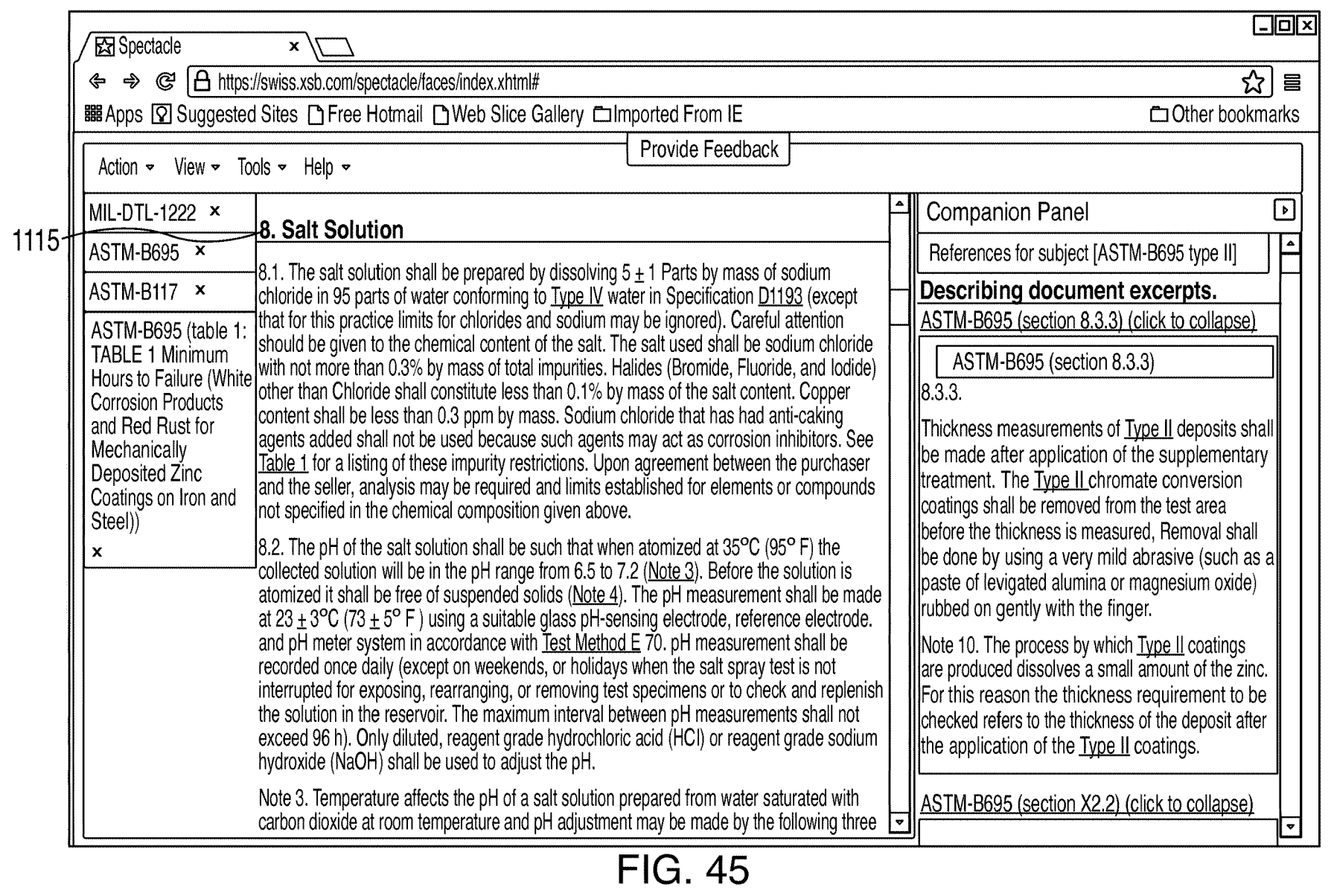

Similarly, the user can review ASTM-B117 for information about performing salt spray corrosion tests. FIG. 43 shows ASTM-B117 1109 open to section 6—Preparation of Test Specimens 1111. In this section, sub-section 6.3 applies to Type II Chromate Coatings. Likewise, Section 7—Position of Specimens during Exposure 1113 and Section 8—Salt Solution 1115, shown respectively in FIGS. 44 and 45, are important information for running the corrosion test.

Expand in Place

Figure 46:
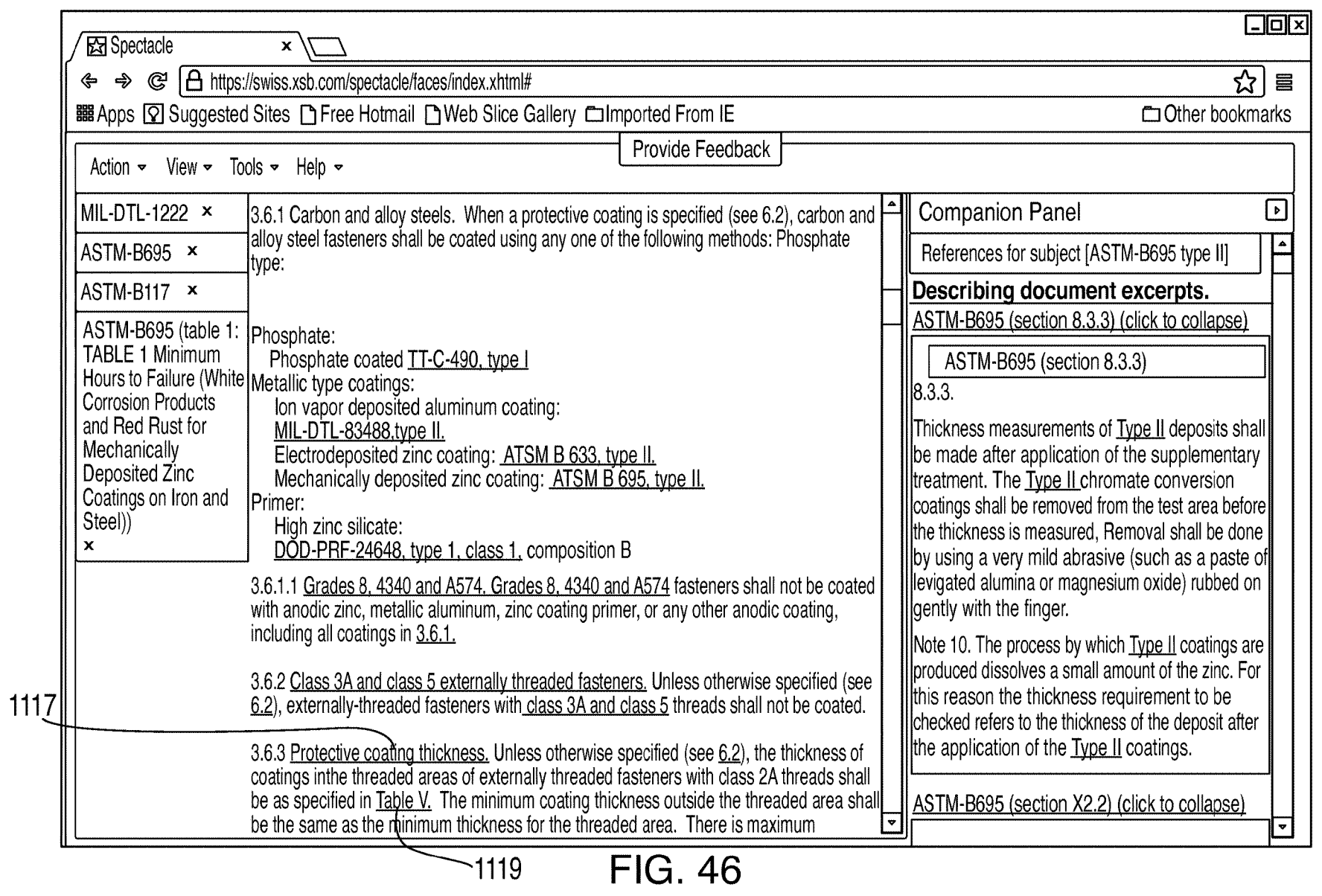
Figure 47:
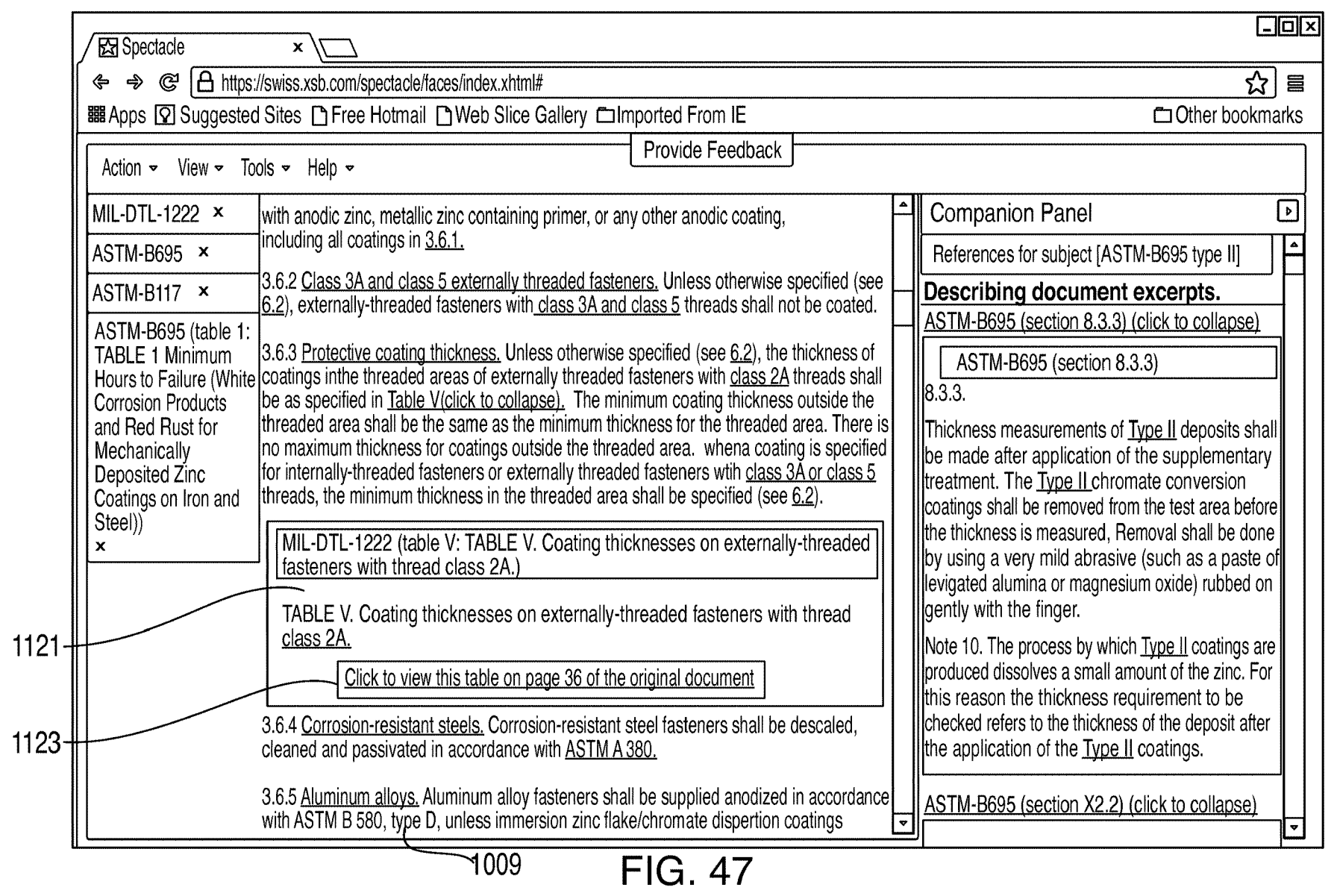
Figure 48:

Since the corrosion test time depends on the Type II Class and the Type II Class depends on the thickness of the coating, the user may need to determine if MIL-DTL-1222 specifies a coating thickness for mechanically deposited zinc coatings. Going back to MIL-DTL-1222, as shown in FIG. 46, that Protective coating thickness is discussed in Section 3.6.3 1117 and refers to Table V 1119. If the user selected "Expand link text in place" 1071 in the "View" menu 1003 (FIG. 26) then clicking on the syntactic link to Table V 1119 brings up the "place holder" 1121 view in the Browser Panel 1009 shown in FIG. 47. Notice that this table is not directly displayed. At the time of this writing, the invention has not completely modeled the more complicated tables but an image or "place holder" 1121 to the table is provided with a hot link 1123. Clicking the link 1123 opens a separate webpage (notice the additional browser tab 1125) with the table displayed as shown in FIG. 48. The finished software will open the table in place in Browser Panel 1009 where the place holder 1121 currently appears.

New Composition

As outlined above, in this example the user has identified all the sections and tables in MIL-DTL-1222, ASTM-B695, and ASTM-B117 that are important for testing the corrosion resistance of carbon steel bolts with mechanically deposited zinc coatings. The user will now assemble a tailored composition which captures the sections of these different specifications in a single document. First the user selects "Create new Composition" 1017 in the "Action" Menu 1001 (FIG. 15). This gives the user the dialog box 1127 shown FIG. 49 which is shown filled out with Designator—XSB-Example 2, Version—1, and Title—Corrosion Resistance of MIL-DTL-1222 Carbon Steel Bolts with Mechanically Deposited Zinc Coating.

Add to Composition

Figure 49:
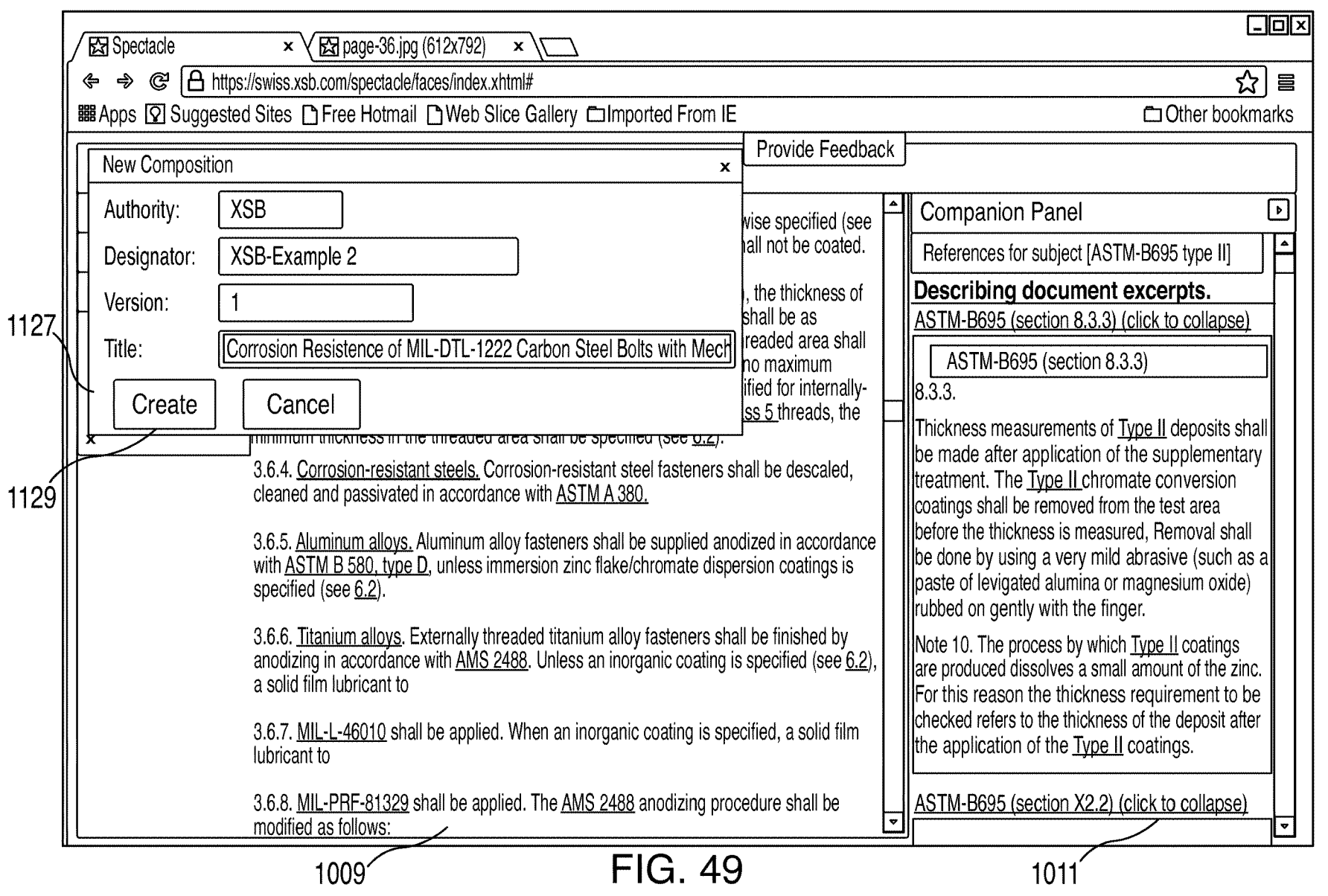
Figure 50:
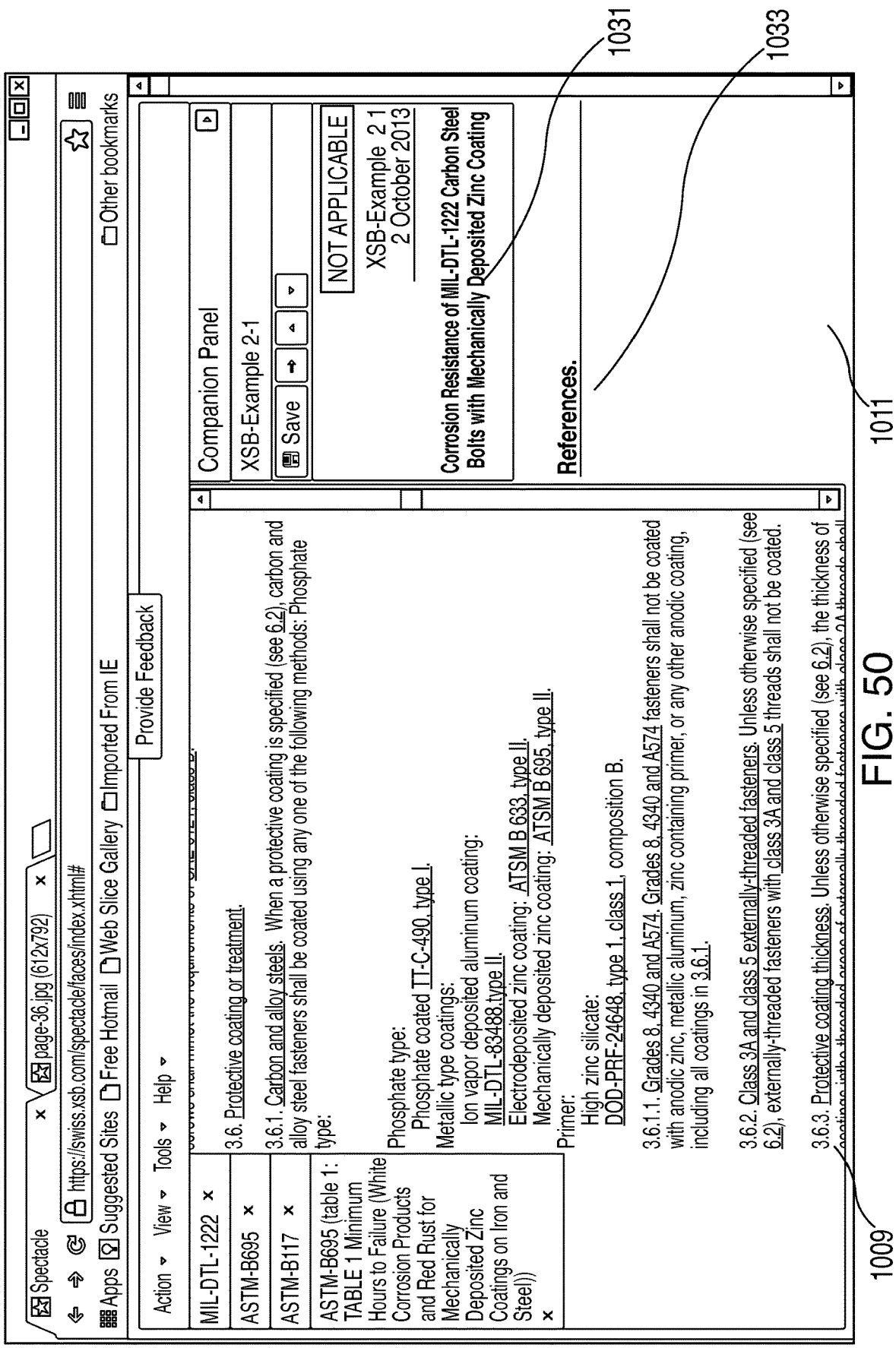
Figure 51:
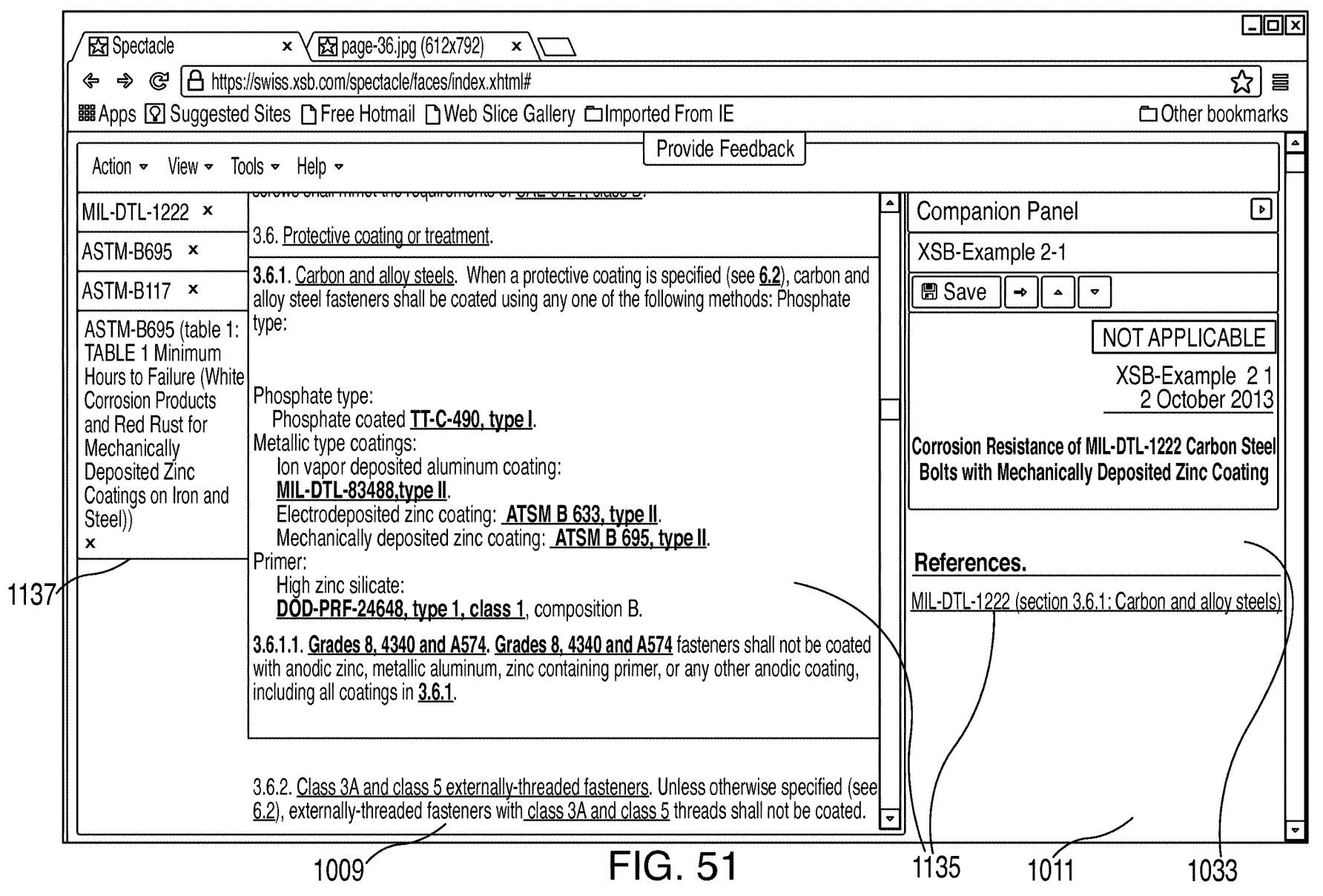
Figure 52:
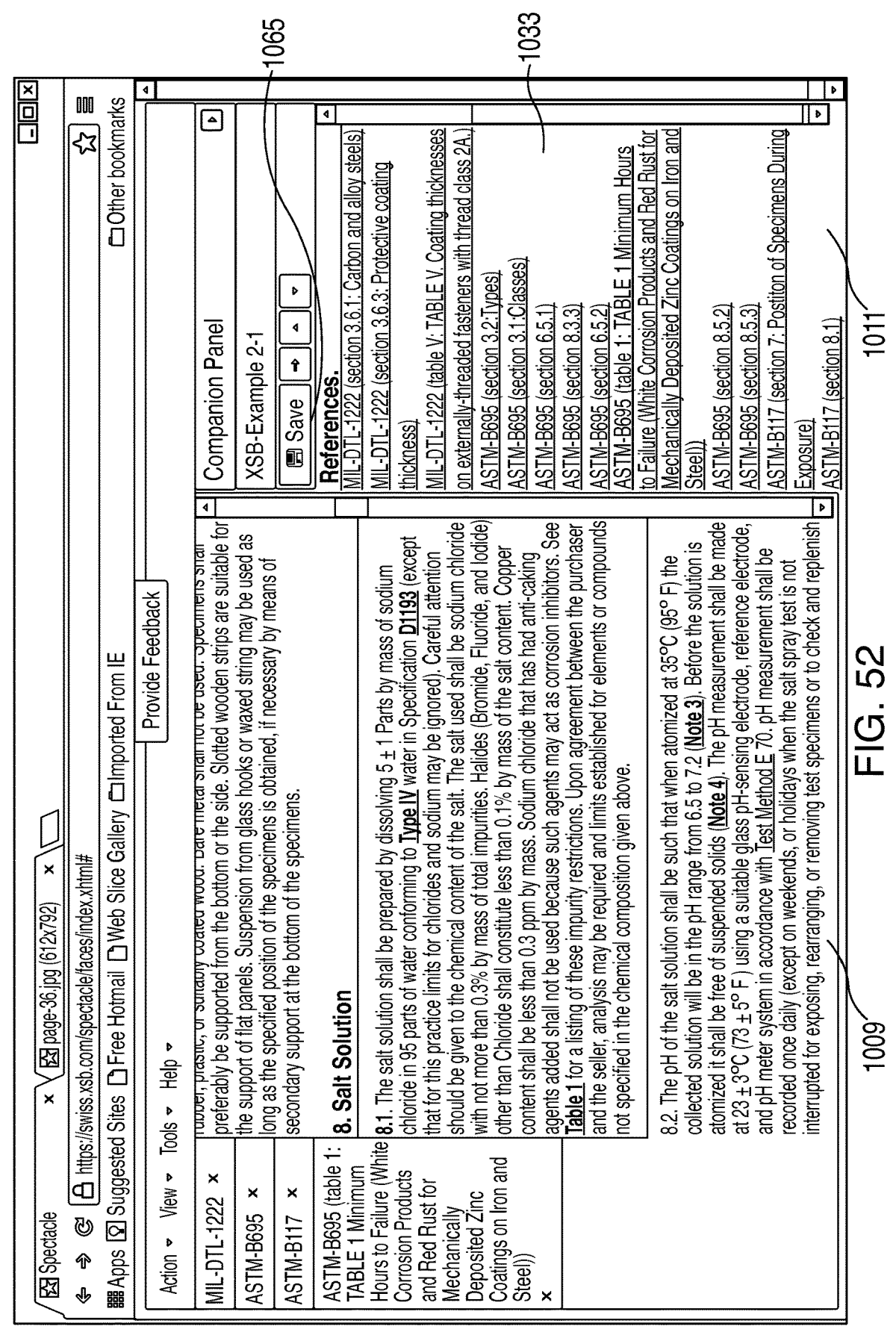

Turning now to FIGS. 49 and 50, the result of clicking on the Create button 1129 in the dialog box 1127 is a blank composition 1031 created in the Companion Panel 1011 with the designator, version, and title from the dialog box 1127. The user can now add references to the reference list 1033 in this Composition by selecting sections from different documents in the Browser Panel 1009 and clicking the right facing arrow in the Companion Panel 1011 next to the "Save" button. See FIG. 21, right facing arrow 1061, save button 1065. For example, FIG. 51 shows MIL-DTL-1222 (section 3.6.1: Carbon and alloy steels) 1135 selected in the Browser panel 1009 and inserted into the composition reference list 1033 in the Companion Panel 1011. The user can select a section by clicking on normal text anywhere in that section and can de-select the section by clicking on text anywhere in the selected section. The user will continue this process adding the sections from MIL-DTL-1222, ASTM-B695, and ASTM-B117 that were identified and now appear as tabs 1137 to the left of the Browser Panel 1009. The sections are added in the order that they are inserted. The result of this process is shown in FIG. 52 with a long list of references 1033 in the Companion Panel 1011. Once the composition has been assembled as shown, clicking the "save" button 1065 saves the document.

Complete Composition

Figure 53:
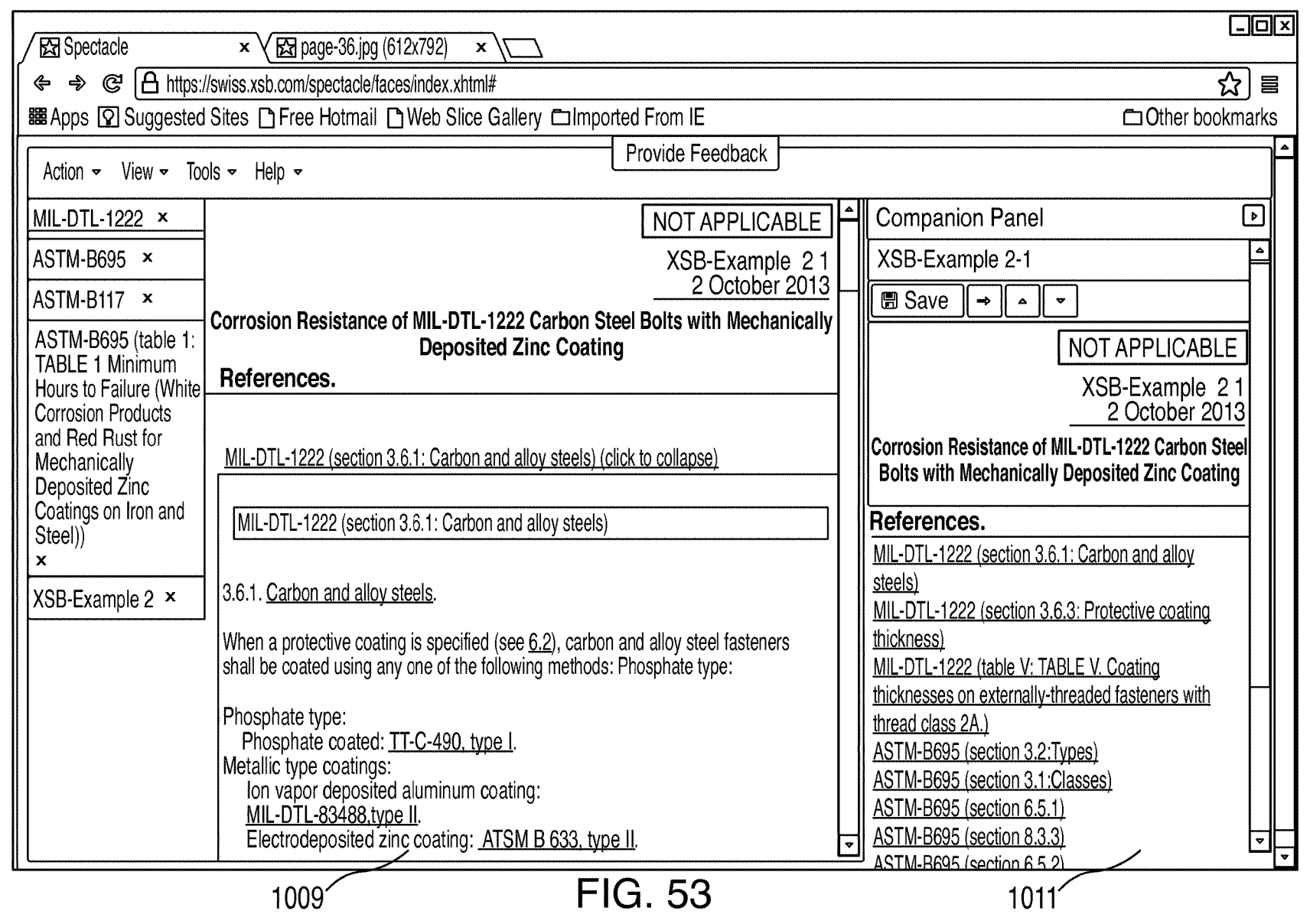

Now that the composition we created has been saved, the user can open it in the Browser Panel 1009 by selecting "Load Composition to Browse" 1015 in the "Action" Menu 1001 (FIG. 15). A dialog box appears (e.g. 1025 in FIG. 23) with the list of saved compositions and the user can select and open a composition for the list. Having previously selected "Expand link text in place" option 1071 from the View Menu 1003 (FIG. 26) when the document is opened all the references can be expanded and contracted in place. The result of doing this is shown in FIG. 53. The composition displayed in the Browser Panel 1009 contains all the information pertaining to corrosion resistance of MIL-DTL-1222 Carbon Steel Bolts that the user felt was important from MIL-DTL-1222 and the two supporting specifications, ASTM-B695 and ASTM-B117 and which are listed as syntactic links in the Companion Panel 1011.

Figure 57:
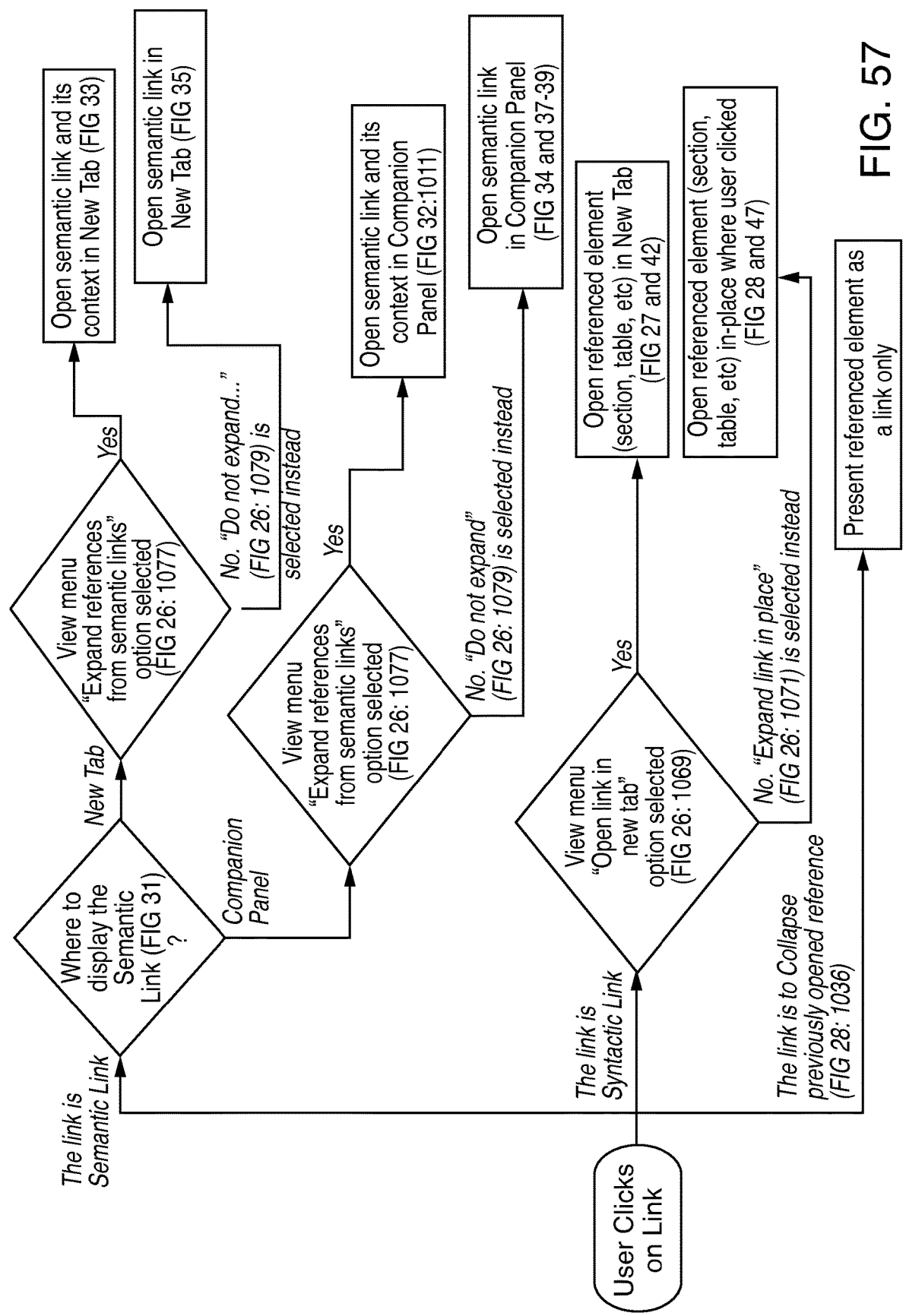

FIG. 57 illustrates the actions taken by the invention in response to user clicks on links If the link is a semantic link, it is determined where to display the link (FIG. 31).
  If it is to be displayed in a new tab, it is determined whether the "expand references from semantic links" option is selected (1077 in FIG. 26).
    If yes, the semantic link and its context are opened in a new tab (FIG. 33).
    If no, "Do not expand . . . " (1079 in FIG. 26) is selected, only the semantic link is opened in the new tab (FIG. 35).
  If it is to be displayed in the companion panel, it is also determined whether the "expand references from semantic links" option is selected (1077 in FIG. 26).
    If yes, the semantic link and its context are opened in the companion panel (1011 in FIG. 32).
    If no, "Do not expand . . . " (1079 in FIG. 26) is selected, only the semantic link is opened in the companion panel (FIGS. 34 and 37-39).
If the link is a syntactic link, it is determined whether the "open link in new tab" option is selected (1069 in FIG. 26).
  If yes, the referenced element (section, table, etc.) is opened in a new tab (FIGS. 27 and 42).
  If no, the "expand in place" option is selected (1071 in FIG. 26), the referenced element (section, table, etc.) is opened in place where the user clicked.
If the link has already been opened, clicking on it will collapse the link to its prior visible state (1036 in FIG. 28).

This above presented transclusion guide illustrates a specific example of creating tailored documents that assembles sections from multiple linked specifications. This process of transclusion allows the user to tailor documents to specific purposes. Advantages of the tailored composition (or tailored document) include the dynamic nature of the transcluded sections whereby and changes made in the referenced documents are automatically reflected in the tailored composition without the need for any retyping. According to the invention, tailored compositions may be created and shared through collaboration.

Sharing

Figure 58:
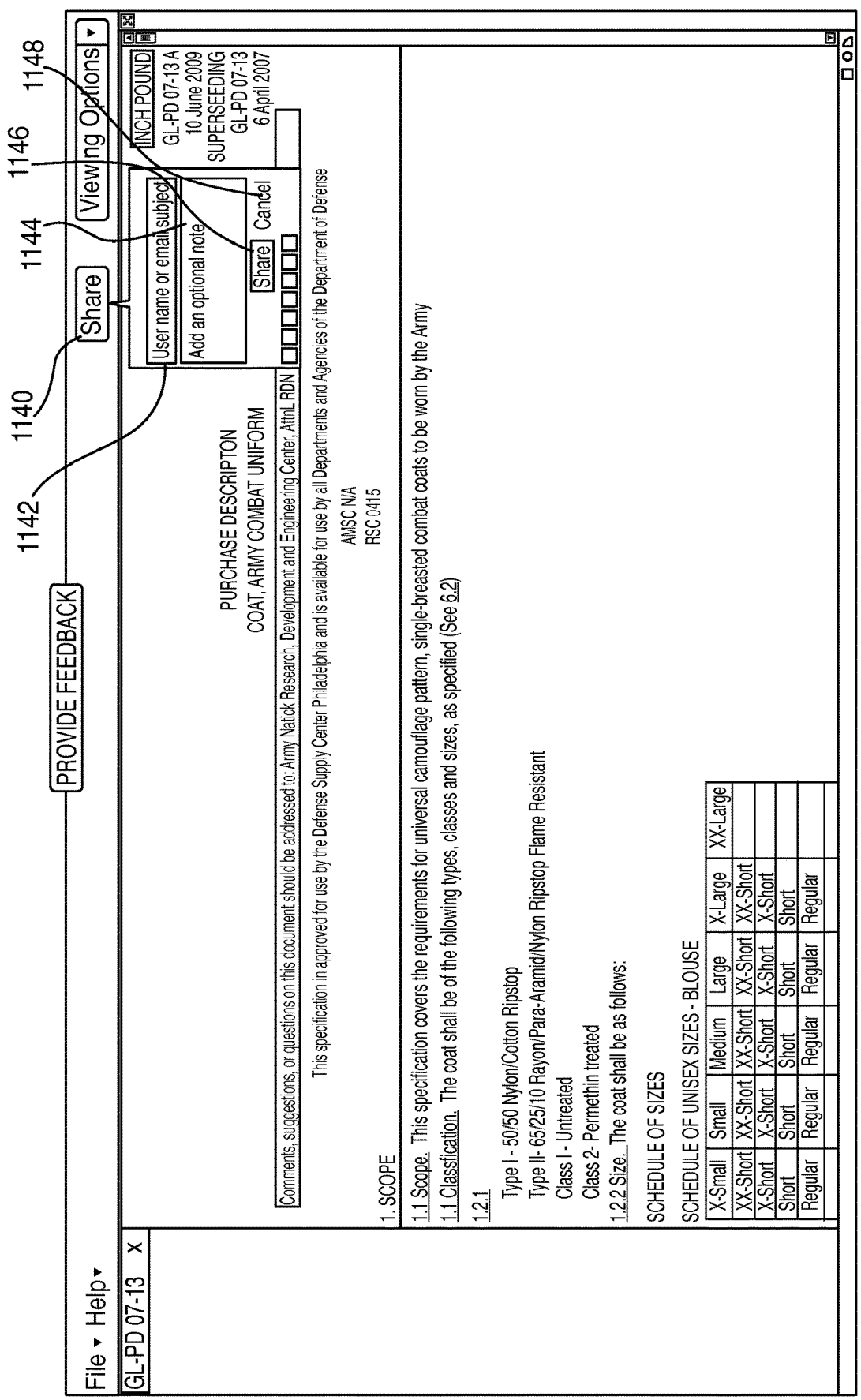

FIGS. 58-60 illustrate some sharing features according to the invention.

Referring now to FIG. 58, the SWISS system preferably enables documents to be shared easily. Sharing can occur in a number of ways, both active and passive. FIG. 58 shows a screen having a Share button 1140. When it is clicked, a small familiar dialog drops down providing a field 1142 to enter a recipient (e.g. an email address, a username known to the system, a user group name known to the system, subject, etc.) and a field 1144 to enter a note. When filled, the Share 1146 button becomes active. In either case, the Cancel button 1148 remains active. Sharing in this way will cause a message to be sent to the intended recipient(s) which may contain a link to a page in the system where the document and/or a digital copy of the contents of the document can be viewed. In the case where the recipient is not yet known to the system, the recipient may be prompted to register before being granted access to the document.

An example of "passive" sharing includes suggesting documents to view based on, for example: documents viewed by other users with similar usage patterns, subsequent documents viewed by others after viewing the current document, documents with subjects related to the subject of this document, or other relationships between documents, users or subjects. These suggestions can occur within the application as well as through periodic emails suggesting content of interest.

An example of "in-application" suggestion is illustrated in FIG. 59 where the tag 1150 lists a link to another document (section) and a link to an explanation of why it is relevant.

Sub-sections of documents can also be shared by inserting them in a new composition, using transclusion, and subsequently sharing the new composition. Note that when a composition transcludes sections of other documents, only users who have been granted permission are permitted to view this content. For example, FIG. 60 shows reference 1152 to a document (section) that requires access permission as shown by the link 1154. In cases where access permission is required, the system provides a method for requesting access using a web form. If payment is required to gain access to the specified document, the web form also provides an area to specify a payment method.

Some aspects of sharing according to the invention include the feature that when a digital model is altered, all digital models that reference the altered digital model reflect the alterations as needed. For example, if the referring digital model referenced a section of an altered digital model that has been altered, that alteration appears in the referring document as well. Conversely, the referring document may be altered in a way that alters a section from a referenced document. In this case, the referenced document is also altered correspondingly. This functionality is made possible by the nature and structure of the digital models described herein.

In addition, the nature of semantic links according to the invention permits (or mandates) that a single semantic link in one digital model reference (link to) multiple other digital models containing or relating to the same or related concepts.

Business System Overview (the SWISS™ EXCHANGE)

Figure 61:
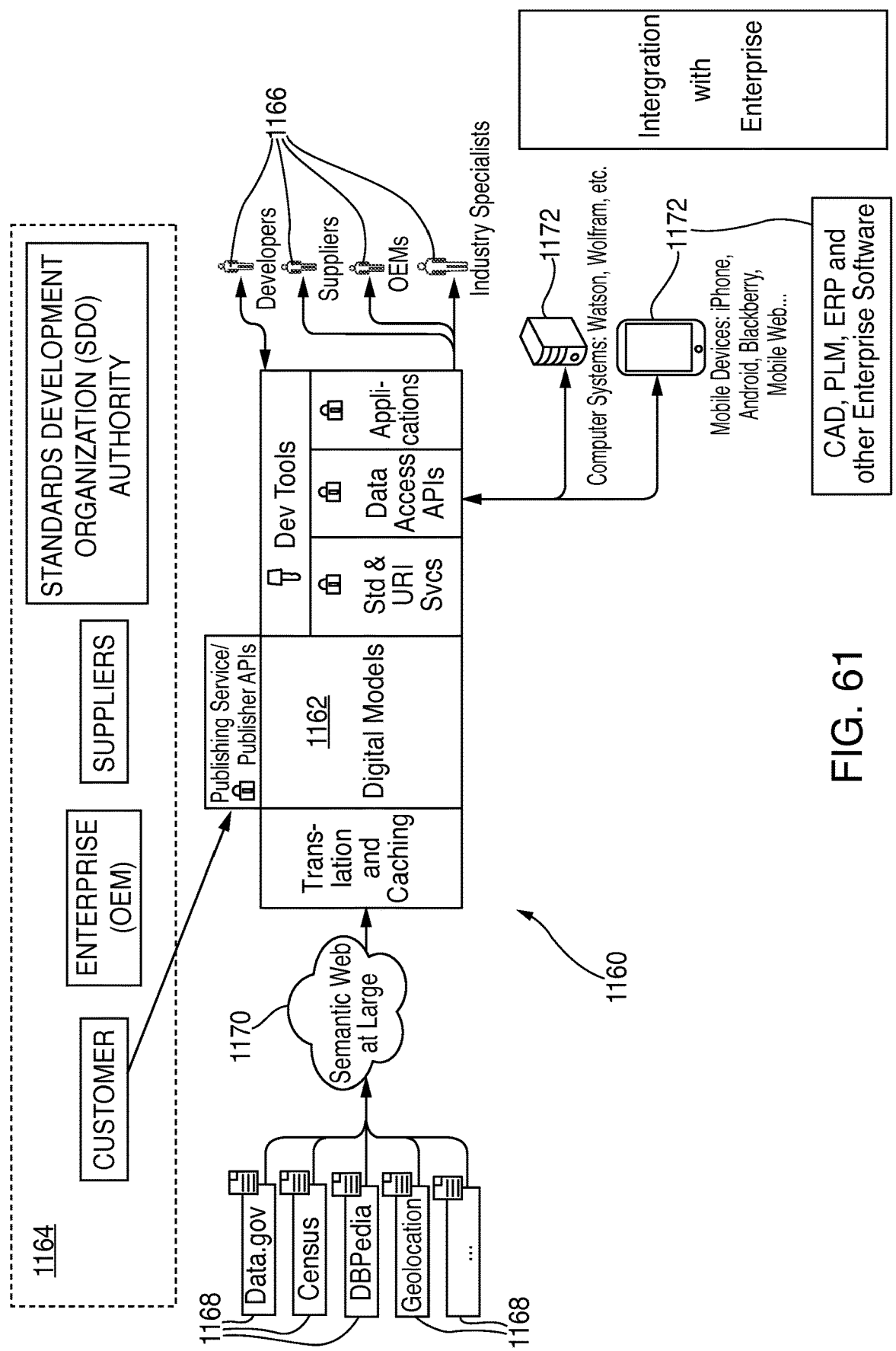
FIG. 61 is a high level overview of a system according to a presently preferred embodiment.

Referring to FIG. 61, an overall system 1160 is shown schematically. The digital models described above are stored electronically at 1162.

Sources 1164 of data for digital models 1162 may include customers, enterprise (OEM), suppliers, and standards development organizations/authority (SDO). These inputs may access the digital models 1162 via tools which are identified in the drawing as "Publishing Services/Publisher APIs".

Users 1166 of the digital models 1162 may include developers, suppliers, OEMs, and industry specialists. Developers may access the digital models 1162 via tools which are identified in the drawing as "Dev Tools". Suppliers, OEMs, and industry specialists may access the digital models 1162 through an application layer which is identified in the drawing as "Applications".

Additional sources 1168 of data for the digital models 1162 may be available via the "semantic web at large" 1170, accessed via "Translation and Caching". These additional sources may include government data (Data.gov.), census data, DBPedia, Geolocations, . . . , for example.

The enterprise systems 1172 of subscribers may be fully integrated with the system 1160 via an interface identified in the drawing as "Data Access APIs". The enterprise systems are identified in the drawing as "Computer Systems: Watson, Wolfram, etc.", "Mobile Devices: iPhone, Android, Blackberry, Mobile Web, . . . ", "CAD, PLM, ERP and other Enterprise Software".

The "Dev Tools" have access to the "Applications" and the "Data Access APIs" as well as standard services and URI services, identified in the drawing as "Std & URI Svcs".

The business system described is known as "SWISS™ EXCHANGE". Users (subscribers) of the system pay a subscription fee and have limited access to the digital models and the tools. Users can choose to share digital models among their own members or with other subscribers including customers, suppliers and standards development organizations.

Participating subscribers may control who has access to specific content and when they are able to have access.

Subscribers can add value to a shared digital model (e.g., composition described above) by correcting or extending concepts in the model.

The SWISS™ EXCHANGE according to the invention provides curation for the digital models and the compositions including control of configuration (change) management and provenance (who changed what when), as well as role based access control.

Unlike the prior approaches to specifications documents that focused on the process of writing specifications documents, the SWISS™ EXCHANGE focuses on the process of using the information contained in specification documents. It creates an environment where many users of specifications can communicate requirements to each other. For example, a customer can specify a requirement to an OEM who can create a composition detailing the requirements for use by a supplier. The supplier can modify the requirements and share the modified digital model with the OEM and the customer who can make further modifications to the digital model, etc.

As mentioned above, today specification documents are published for the convenience of authors. The invention sets out a basic shift to publish concepts that are convenient to the user. This is done in a way so that different categories of users can intuitively employ different parts of specification documents in different ways. Additionally, SWISS™ customers may want to control individual access for security, IP protection and other reasons.

For example, some large, multi-hundred page documents define dozens of different product tests, manufacturing methods, etc. These documents aggregate comprehensive knowledge of a domain; many other documents link other concepts to the concepts in these. Different users in the enterprise need different parts of this knowledge, however almost no user needs the whole aggregation.

An industrial engineer might want one subset view so that she can create manufacturing instructions. However the mechanic implementing those instruction will only need a subset of the subset of those concepts in order to complete any one task on the factory floor The purchasing agent may need another view to create a purchase order for a supplier. A regulatory compliance officer may need yet another view to identify materials that have export restrictions or controls in the country where a product is destined.

Each of these categories of individuals plays a different role in the enterprise. Role based access enables them to avoid the information overload and help the system deliver the correct information for them to do their jobs. Frequently this often means a few properly selected pages or paragraphs that are different from role to role are needed.

Additionally, the author of a specification or composition may want to restrict who sees that creation. An OEM or designer may want to restrict the down stream erosion of intellectual property and ensure that the composition is only delivered to a specific supplier but no others. A specification body may want to ensure that the user has a paid up subscription to the IP etc. Additionally, there may be security issues such as export control that may restrict other classes of users.

Importantly, the system is conceived to handle all these restraints on usage through a variety of provenance and role based access mechanisms. The simplest is to have a table in the database that catalogs the various categories of users (the roles). Another table links SWISS users to their roles and access; this link is used to control access. Potentially, every row (triple) in the database can be controlled. This enables role based access at the individual concept level.

Appendix I

Overview of High-Level Document Structure

At a high level, the XML document looks something like the following:

```
<spec schemaversion="0.3" pagecount="10" publicationstatus="public">
  <head> ... header information ... </head>
  <body>
    <sections>
      <section id="s0001" secnum="1" stype="scope"> ...
      section contents ... </section>
      ... more sections ...
    </sections>
    <testmethods> ... zero or more test methods ... </testmethods>
  </body>
  <footnotes> ... footnotes ... </footnotes>
  <tables> ... tables ... </tables>
  <figures> ... figures ... </figures>
</spec>
```

List of Allowed Elements and Attributes spec (attributes: schemaversion, id, pagecount, publicationstatus)
head
body
footnotes (optional)
tables (optional)
figures (optional)
  head
designation
date
title-prefix (optional)
title
measure
supersedes
info (0 or more)
  body
sections
testmethods (optional)
  footnotes
footnote (0 or more)
  tables
table (0 or more)
  figures
figure (0 or more)
  designation (attributes: authority, version)
contains text string of standardized spec designation (e.g. "MIL-DTL-44411").
  date
contains publication date in ISO standard format (yyyy-mm-dd)
  title-prefix
contains title prefix string (e.g. "Standard Test Method for")
  title
contains text-block content (see General Notes above)
  measure
contains one of the following strings: "METRIC", "INCH-POUND", "COMBINED", "UNKNOWN", "NOT SPECIFIED", or "NOT MEASUREMENT SENSITIVE"
  supersedes (optional)
designation
date
contains information about superseded document, including publication date of superseded document
  info (attributes: name, id)
title (optional)
either
  text
or
  para (1 or more)
info is intended for general header information not covered by other tags, such as distribution statement, contact info, AMSC, etc. Contents can be single text element, or one or more paragraphs.
  sections
section (1 or more)
  section (attributes: id, secnum, sectype)
title
para or table or list or matheq (0 or more)
section (0 or more)
  para (attributes: id)
contains text block information (see General Notes)
  table (attributes: id, tablenumber, page, class)
title (optional)
para (optional)
row (0 or more)
footnotes (optional)
  row (attributes: id, class, isheader)
cell (0 or more)
  cell (attributes: id, colspan, rowspan, class)
contains text block elements (see General Notes)
  list (attributes: id)
item (1 or more)
  item (attributes: id)
para (1 or more)
or
  list
or
  text block elements
footnotes
footnote (0 or more)
  footnote (attributes: id)
label
text block elements
  table
label
text block elements
  figures
figure (0 or more)
  figure (attributes: id, page, figurenumber)
caption
footnotes
  caption
text block elements
  testmethods
testmethod (1 or more)
this element is intended to contain the "test method" subdocuments that occur in a test method spec
  testmethod (attributes: id, number)
date (optional)
title
section (1 or more)
List of Text Block Elements.
  Each has various attributes, and has string content (except for <br/>).
  text (attributes: class)
plain text element, class may indicate display info such as superscript, italics, bold, etc.
  reference (attributes: class, rid, linktype)

links to another element via rid
footnoteref (attributes: class, rid)
links to a footnote via rid. Note that this tag may be empty, in which case the label to insert in the text can come from the footnote node.
docdeclare (attributes: id, docdesig, doctitle)
used to indicate the first appearance of a cross-referenced spec in the document. Other references to spec link to this via rid.
br
Indicates a desired line break in the text. Must be empty.
matheq (attributes: id, display, eqnid, eqno)
Intended to wrap mathml-type equation info. In practice, we are currently passing content as a CDATA block.

Appendix II

Syntactic Classes
swiss:Specification
This is the root for a given specification, and is associated with the primary designation (but not version) of the spec. It is related to specific versions via the dcterms:hasVersion property. Individuals of this type provide a target resource for spec references that don't give version info. Redirection to a specific version may be application dependent (give latest version, or give version from a specific time). It may be a subclass of dcterms:Standard.
swiss:SpecificationDocument
This is the root for a specification document. It is associated with both a primary designation and a secondary designation (version). It is associated with document sections via the swiss:containsSection property. It uses dcterms:title and dcterms:date to indicate title and creation date. It may be a subclass of foaf:Document.
swiss:DocumentPart
This is the parent class for document components such as Section Table, etc. and includes the following subclasses:
  swiss:Section rdfs:subClassOf swiss:DocumentPartNumbered sections and subsections for document. Should have a section number, can have a title. Also used for "Note" sections in ASTM documents.
  swiss:Subdocument rdfs:subClassOf swiss:DocumentPartNumbered test method, for documents with multiple test methods. May have date and title, and may contain numbered sections.
  swiss:Table rdfs:subClassOf swiss:DocumentPart
  swiss:TableRow rdfs:subClassOf swiss:DocumentPart
  swiss:TableCellrdfs:subClassOf swiss:TextContainerOne table cell.
  swiss:Listrdfs:subClassOf swiss:DocumentPart Used to indicate a list structure in the document. Contained by a Section.
  swiss:ListItemrdfs:subClassOf swiss:TextContainer Individual element in list. Contained by List. May have a label. Can contain text or nested list.
  swiss:Paragraphrdfs:subClassOf swiss:TextContainer Unit of textual information. Should have a "hasText" attribute.
  swiss:Equationrdfs:subClassOf swissDocumentPart Encapsulates equation info. Most likely xml in mathml format.
  swiss:Footnoterdfs:subClassOf swissDocumentPart Footnote to document or table.
  swiss:Figure rdfs:subClassOf swissDocumentPart Includes a caption, and optionally a pointer to binary content.
  swiss:Infordfs:subClassOf swissDocumentPart Informational text from spec header. Has name, title, and textual information. Can be used, for instance to encapsulate the "contact information" associated with government documents.
swiss:Annotation
This is the parent class for text annotations. Has integer properties, annotationOffset, annotationLength, and the Object-Object property
  swiss:annotatesResource to indicate which text resource is being annotated. It may also have the swiss:referencesResource property. It includes the following subclasses:
  swiss:DocDeclareAnnotationrdfs:subClassOf swiss:Annotation Includes triples for docDesignator, docTitle, dcterms:references.
  swiss:FootnoteAnnotationrdfs:subClassOf swiss:Annotation Includes triple for swiss:referencesResource, which should point to a Footnote object. In current use, the length should be zero, and the footnote label is obtained from the Footnote object.
  swiss:LineBreakrdfs:subClassOf swiss:Annotation Used to indicate linebreak within text. Presumably, annotationLength is ignored.
  swiss:LinkAnnotationrdfs:subClassOf swiss:Annotation Uses
  swiss:referencesResource to indicate a link to a Specification, SpecificationDocument, or DocumentPart.
  swiss:SemanticLinkrdfs:subClassOf swiss:Annotation Uses swiss:referencesResource to indicate a semantic link to an ontology node.
swiss:TextClassAnnotationrdfs:subClassOf swiss:Annotation Indicates text class (literal string) using swiss:styleClass predicate.
Syntactic Properties
Object-Object Properties
These are properties that link one resource to another (URI to URI). They include the following properties:
  dcterms:references Used to indicate a reference from specification document to another specification.
  dcterms:hasVersion Used to relate primary specification designation with document versions. (e.g. "ASTM-A307 hasVersion ASTM-A307_10").
  swiss:containsDocumentPart Used to indicate a child of specified resource.
  Note: Could be subclass of dcterms:hasPart.
  swiss:containsSectionList This is used to encapsulate a list of sections or subsections. Used to maintain ordering. Note that a section is related to parent section directly via containsDocumentPart and through list structure.
  swiss:containsElementList This is used to encapsulate an ordered list of document parts.
  swiss:annotatesResource Used to indicate which resource is being annotated. Should point to a cnt:ContentsAsText object. There should be exactly one per annotation.
  swiss:referencesResource Used to indicate what resource the annotation is linking to. The referenced resource could be a document, section, table, semantic concept, etc.
  swiss:hasText Used to identify text content of a document part. Should point to a cnt:ContentsAsText object. There should be no more than one of these per documentPart.
  swiss:hasCaption Used to indicate figure caption.

swiss:hasLabel Used to indicate label for list item, note, or footnote. The invention uses this rather than rdfs:label because text may be annotated. Should point to a cnt:ContentsAsText object.

swiss:hasTitle Used to indicate section or document title. The invention uses this rather than dcterms:title because text may be annotated. Should point to a cnt:ContentsAsText object. There should be no more than one per document part.

swiss:supersedes References superseded document.

swiss:hasPageImage swiss:hasDocumentImage swiss:hasInfo Used to relate an "Info" header object with a document.

Object-Data Properties

These are properties that link resources with literal values.

swiss:annotationOffset Non-negative integer indicating beginning of annotation in text.

swiss:annotationLength Non-negative integer indicating length of annotation.

swiss:primaryDesignation Literal string denoting primary designation identifying specification (e.g. "ASTM-A307").

Note: could be subclass of dcterms:identifier.

swiss:secondaryDesignation Literal string denoting version information.

swiss:sectionNumber Literal containing section number.

swiss:sectionType Literal containing information about section type (e.g. "scope", from tags in ASTM).

swiss:hasName Used to indicate name of info block.

swiss:docDesig swiss:docTitle Used in DocDeclareAnnotation swiss:styleClass Used in TextClass annotation, may also apply to DocumentPart objects.

swiss:rowSpan swiss:columnSpan Integer literals, apply to TableCell objects.

swiss:tableNumber swiss:figureNumber swiss:subdocumentNumber swiss:mathEqId swiss:mathEqNumber swiss:mathEqContent swiss:mathDisplay Used to characterize math equations in text.

swiss:titlePrefix Used to indicate title prefix for document, usually something like "Standard Test Methods for".

swiss:measureType Used to indicate document measure type, such as "Metric", "Inch-Pound", etc.

swiss:publicationStatus Used to indicate SWISS™ publication status. "public" status will result in display on public site.

swiss:specPageCount Can be used to indicate number of pages in original document.

swiss:pageNumber Used to indicate page number in original document, typically associated with figures or tables.

dcterms:creator Used to indicate specification authority (e.g. ASTM, MIL, etc.)

dcterms:title Used in cases where title can be expressed as a literal string.

dcterms:date Used to indicate publication date.

Semantic Classes

These classes include:

swiss:Subject: Root of the subject semantic ontology. All classes in the semantic ontology are (rdfs:subClassOf) descendents of this class.

swiss:Part, swiss:ManufacturingProcess, swiss:TestingMethod, swiss:Material, swiss:Environment . . . : each is a rdfs:subclassOf swiss:Subject, and represents a major class of subjects, i.e., what specifications and standards describe. These are roots of domain-specific sub-ontologies. The details of these sub-ontologies are not specified in this standard.

swiss:Subject/{SpecID}: For each spec or standard, with ID SpecID, a class of "SpecID", representing the class of subjects described in that spec. Each is a Subject class, and is a subclass of the major class of subjects under which it falls (or of Subject if it would be under multiple major classes.) For example, swiss:Subject/MIL-DTL-17361G would be the name of the class that represents all things specified in that specification. In this example, it would be a particular kind of circuit breakers and it would be in the appropriate place in the swiss:Part sub-ontology.

swiss:Subject/{SpecID}/{type|class*|grade*| . . . }{*}: Many specs and standards further subdivide their subjects into named subclasses, using type, class, and/or grade refinements. For specs and standards that define such subclasses, there is a Subject class for each such defined subclass of subjects, such as "SpecID type=1, class=B,grade=II", which shall be a subclass of the corresponding "SpecID". These are called "Type/Class/Grade classes." For example, MIL-DTL-17361G defines a circuit breaker of type ABQ-A50, and so there would be a class swiss:Subject/MIL-DTL-17361G/type+ABQ-A50.

swiss:Requirement/{SpecID}{*}: For each set of related requirements, described in a portion of a spec or standard (e.g. SpecID) there is a Requirements class that is a superclass (wrt rdfs:subclassOf) of all subject classes which must meet those requirements. For example subsection 3.5.14.4 of MIL-DTL-17361G describes the allowable temperature rise for a circuit breaker. So there could be a Requirements class swiss:Requirement/MIL-DTL-17361G which has swiss:Subject/MIL-DTL-17361G as a subclass (rdfs:subClassOf). The extension of this Requirements class would be all circuit breakers that have the allowable temperature rise.

Semantic Properties

These properties include:

swiss:describedBy: Domain is a Requirements class in the Subject taxonomy. Range is swiss:DocumentPart. This represents the fact that the set of requirements is described in the indicated part of the specification. Using the circuit breaker example above, there would be a triple:

swiss:Requirement/MIL-DTL-17361G swiss:describedBy swiss:Documents/MIL-DTL-17361G #Section_3.5.14.4> indicating that that requirement is described in that section.

Other Semantic Predicates

The actual "semantics" of a specification is represented by predicates that relate the above-described Requirement classes to (literals or) classes in the domain-specific sub-ontologies. For example, there might be a predicate testWithMethod that relates a particular Requirements class (that constrains particular Type/Class/Grade Subject class) to a test method in the "Test Methods" sub-ontology. These predicates (and the classes in the domain specific sub-ontologies) are able to evolve as needed.

There have been described and illustrated herein several embodiments of a SYSTEMS AND METHODS FOR CRE- ATING, EDITING, STORING AND RETRIEVING KNOWLEDGE CONTAINED IN SPECIFICATION DOCUMENTS.

While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method for using a semantic model to transform, store and disseminate tangible data representing knowledge contained in a collection of documents containing subjects and requirements said method comprising:
creating, for a document in the collection of documents, a shared syntactic model and a shared semantic model of the tangible data representing the document, wherein creating the shared syntactic model comprises: extracting a digital structured syntactic textual model of the document comprising structured information on syntactic elements of the document; and
wherein the shared semantic model comprises a standardized view of semantic concepts in the document and relationships therebetween such that they are integrable with semantic concepts in other documents;
identifying syntactic links within the document and between other documents in the collection of documents, wherein said syntactic links are configured to be navigable within the document and between other documents in the collection of documents;
identifying semantic links within the document and between other documents the collection of documents, wherein said semantic links are configured to be navigable within the document and between other documents in the collection of documents; and
creating a tangible database for storing the tangible data representing the syntactic and semantic models;
wherein creating the shared syntactic and semantic models comprises creating a digital structured model of the document and storing the digital structured model in a data repository,
wherein creating the digital structured model comprises:
syntactically tagging structural components of the document;
generating objects containing information about document structure and contents; and
inferring syntactic relations between the objects, and
wherein the method further comprises:
subjecting each of the objects to a transformation by a semantic extraction by identifying sections of text as class and attribute references; and
storing the transformed object of class objects and object attributes in the tangible database.

2. The method according to claim 1 wherein:
said semantic model is an ontology and the tangible data representing the syntactic and semantic models are stored as objects in the ontology and said tangible database includes syntactic links and semantic links between objects in the ontology.

3. The method according to claim 2, wherein:
said syntactic links and semantic links are multi-directional.

4. The method according to claim 3, further comprising:
providing a user interface or an API through which a user query for digital model components is input and that is configured to return results of the user query to the user
selecting, based on the user query, an XSLT style sheet for displaying the results of the user query;
constraining content utilized for the user request to content allowed to that user based on the role based access control of the system;
translating the digital model components returned by the user query into an XML document; and
displaying the XML document using the selected XSLT style sheet on the user interface or API.

5. The method according to claim 2, wherein:
creating the shared syntactic model comprises:
extracting a structured syntactic textual model of the document; and
expressing the structured syntactic textual model as a Resource Description Framework database comprising information on syntactic elements of the document.

6. The method according to claim 5, wherein:
transforming the tangible data representing the documents includes semantical tagging utilizing syntactic tags and annotator tools to recognize word and phrase meanings, and said annotator tools include one or more of the following tools: a regular expression annotator, a table annotator, a material annotator, an annotator, and a measurement annotator.

7. The method according to claim 2, wherein:
creating the tangible database uses an ontology based schema definition and includes a plurality of ontology based transformations of tangible data.

8. The method according to claim 7, wherein:
said plurality of ontology based data transformations include group annotations as class or attribute references, classifications of specific class objects in the ontology, and extraction and standardization of attribute references to object attributes using class of object for context of extraction.

9. The method according to claim 1, further comprising transforming and annotating the tangible data representing the documents, wherein:
transforming the tangible data representing the documents includes converting text from the tangible document to a tangible text file while preserving text positioning information; and syntactical tagging to recognize sections, tables and other structural components of the tangible document.

10. The method according to claim 1, further comprising:
receiving the user query entered into the user interface or API, the user query comprising a request for one or more documents and a context;
generating a database query based on the request for one or more documents and the context of the user query, the database query comprising a request for specific components of the syntactic model and/or the semantic model.

11. A system for organizing, storing and disseminating knowledge contained in a collection of documents that organizes subjects and requirements defined in the documents, wherein the system comprises and is embodied on a non-transitory computer readable medium coupled to a processor and comprising:
a document annotator/converter configured to receive the documents as inputs and to create a shared structured syntactic model of the documents, the shared structured syntactic model comprising structured information on syntactic elements of the documents, wherein creating the shared syntactic model comprises: extracting a digital structured syntactic textual model of the document comprising structured information on syntactic elements of the document; and wherein the document/annotator converter is configured to identify syntactic links within a document and between documents in the collection of documents, wherein said syntactic links are configured to be navigable within the document and between other documents in the collection of documents;

a semantic tagger configured to create a shared structured semantic model of the documents, wherein the shared semantic model comprises a standardized view of semantic concepts in the document and relationships therebetween such that they are integrable with semantic concepts in other documents;

a semantic extractor that identifies semantic links within a document and between documents in the collection of documents, wherein said semantic links are configured to be navigable within the document and between other documents in the collection of documents;

a database for storing the tangible data representing the syntactic and semantic models;

wherein the document annotator/converter being configured to create the shared syntactic and semantic models comprises the document annotator/converter being configured to create a digital structured model of the document by syntactically tagging structural components of the document; and generating objects containing information about document structure and contents; and inferring syntactic relations between the objects, and storing the digital structured model in the database; and each of the objects is transformed by subjecting the object to a semantic extraction by identifying sections of text as class or and attribute references; and the transformed object of class objects and object attributes is stored in the database.

12. The system according to claim 11, wherein:
said semantic model is an ontology and the tangible data representing the syntactic and semantic models are stored as objects in the ontology.

13. The system according to claim 12, wherein:
said document annotator/converter includes a plurality of data transformers and a plurality of custom annotator tools.

14. The system according to claim 13, wherein:
said plurality of data transformers include a text converter to convert text from the document to a text file while preserving text positioning information.

15. The system according to claim 14, wherein:
said plurality of data transformers include a syntactical tagger to recognize sections, tables and other structural components of the document.

16. The system according to claim 15, wherein:
said plurality of data transformers include a semantical tagger which utilizes syntactic tags and said custom annotator tools to recognize word and phrase meanings.

17. The system according to claim 16, wherein:
said custom annotator tools include one or more of the following tools: a regular expression annotator, a table annotator, a material annotator, an annotator, and a measurement annotator.

18. The system according to claim 13, wherein:
said plurality of ontology based data transformers include group annotations as class or attribute references, classifications of specific class objects in the ontology, and extraction and standardization of attribute references to object attributes using class of object for context of extraction.

19. A non-transitory computer readable medium containing program instructions for storing and disseminating knowledge contained in a collection of documents containing subjects and requirements, wherein execution of the program instructions by one or more processors of a computer system causes the one or more processors to carry out the steps of:

creating, for a document in the collection of documents, a shared syntactic model and a shared semantic model of the tangible data representing the document, wherein creating the shared syntactic model comprises: extracting a digital structured syntactic textual model of the document comprising structured information on syntactic elements of the document; and wherein the shared semantic model comprises a standardized view of semantic concepts in the document and relationships therebetween such that they are integrable with semantic concepts in other documents;

identifying syntactic links within the document and between other documents in the collection of documents, wherein said syntactic links are configured to be navigable within the document and between other documents in the collection of documents;

identifying semantic links within the document and between other documents in the collection of documents, wherein said semantic links are configured to be navigable within the document and between other documents in the collection of documents; and creating a tangible database for storing the tangible data representing the syntactic and semantic models;

wherein creating the shared syntactic and semantic models comprises creating a digital structured model of the document and storing the digital structured model in a data repository, wherein creating the digital structured model comprises:

syntactically tagging structural components of the document;

generating objects containing information about document structure and contents; and inferring syntactic relations between the objects, and wherein the method further comprises: subjecting each of the objects to a transformation by a semantic extraction by identifying sections of text as class and attribute references; and storing the transformed object of class objects and object attributes in the tangible database.

20. The non-transitory computer readable medium according to claim 19 wherein:
said semantic model is an ontology and the tangible data representing the syntactic and semantic models are stored as objects in the ontology.

* * * * *